US008111640B2

(12) United States Patent
Knox

(10) Patent No.: US 8,111,640 B2
(45) Date of Patent: Feb. 7, 2012

(54) ANTENNA FEED NETWORK FOR FULL DUPLEX COMMUNICATION

(76) Inventor: Michael E. Knox, Manhasset, NY (US)

(*) Notice: Subject to any disclaimer, the term of this patent is extended or adjusted under 35 U.S.C. 154(b) by 25 days.

(21) Appl. No.: 12/459,981

(22) Filed: Jul. 10, 2009

(65) Prior Publication Data

US 2009/0274072 A1 Nov. 5, 2009

Related U.S. Application Data

(63) Continuation-in-part of application No. 11/919,589, filed as application No. PCT/US2006/024280 on Jun. 22, 2006, now abandoned.

(60) Provisional application No. 60/692,958, filed on Jun. 22, 2005.

(51) Int. Cl.
 *H04B 7/005* (2006.01)
(52) U.S. Cl. ......................... 370/278; 370/339
(58) Field of Classification Search ................. None
 See application file for complete search history.

(56) References Cited

U.S. PATENT DOCUMENTS

| 3,009,794 | A | 3/1960 | Essam et al. |
| 4,134,068 | A | 1/1979 | Richardson |
| 4,641,365 | A | 2/1987 | Montini, Jr. |
| 4,725,542 | A | 2/1988 | Mayberry |
| 4,742,354 | A | 5/1988 | Wen et al. |
| 4,924,236 | A | 5/1990 | Schuss et al. |
| 4,968,967 | A | 11/1990 | Stove |
| 5,027,084 | A | 6/1991 | Tsukii |
| 5,125,108 | A | 6/1992 | Talwar |
| 5,129,099 | A | 7/1992 | Roberts |
| 5,153,596 | A | 10/1992 | Stove |
| 5,164,985 | A | 11/1992 | Nysen et al. |
| 5,173,703 | A | * | 12/1992 | Mangiapane et al. ...... 342/25 A |
| 5,349,365 | A | 9/1994 | Ow et al. |
| 5,359,331 | A | 10/1994 | Adler |

(Continued)

FOREIGN PATENT DOCUMENTS

GB 2372902 4/2002

(Continued)

OTHER PUBLICATIONS

G. Lathiere et al., A Novel Balance Circulator For FDD MC-CDMA Communications, Oct. 12, 2004, 34$^{th}$European Microwave Conference Amsterdam, 2004 pp. 605-608.

(Continued)

*Primary Examiner* — Jianye Wu
(74) *Attorney, Agent, or Firm* — Herbert F. Ruschmann

(57) ABSTRACT

The present invention provides a wireless device for effecting two way wireless transmission, an antenna feed network, and a patch antenna. The wireless device includes an antenna assembly having two inputs accepting two feed signals shifted a feed signal phase difference apart. The antenna assembly receives a radiated signal and produces first and second received signals. First and second reflected feed signals are also produced at the two antenna inputs. A transmitter produces a transmission signal and a receiver receives the radiated signal while the transmission signal is transmitted by the antenna assembly. The antenna feed network interconnects the transmitter port, the receiver port, and the antenna assembly and produces the received signal while effecting substantial cancellation of the first and second reflected feed signals. Additionally, or alternatively, first and second transmission leakage signals at the received signal output substantially cancel each other.

57 Claims, 21 Drawing Sheets

U.S. PATENT DOCUMENTS

| | | | |
|---|---|---|---|
| 5,561,397 A | 10/1996 | Kumar et al. | |
| 5,596,325 A | 1/1997 | Maas | |
| 5,701,595 A | 12/1997 | Green, Jr. | |
| 5,771,320 A | 6/1998 | Stone | |
| 5,815,803 A | 9/1998 | Ho et al. | |
| 5,861,837 A | 1/1999 | Richardson et al. | |
| 5,896,113 A | 4/1999 | O'Neill, Jr. | |
| 5,909,196 A | 6/1999 | O'Neill, Jr. | |
| 5,920,292 A | 7/1999 | O'Neill, Jr. | |
| 5,969,681 A | 10/1999 | O'Neill, Jr. | |
| 6,181,286 B1 | 1/2001 | Roscoe et al. | |
| 6,184,834 B1 | 2/2001 | Utsumi et al. | |
| 6,313,713 B1 | 11/2001 | Ho et al. | |
| 6,509,883 B1 | 1/2003 | Foti et al. | |
| 6,720,912 B2 | 4/2004 | Shono | |
| 6,720,935 B2 | 4/2004 | Lamensdorf et al. | |
| 6,870,986 B1 | 3/2005 | Stone | |
| 6,952,183 B2 | 10/2005 | Yuanzhu | |
| 7,834,719 B2 | 11/2010 | Cheung et al. | |
| 7,855,617 B2 | 12/2010 | Cheung et al. | |
| 2002/0031224 A1* | 3/2002 | Basawapatna et al. | 380/211 |
| 2002/0032039 A1 | 3/2002 | Kimata | |
| 2002/0177417 A1 | 11/2002 | Visser | |
| 2003/0090405 A1 | 5/2003 | Rauch et al. | |
| 2004/0077353 A1 | 4/2004 | Mahany | |
| 2004/0124944 A1 | 7/2004 | Nation | |
| 2005/0078683 A1 | 4/2005 | Page | |
| 2005/0153664 A1 | 7/2005 | Moloudi et al. | |
| 2009/0268642 A1 | 10/2009 | Knox | |
| 2010/0216413 A1 | 8/2010 | Khannur | |

FOREIGN PATENT DOCUMENTS

| | | |
|---|---|---|
| WO | WO/2007/002273 | 1/2007 |
| WO | WO-2008/105742 | 9/2008 |

OTHER PUBLICATIONS

Craig A. Grimes et al., "An Experimental Investigation Into the Control of Antenna Input Impedance Through Cancellation of near Field Standing Energy", May 1998. 0-7803-4311-5/98, pp. 273-282, IEEE MTT 1988.

Leo G. Mnlorntsky, "An Aircraft Single-Antenna FM Radio Altimeter," May 2001, p. 196 (14pgs) Microwave Journal.

Matilaz Vidmar, "Design Improves 4.3 Ghz Radio Altimeter Accuracy", Jun. 2004, pp. 1-5, and Figs. 1-6, Microwaves & RF http://www.mwrf/Articles/Print.efm?ArticleID-10583.

Written Opinion of the International Searching Authority (ISA/US) in PCT/US2007/036459, mailed Apr. 24, 2008.

Written Opinion of the International Searching Authority (ISA/US) in PCT/US2006/024280, mailed Feb. 16, 2007.

* cited by examiner

ANTENNA FEED NETWORK FOR FULL DUPLEX COMMUNICATION

RELATED APPLICATIONS

This application is a continuation-in-part of application Ser. No. 11/919,589, filed Oct. 30, 2007, still pending, which is a National Stage of international application serial number PCT/US2006/024280, filed Jun. 22, 2006, now expired, which claimed priority to provisional application Ser. No. 60/692,958, filed Jun. 22, 2005, now abandoned. This application hereby incorporates by reference all portions of each of said three applications.

TECHNICAL FIELD

The present invention relates to wireless transceivers that operate in full duplex mode providing the simultaneous transmission and reception of radio signals. In particular, but not exclusively, the present invention relates to wireless transceivers that are provided with a means to isolate signals transmitted by the transmitter of the wireless transceiver and received by a receiver of the wireless transceiver.

BACKGROUND OF THE INVENTION

Modern wireless communication, radar and radio frequency identification (RFID) systems often operate under full duplex operation. A wireless transceiver comprises of a local transmitter and a local receiver. Full duplex operation occurs when a local transmitter is actively transmitting RF signals during the same time that a local receiver is detecting RF signals and/or backscatter from the surrounding environment. The local transmitter and local receiver are typically in close proximity to one another and are often placed within a common enclosure. It is also desired to operate the full duplex system using a monostatic configuration, namely a configuration that uses a single antenna common to both the local transmitter and local receiver. In a typical transceiver, the transmitted and received signals are typically routed to and routed from the single antenna using a duplexing filter, circulator or directional coupler.

It is known that operation of the local receiver during the time that the local transmitter is transmitting creates receiver problems as the transmitter energy leaks, couples and/or reflects into the receiver resulting in corruption, distortion, saturation and/or desensitization within the receiver. In some cases, a duplexing filter may be used to isolate the transmitted energy from the receiver if the transmitter and receiver are configured to operate at two different frequencies that allow the duplexing filter to provide the required isolation between the local transmitter and the local receiver. If the system is designed to operate with the local transmitter and receiver using the same RF carrier frequency or with different transmit and receive frequencies that are close in RF carrier frequency such that the duplexing filter cannot adequately provide the required isolation, then a portion of the local transmitter's transmission signal energy will enter the local receiver and reduce the local receiver's performance.

A basic RFID transceiver is a system designed for full duplex operation using the same RF carrier frequency. Referring to FIG. 1, a simplified block diagram of a RFID transceiver 1 has a transmitter output port 2 for transmitting RF energy, i.e., a transmit signal 11, to a RFID transponder or tag 106. The transmitted RF energy may or may not be modulated with data. The transceiver 1 also contains a receiver input port 5 for receiving signals from the tag 106.

A circulator 3 functions to route the transmit signal 11 to the antenna 4, route a received signal 12 from an antenna 4 to the receiver input port 5, and provide some level of isolation between the transmit channel of the transmitter output port 2 and the receive channel of the receiver input port 5. The transmitted signal 11 leaves the antenna 4, and is received by the RFID tag 106. The RFID tag 106 consists of an antenna 107 and electronics 108 which may or may not contain an internal power source.

If an internal power source is not used within the RFID tag 106, then an RF signal received by the RFID tag 106, i.e., the transmit signal 11, is rectified and used to power the tag electronics 108. RFID tags that operate in passive or semi-passive mode typically do not contain an independent RF signal source therefore communication between the RFID tag 106 and the transceiver 1 occurs when the RFID tag 106 changes its reflection properties or backscatter. In this operation, the transmitter needs to be active during all tag-to-transceiver communications. It is under this full duplex operation that the receiver is required to recover encoded data from the backscattered signal during the time that the transmitter is transmitting its RF carrier into the surrounding environment. The backscatter signal is received by the antenna 4 and routed to the receiver input port 5 through the circulator 3. This full duplex transceiver configuration can also be used in many radar applications such as ground penetrating radar where the transmitter and receiver are operating with the same RF carrier and the receiver is required to recover reflections from targets in the environment while the transmitter is actively transmitting energy.

In any wireless transceiver, it is important that the receiver not operate in an undesired condition that will create corruption, distortion, saturation and/or desensitization within the receiver from any signal or signals coming from within the transceiver or the surrounding environment. For example, if a receiver front-end is driven into saturation from a high level RF signal that leaked, coupled or reflected from the transmitter of the transceiver, the receiver performance could be significantly degraded. Alternately, if the receiver operates with a high level front-end, then the down-converted intermediate frequency (IF) portion of the receiver will need to properly handle the resulting high level down-converted signal otherwise the receiver performance could be degraded.

In the case of a direct conversion receiver, the received signal is directly down-converted to baseband. For this type of transceiver arrangement, any signal that leaked, coupled or reflected from the transmitter will create a large DC offset at the baseband that could saturate the baseband amplifier and/or analog-to-digital converter and degrade receiver performance.

In a traditional full duplex transceiver using a single antenna there are four predominate RF signal paths, two paths are desired, namely the uplink and downlink communication paths, and two other paths are undesired due to leakage and reflections within the transceiver. FIG. 1 shows an example of the four signal paths within a full duplex RFID transceiver system. The desired transmitter-to-tag signal, or signal path, 11 is the forward communication link between the transceiver 1 and the RFID tag 106. The desired tag-to-receiver signal, or signal path, 12 is the reverse communication link between the RFID tag 106 and the transceiver 1. In full duplex operation, the forward link and reverse link are operating simultaneously and data modulation may occur on one or both paths.

In any practical system, a portion of the transmission signal emitted by the transmitter never reaches the antenna 4 and enters the receiver input port 5 through the circulator 3 by a leakage path. This undesired leakage typically occurs due to practical limitations in design of the circulator 3. These limitations create a first undesired path 13 from the transmitter output port 2 to the receiver input port 5. Additionally, a portion of the transmission signal is reflected from the antenna 4 due to mismatch between a transmission line impedance and the antenna's input impedance and results in second undesired path, or reflected signal 14. This reflected signal 14 enters the receiver input port 5 through the circulator 3. It is known that these undesired signals 13 and 14 will create problems if the energy level is high enough to cause corruption, distortion, saturation and/or desensitization within the receiver.

As an example describing how a receiver can be driven into a non-linear state from undesired signal paths, assume that a RFID system operating in the 902 MHz to 928 MHz frequency range has a transmitter output power of +30 dBm (1 watt) applied to the antenna. Also assume that the receiver front-end of the RFID transceiver has a compression point of +0 dBm (1 milliwatt). In order to maintain linearity in the receiver, the leakage and reflected signals must be below the compression point of the receiver front-end. Circulator manufacturers typically specify the leakage path 13 to be around 23 dB for junction-type circulators and 13 dB for lumped-element type circulators. Antenna manufacturers typically specify the return loss in the range of 10 dB to 20 dB (2:1 to 1.2:1 VSWR). In this case, the circulator leakage 13 allows a signal level of +7 dBm (5 milliwatts) to enter the receiver front-end using the junction-type circulator. This signal level will severely drive the receiver front-end into compression thus greatly reducing receiver performance. A lumped element circulator would further compress the front-end with a leakage signal as high as +17 dBm (50 milliwatts). For the case of an antenna with a 20 dB return loss, the reflection 14 results in a signal level into the front-end of +10 dBm (10 milliwatts), which also compresses the receiver and greatly reduces receiver performance. An antenna with a return loss of 10 dB would further compress the receiver with a reflected signal level of +20 dBm.

In order to maintain linearity of the receiver front-end, the isolation of the circulator would need to be greater than 30 dB over the full operating bandwidth. This isolation level is very difficult to achieve in a low-cost circulator. In addition, the return loss of the antenna would need to be greater that 30 dB (1.06:1 VSWR) which is also difficult to achieve over the full operating system bandwidth.

There are several techniques to overcome receiver saturation due to circulator leakage and antenna reflection. One approach that has been implemented in RFID and Ground Penetrating Radar (GPR) systems uses two separate antennas, one for the transmit channel and one for the receive channel. In this configuration, the two antennas can be separated a large physical distance in order to improve the isolation between the transmitter and receiver. A two-antenna configuration is less desirable than a single antenna system due to the increased physical size and higher antenna cost. In addition, a two-antenna system may result in reduced performance in a multipath environment.

In many RFID systems, it is often desirable to use Circularly Polarized (CP) antenna(s) attached to the RFID transceiver. The CP antenna effectively transmits and receives energy in all polarizations. As RFID tags typically have linear polarization, using CP antennas at the RFID transceiver would allow the RFID tags to be positioned with any orientation within the environment. There are numerous designs that can be used in a CP antenna including a microstrip patch, cross-polarized dipoles and quadrifilar helix. Circular polarization can be created with asymmetries in the antenna geometry or using a dual-feed antenna where each feed port is driven with a signal of equal amplitude and 90 degrees phase difference (quadrature).

In a full duplex transceiver operating using a single antenna, the leakage through the circulator and reflection from the antenna represent a technical problem to the performance of the receiver. This problem is addressed by the present invention.

DISCLOSURE OF INVENTION

It is an object of the present invention to provide a duplex wireless communication device wherein the transmit channel to the receive channel isolation is improved over prior art arrangements. In particular, the present invention relates to an antenna feed network and a full duplex transceiver system including the antenna feed network. The antenna feed network provides high isolation between a transmit channel and a receive channel in the direction from the transmit channel to the receive channel in the full duplex transceiver. The antenna feed network allows the transceiver to operate using the same transmit and receive frequencies. The antenna feed network also allows the transceiver to operate using different transmit and receive frequencies. In an advantageous application the two different frequencies are close in frequency and are therefore inadequately filtered using a duplexing filter.

The antenna feed network also provides high isolation from the receive channel to the transmit channel. The antenna feed network accepts an input signal from the transceiver transmit channel and outputs two signals with a 90-degree (quadrature) phase relationship in the preferred arrangement. The two signals can be used to directly feed a CP antenna. In a preferable application antenna ports of the CP antenna have similar electrical characteristics. The two antenna ports may be part of common antenna structure or be from two individual structures, which combined would create a CP antenna. Signal reflections from the two antenna ports are terminated inside the antenna feed network. Signals received by the CP antenna from the surrounding environment are routed through the antenna feed network and delivered to transceiver receive channel. Preferably two signals are accepted from the CP antenna at approximately equal amplitudes; however application of the antenna feed network also includes acceptance of only one signal of the two signals or two signals at non-equal amplitude levels.

Briefly stated, the present invention provides a wireless communication device for effecting two way wireless communication, which includes an antenna assembly having first and second feed inputs accepting first and second antenna feed signals shifted a feed signal phase difference apart. The antenna assembly receives radiated signals and produces a first received signal and second received signal at the first and second feed inputs. First and second reflected feed signals are also produced at the first and second feed inputs. A transmitter produces a transmission signal and a receiver receives a received signal composed of at least a portion of the at least one of the first and second received signals from the antenna while the transmission signal is being transmitted by the antenna. An antenna feed network interconnects the transmitter, the receiver, and the antenna to apply the transmission signal to the first and second feed inputs and to simultaneously receive at least one of the first and second received signals from the first and second feed inputs and produce the received signal therefrom while effecting at least partial cancellation of the first and second reflected feed signals. Additionally, or alternatively, first and second transmission leakage signals at the received signal output also effect at least partial cancellation of each other.

In an embodiment of the present invention, the antenna feed network includes a signal dividing assembly receiving the transmission signal from the transmitter and dividing the transmission signal into first and second divided transmission signals having substantially equal amplitudes and a first relative phase shift therebetween. First and second routing devices are provided each having at least first, second and third ports, and being configured to simultaneously deliver a signal at the first port to the second port and another signal at the second port to the third port each at functionally operative levels. The first and second routing devices receive the first and second divided transmission signals at the first ports and route them to provide the first and second antenna feed signals at the second ports which are applied to the first and second antenna feed inputs. First and second transmission leakage signals result at the third ports. The received signals and the reflected feed signals are directed to the third ports. Further provided is a signal combiner assembly having first and second combiner inputs and a received signal output connected to the receiver. The first and second combiner inputs are connected to the third ports of the routing devices. The signal combining assembly is configured to direct at least part of the received signals to the received signal output.

It is a further feature of the present invention that the signal combining assembly is configured to introduce a phase shift into signals applied to at least one of the first and second combiner inputs such that the reflected feed signals are phase shifted relative one another approximately 180 degrees and combined at approximately the same amplitude levels at the received signal output to substantially cancel each other.

It is a still further feature of the present invention that the signal combiner assembly introduces a phase shift into signals applied to at least one of the first and second combiner inputs such that the transmission leakage signals are phase shifted relative one another approximately 180 degrees and arrive at approximately the same amplitude levels at the received signal output to substantially cancel each other.

In an embodiment of the invention the signal combiner assembly is optionally a quadrature hybrid. Alternatively, the signal combiner may be embodied as an equal phase power dividing device with a phase shift introduce into one branch. Such a power dividing device may, for example, be embodied as a Wilkinson power splitter, a resistive divider a T-junction or a reactive T but other power dividing device may be adapted to use in the present invention. These devices may include resistive elements or may be purely reactive.

It is a further feature of the present invention that the signal dividing assembly is embodied as a quadrature hybrid. Alternatively, the signal dividing assembly may be embodied as an equal phase power dividing device with a phase shift introduce into one branch as discussed above with regard to the signal combiner assembly.

Yet another feature of the present invention is the use of circulators as the first and second routing devices. It is preferable that the first and second routing devices are electrically matched however it is realized that the circulators may be tuned at assembly of the network. Alternatively, one may embody the first and second routing devices as directional couplers.

It will be appreciated that any combination of the above noted embodiments of the signal dividing assembly, the signal combiner assembly, and the routing devices may be used. Since two different examples of embodiments are discussed for each of the three components, the signal dividing assembly, the signal combiner assembly, and the two signal routing devices, one will observe this yields eight combinations of embodiments of these components, the explicit recitation of which is unnecessary as such combinations art to be understood from this explanation.

In a preferred embodiment of the present invention the antenna assembly is a circularly polarized antenna structure and the feed signal phase difference is approximately 90 degrees. Such an antenna may be embodied as a microstrip patch, however other constructions are optionally used in the practice of the invention.

It is a further feature of the present invention that in the signal combiner assembly the first and second reflected feed signals are phase shifted relative to one another to approximately 180 degrees within a tolerance of +/−36.9 degrees and to approximately same amplitude levels are within a tolerance of +8.7 dB and −4.2 dB at to received signal output to substantially cancel each other. Preferably, the tolerances are +/−20.5 degrees and +3.8 dB and −2.6 dB. More preferably, the tolerances are +/−11.4 degrees and +1.9 dB and −1.6 dB.

It is a still further feature of the present invention that the first and second reflected feed signals substantially cancel each other such that a signal appearing at the received signal output produced by the transmission signal and in absence of the first and second received signals is at least 22 dB below a level of one of the first and second antenna feed signals. Preferably, this value will be at least 27 dB. Still more preferably, this value will be at least 37 dB. Alternatively, in a preferred arrangement the first and second reflected feed signals are provided at such amplitudes and phase relationships that they cancel each other so as to achieve a cancellation attenuation of 15 db or more, more preferably a cancellation attenuation of 25 dB or more is achieved, and still more preferably a cancellation of 35 or more is achieved. A cancellation attenuation of lower than 15 dB may also be achieved in the practice of the present invention and be sufficient for the application at hand.

It will also be understood that the present invention alternatively or additionally provides that the first and second transmission leakage signals are phase shifted relative to one another to approximately 180 degrees within a tolerance of +/−36.9 degrees and to approximately same amplitude levels are achieved within a tolerance of +8.7 dB and −4.2 dB at the received signal output to substantially cancel each other. Preferably, the tolerances are +/−20.5 degrees and +3.8 dB and −2.6 dB. More preferably, the tolerances are +/−11.4 degrees and +1.9 dB and −1.6 dB. Alternatively, in a preferred arrangement the first and second transmission leakage signals are provided at such amplitudes and phase relationships that they cancel each other so as to achieve a cancellation attenuation of 15 db or more, more preferably a cancellation attenuation of 25 dB or more is achieved, and still more preferably a cancellation of 35 or more is achieved. A cancellation attenuation of lower than 15 dB may also be achieved in the practice of the present invention and be sufficient for the application at hand.

The present invention includes either one or the other of the above referenced cancellation of the reflected signals or cancellation of the transmission leakage signals being achieved by embodiments of the present invention or both being simultaneously achieved.

The present invention includes the above described antenna feed network as a separate device for use with an antenna assembly, a transmitter, and a receiver. In a preferred application the antenna feed network is used in a full duplex system. The antenna feed network has a transmission signal input for receiving a transmission signal from the transmitter, first and second antenna ports for outputting first and second antenna feed signals to the antenna assembly, and a receiver output for outputting a received signal to the receiver. A signal dividing assembly receives the transmission signal from the transmission signal input and divides the transmission signal into first and second divided transmission signals. A first routing device has a first port, a second port and a third port, the first routing device routes the first divided transmission signal applied to the first port, to the second port which is connected to the first antenna port and outputs the first divided transmission signal as the first antenna feed signal while passing a portion of the first divided transmission signal to the third port as a first transmission leakage signal. The first routing device has the second port connected to the first antenna feed port to accept first antenna signals including any first received signal present and a first reflected feed signal simultaneously with each other during full duplex operation, and routes the first antenna signals to the third port simultaneous with the first antenna feed signal being applied to the first antenna port to operatively drive the antenna assembly during duplex operation. A second routing device has a first port, a second port and a third port, the second routing device routes the second divided transmission signal applied to the first port, to the second port which is connected to the second antenna port and outputs the second divided transmission signal as the second antenna feed signal while passing a portion of the second divided transmission signal to the third port as a second transmission leakage signal. The second routing device has the second port connected to the second antenna feed port to accept second antenna signals including any second received signal present and a second reflected feed signal simultaneously and routes the second antenna signals to the third port simultaneous with the second antenna feed signal being applied to the second antenna port to operatively drive the antenna assembly in order to effect the preferred full duplex operation.

A signal combiner assembly has first and second combiner inputs and a received signal output connected to the receiver output to deliver the received signal thereto. The first and second combiner inputs are respectively connected to the third ports of the first and second routing devices, the signal combining assembly being configured such that at least a portion of any of the first and second received signals respectively present at the first and second combiner inputs is directed to the received signal output to provide the received signal, and such that the first and second transmission leakage signals are phase shifted relative one another to within a range of 180 degrees and are at amplitude levels within a such a range of one another as to effect substantial cancellation of each other at the received signal output. Additionally, the antenna feed network optionally includes a configuration wherein in the signal combiner assembly completes electrical lengths from the first and second antenna feed ports to the received signal output are phase shifted relative one another within a range of 180 degrees to effect substantial cancellation of the first and second reflected feeds signals. Furthermore, the antenna feed network of the present invention may optionally be configured to effect said substantial cancellation of the first and second reflected feed signals without effecting the substantial cancellation of the first and second transmission leakage signals. The antenna feed network is optionally configured to effect the cancellation levels of the transmission leakage signals and the reflected feed signals noted above for the wireless communication device specified as either an attenuation below a level of one of the first and second antenna feed signals or as a cancellation attenuation which is defined to be the reduction in the level of two signals as combined, that is effected by cancellation interaction of the two signals, relative a level of completely constructive addition of the two signals.

Another aspect of the present invention includes a patch antenna including a ground plane and a conductive planar area disposed a first predetermined distance apart from the ground plane. In an embodiment of the invention the conductive planar area is optionally circular but the scope of the invention is not so limited. First and second conductors connected to the conductive planar area at positions disposed apart on a first virtual bisecting line passing through an area center of the conductive planar area. Each of the first and second conductors are connected a first distance from an area center of the conductive planar area. The first and second conductors extend through corresponding apertures in the ground plane and the first conductor is connected to an antenna input feed and applies a drive signal to the antenna. The second conductor has a first tuning element connected thereto. The first tuning element is at least one of an open circuit stub, a short circuit stub, a capacitor, and an inductor. Thus, a stub alone may be used to tune the antenna or a stub in combination with a capacitor or an inductor maybe used to tune the antenna. Electronically controlled tuning devices may also be used to tune the antenna using application of voltage or current control signals.

The present invention further includes the above described patch antenna additionally including a third conductor connected to the conductive planar area and disposed on a second virtual bisecting line passing through the area center of the conductive planar area and oriented orthogonal to the first virtual bisecting line. The third conductor is spaced the first distance from the area center and extends through a corresponding aperture in the ground plane. The third conductor is connected to an antenna input feed and applying another drive signal to the antenna.

The present invention optionally includes the patch antenna according described above further comprising a fourth conductor connected to the conductive planar area and disposed on the second virtual bisecting line, the fourth conductor being spaced the first distance from the area center and apart from the third conductor, and the fourth conductor extending through an aperture in the ground plane and having a second tuning element connected thereto.

Still further, the present invention provides the optional feature embodying the second tuning element as at least one of an open circuit stub, a short circuit stub, a capacitor, and an inductor, as recited for the first tuning element and not necessarily the same embodiment as that of the first tuning element.

Further features of the present invention include antenna leakage cancellation configurations which compensate for leakage in the antenna assembly arising from the configuration of the antenna assembly producing a third transmission leakage signal, at the first feed input, which is a portion of the second antenna feed signal and has an amplitude equal to an amplitude of the second antenna feed signal multiplied by H and a phase shift $-\phi H$ relative to the second antenna feed signal, and further producing a fourth transmission leakage signal, at the second feed input, which is a portion of the first antenna feed signal and has an amplitude equal to an amplitude of the first antenna feed signal multiplied by H and a phase shift $-\phi H$ relative to the first antenna feed signal.

A first embodiment of an antenna leakage cancellation configuration includes a reflector device applied in a connection line between the second port of the first routing device and the first feed input of the antenna assembly and configured to have a reflection coefficient X to reflect into the second port of the first routing device a portion of the first antenna feed signal as a reflected signal of amplitude equal to an amplitude of the first antenna feed signal multiplied by X and relative phase shift $-\phi X$. The first routing device receives the reflected signal and the third transmission leakage signal at the second port and produces, simultaneously at the third port a reflected output signal and a third transmission leakage output signal. The second routing device receives the fourth transmission leakage signal at the second port and produces, simultaneously at the third port a fourth transmission leakage output signal. Finally, the signal combiner has the first and second combiner inputs respectively receiving the third and forth transmission leakage output signals, and the first combiner input receiving the reflected output signal. The signal combiner is so configured as to combine the reflected output signal at the transmission signal output with the third and fourth transmission leakage output signals to effect substantial cancellation of the third and fourth transmission leakage output signals wherein the configuration of the reflector device is set to have a reflection coefficient equal to X and the relative phase $-\phi X$ so as to effect the substantial cancellation of the third and fourth transmission leakage output signals.

The first embodiment of an antenna leakage cancellation configuration includes X being set substantially equal to 2H and $-\phi X$ being set substantially equal to $(-90-\phi H-\phi 4+\phi 6)$ wherein:

$\phi 4$ is a net electrical length of a first connecting line connecting the second port of the first routing device to the first feed input;

$\phi 4$ is a net electrical length of a second connecting line connecting the second port of the second routing device to the second feed input; and $\phi 6$ is a net electrical length of a portion of the first connecting line between the reflecting device and the second port of the first routing device.

A second embodiment of an antenna leakage cancellation configuration is constructed and functions as does the second embodiment with the exception that the reflector device is applied in a connection line between the second port of the second routing device and the second feed input of the antenna assembly.

A third embodiment of an antenna leakage cancellation configuration is constructed as a combination of the first and second embodiment and has a first reflector device applied in a connection line between the second port of the first routing device and the first feed input of the antenna assembly, and a second reflector device applied in a connection line between the second port of the second routing device and the second feed input of the antenna assembly so as to effect an imbalance resulting in cancellation of the third and fourth transmission leakage output signals.

The reflector devices in the above cancellation configurations are an open stub, a shorted stub, or a reactive component selected from the group consisting of a capacitor and an inductor.

Further features of the present inventions include a wireless communication device configuration for effecting two way wireless communication, comprising of an antenna assembly, an RF source producing an RF transmission signal, a receiver effecting two way duplex wireless communications, a modulation source producing first and second modulation signals, and an antenna feed network interconnecting said transmitter, said receiver, said modulation source and said antenna assembly. The modulation source produces a first and second modulation signal and, when present, are applied to a first and second RF signal modulators receiving said first and second divided RF transmission signals. The first and second RF signal modulators are placed between the signal divider and signal routing devices to provide modulation of the divided RF transmission signal.

The above, and other objects, features and advantages of the present invention will become apparent from the following description read in conjunction with the accompanying drawings, in which like reference numerals designate the same elements. The present invention is considered to include all functional combinations of the above described features and is not limited to the particular structural embodiments shown in the figures as examples. The scope and spirit of the present invention is considered to include modifications as may be made by those skilled in the art having the benefit of the present disclosure which substitute, for elements presented in the claims, devices or structures upon which the claim language reads or which are equivalent thereto, and which produce substantially the same results associated with those corresponding examples identified in this disclosure for purposes of the operation of this invention. Additionally, the scope and spirit of the present invention is intended to be defined by the scope of the claim language itself and equivalents thereto without incorporation of structural or functional limitations discussed in the specification which are not referred to in the claim language itself.

DETAILED DESCRIPTION OF THE INVENTION

Figure 2A:
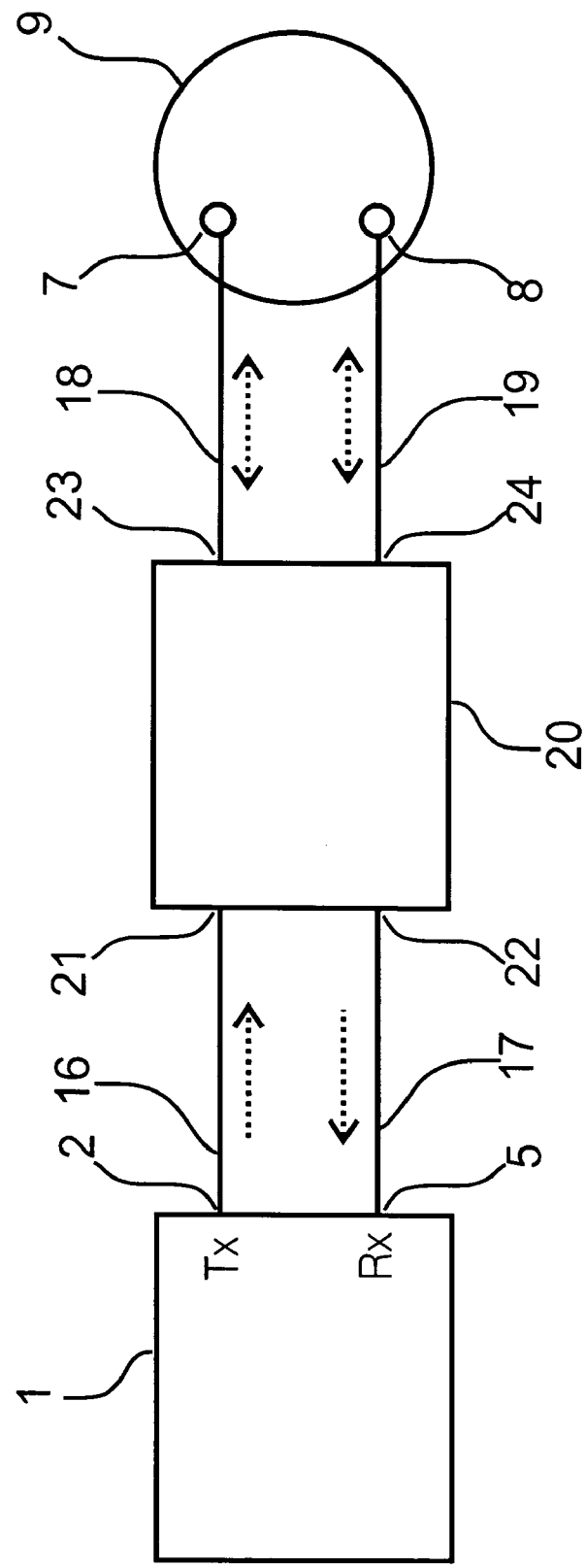
FIG. 2A is a diagram of an embodiment of a transceiver system using a single antenna of the present invention.

Referring to FIG. 2A, an antenna feed network 20 is connected between a full duplex transceiver 1 and a CP antenna 9. The full duplex transceiver 1 has a transmitter output 2 and a receiver input 5. The antenna feed network 20 has a transmit channel input 21, a receive channel output 22 and first and second bi-directional network antenna ports 23 and 24 for connection to the CP antenna 9. The CP antenna 9 contains a first antenna feed point 7 and a second antenna feed port 8.

The example of the present invention shown in FIG. 2A is a preferred embodiment utilizing a CP antenna having two feeds as an antenna assembly; it is however understood that for the purpose of this disclosure an antenna assembly is considered to include two antennas, either disposed independent of one another or in a combined structure, may be substituted for the CP antenna 9, to present two feeds provided that the two antennas function together to have input characteristics wherein input and output signals have a predetermined phase offset. Such paired antennas may be embodied as cross-polarized dipoles or quadrifilar helix. Paired antennas producing circular polarization can be created with asymmetries in the antenna geometry or using a dual-feed antenna where each feed port is driven with a signal of equal amplitude and 90 degrees phase difference (quadrature). Paired antennas which present linearly polarized wavefronts may be used and generally have 180 degree phase offsets associated with the input and output feeds.

The antenna feed network 20 receives a transmission signal at the transmit channel input 21 via a transmitter connection line 16 from the transmitter output 2 of the transceiver 1. The transmitter connection line 16 and all other connection lines discussed herein, unless specifically noted otherwise, can be any form of transmission line embodiment of which examples include microstrip, stripline or coax or other form of transmission line that allows propagation of the RF energy. Furthermore, the connection lines recited herein need not all be of the same type of transmission line embodiment unless so stated. Additionally, while connection lines are shown interconnecting components, components may be directly connected to each other in the sense that a physically significant transmission line between the components may be omitted. Such modifications may be made provided that the underlining electrical characteristics regarding impedance matching and signal transmission and reflection operate as disclosed herein.

The antenna network 20 splits the transmission signal received at the input port 21 from the transmitter output 2 into two substantially equal amplitude signals with a predetermined phase relationship. In a preferred embodiment the phase relationship is a −90-degree phase relationship (quadrature). The antenna feed network 20 outputs the signals from the first and second network antenna ports 23 and 24. The signals are delivered to a first antenna feed port 7 and a second antenna feed port 8 respectively via first and second antenna connection lines 18 and 19. As noted above, the connection lines can be any form of transmission line.

It is preferable that the first and second antenna feed ports, 7 and 8, have similar electrical properties and this is assumed in the example of this description. Ideally, the electrical characteristics are identical however practical limitations to such matching are recognized and accepted. Examples of such properties are those input impedance properties found in a microstrip patch antenna, crossed-polarized dipoles or quadrifilar helix. The antenna feed port 7 and antenna feed port 8 may be directly connected or coupled to the same antenna element such as the case in a microstrip patch antenna. Antenna feed port 7 and antenna feed port 8 may also be connected or coupled to two independent antennas such as the case using cross-polarized dipoles, two separate patch antennas that are orthogonally positioned above a ground plane, or two separate microstrip patches orthogonally positioned. These are examples of antenna embodiments which utilized quadrature inputs. The present invention is not limited to such examples and may employ other known or presently unknown antenna designs which function in an electrically compatible manner with the antenna network 1 described herein, In an idealized theoretical model, the CP antenna 9 completely radiates the transmission signal into the surrounding environment. However, because of electrical mismatch between the antenna connecting lines 18 and 19 and the antenna feed ports, 7 and 8, a portion of the transmission signal will be reflected from the antenna feed ports, 7 and 8, and reenter the antenna connecting lines 18 and 19 and then reenter the antenna feed network 20 at the first and second ports 23 and 24. If the antenna connecting lines 18 and 19 are effectively nonexistent where direct connection to the antenna feed network 20 is made, the reflected portion of the transmission signal will simply reenter the antenna feed network 20. In the present invention the reflected signals are terminated inside the antenna feed network 20 or so separated from a signal received by the antenna 9 so as to significantly attenuate at the receive channel output 22. Therefore transmission signals reflected from the CP antenna 9 are effectively isolated from the receiver's input 5 when the transceiver 1 operates in full duplex mode.

Figure 2B:
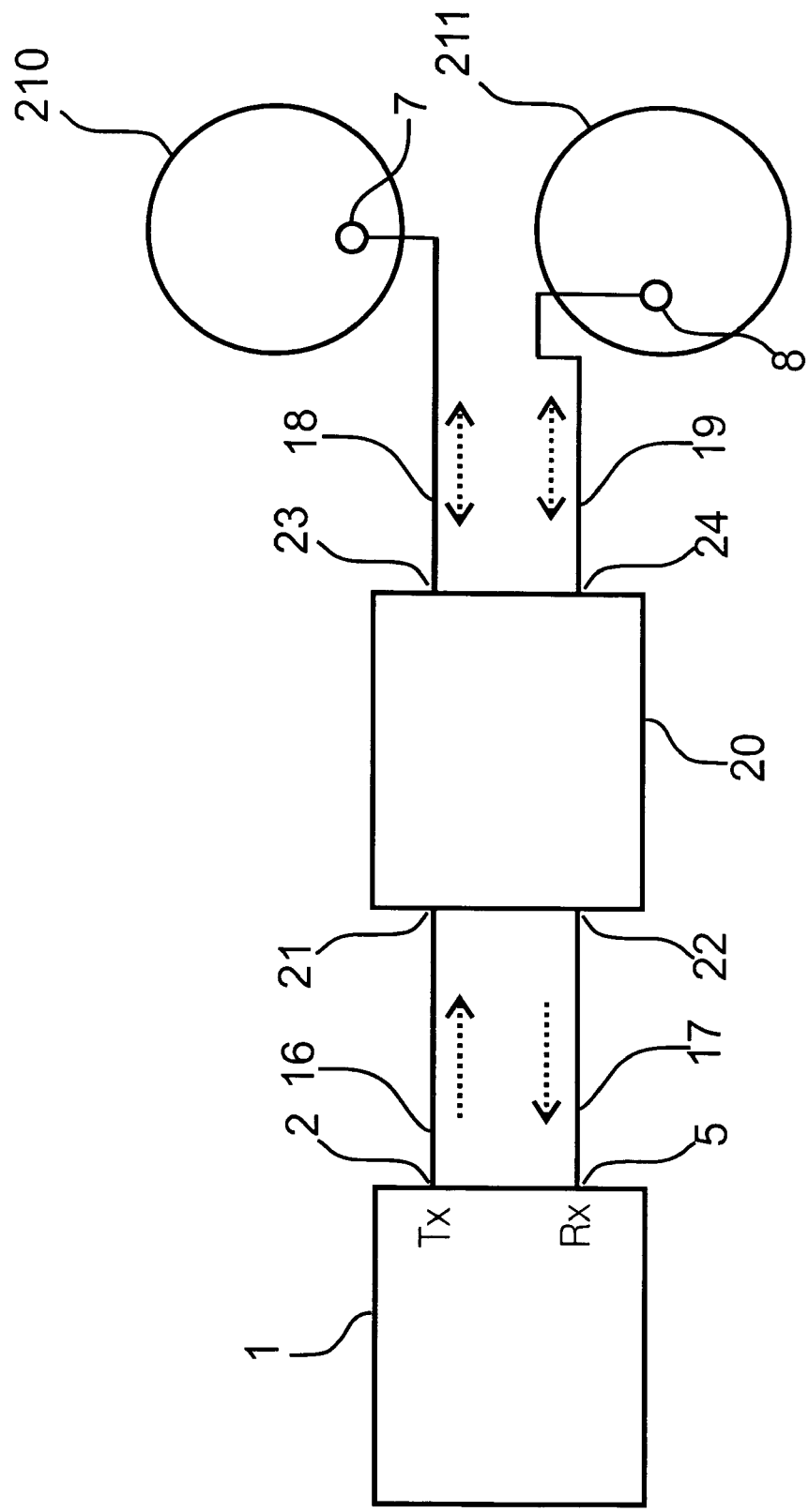
FIG. 2B is a diagram of an embodiment of a transceiver system using two separate antennas of the present invention.

Referring to FIG. 2B, an embodiment of the present invention is shown wherein an antenna assembly includes two separate antennas 210 and 211 each having a feed in place of the CP antenna 9 shown in FIG. 2A. Antenna feed port 7 and antenna feed port 8 are connected or coupled to the separate antennas 210 and 211. The two antennas 210 and 211 are optionally embodied as any two antenna accepting feeds with a predetermined phase difference between the feeds for radiating energy. Additionally, the antennas 210 and 211 may be supported independently or commonly supported on a base or in a housing, but are to be understood to constitute an antenna assembly for the purpose of being assembled together to connect to the antenna feed network 20.

Figure 3A:
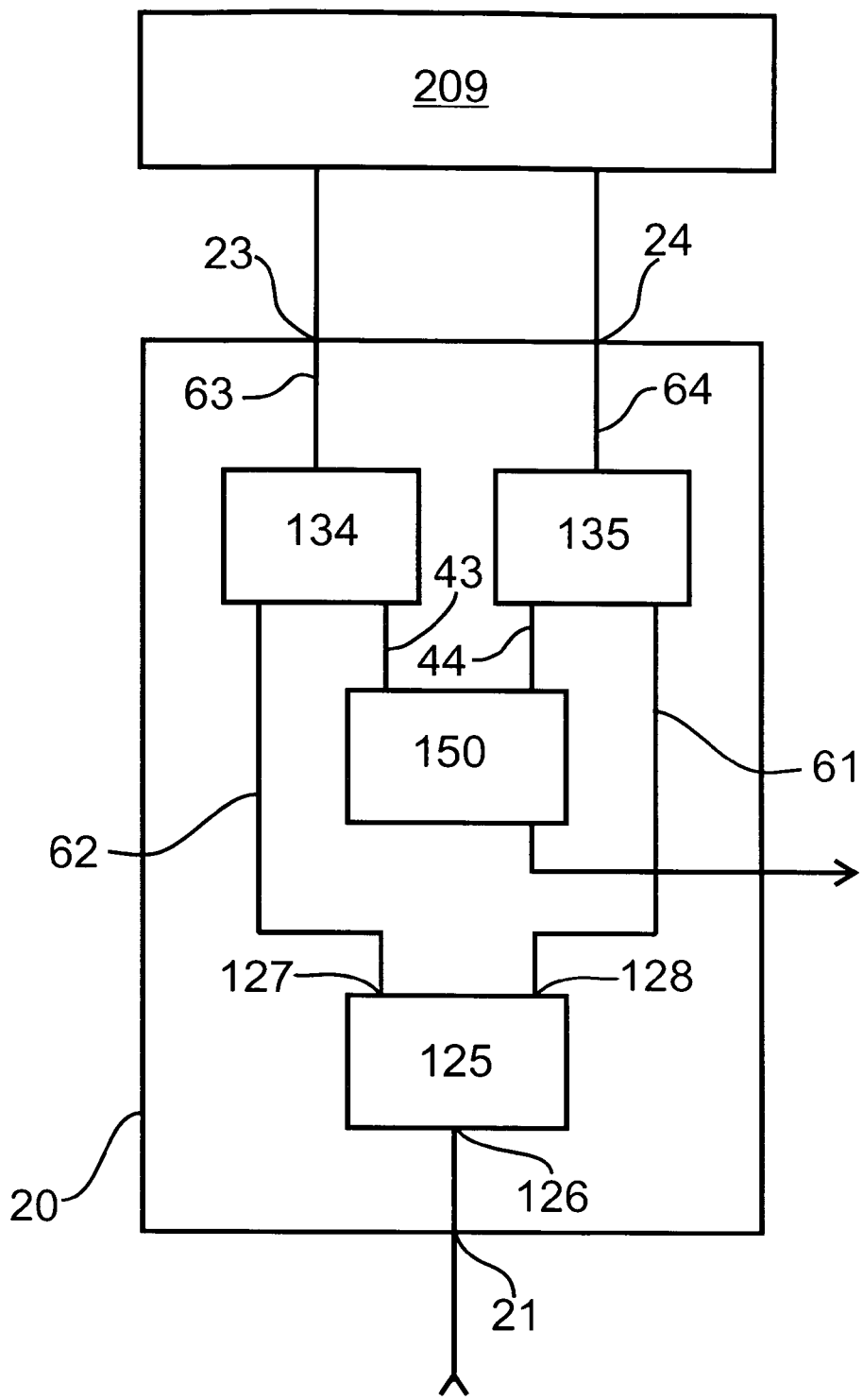
FIG. 3A is a diagram of an embodiment of the transceiver system.

Referring to FIG. 3A, an example of a generalized construction of the antenna feed network 20 is shown. The transmission signal is received at the transmit channel input 21 and routed to a signal dividing assembly 125 which divides the transmission signal into first and second divided transmission signals output at ports 127 and 128 and having substantially equal amplitudes and a first relative phase shift therebetween. The signal dividing assembly 125 is any of a quadrature hybrid, or an equal phase power splitter, e.g., a Wilkinson power splitter, a resistive divider a T-junction or a reactive T, with a phase shift network applied to one output, or other device so functioning to divide a signal.

The first and second divided signals are routed to first and second routing devices, 134 and 135, each having at least first, second and third ports. The divided signals enter the first ports and are routed to the second ports, the outputs of which are applied to the first and second antenna ports, 23 and 24, feeding the divided signals to the antenna assembly 209 as antenna feed signals having a requisite phase shift for the antenna assembly 209. Received signals from an antenna assembly 209 enter at the first and second antenna ports, 23 and 24, are routed to the second ports of the routing devices, 134 and 135, which direct the signals out from the third ports and to a signal combiner assembly 150. The routing devices are preferably matched circulators which provide some degree of isolation between the first ports and the third ports. Alternatively, the routing devices, 134 and 135, are directional couplers.

The first and second routing devices, 134 and 135, are devices intended to transfer a first signal from the first port to the second while simultaneously transferring another second signal entering the second port to the third while preventing the first signal from appearing at the third port. This is the idealized concept of such a routing device. However, in actual embodiments some of the first signal undesirably leaks through to the third port. The amount is this leakage is characterized by the isolation of the device wherein the greater the isolation (measured generally in dBs) is the higher the isolation value is. For the purposes of this disclosure the routing devices are characterized by transmission coefficients including:

s21 being a transmission coefficient from the first port to the second port;

s32 being a transmission coefficient from the second port to the third; and s31 being a transmission coefficient from the first port to the third port; wherein s21 is greater than s31, and s32 is greater than s31.

For the purposes of this disclosure intended signal transfers are considered transfers at functionally operative levels meaning a level at which the signals transferred effect a desired function in the application of the device. Hence, applying this terminology to a simple switch transferring a signal, when the switch is on it would transfer a signal from an input to an output at a functionally operative level. If the switch is off, some leakage may occur resulting in a portion of the signal appearing at the output, this portion of the signal would not be considered to be at a functionally operative level since it would be attenuated to a level not intended to effect operation and not effecting a desired operation.

The signal combiner assembly 150 has first and second combiner inputs and a received signal output connected to the receiver. The first and second combiner inputs are respectively connected to the third ports of the first and second routing devices, 134 and 135, to accept the received signals from the antenna assembly 209. The signal combining assembly 150 introduces a phase shift into signals applied to at least one of the first and second combiner inputs such that the received signals from the antenna assembly 209 are combined substantially in phase to produce the received signal at a received signal output which connects to the receiver. Reflected feed signals are substantially phase shifted relative one another 180 degrees at the received signal output to substantially cancel each other. Similarly, transmission leakage signals which leak from the first ports to the third ports of the routing devices, 134 and 135, are substantially phase shifted relative one another 180 degrees at the received signal output to substantially cancel each other. The signal combining assembly 150 may be a quadrature hybrid, or an equal phase power splitter, e.g., a Wilkinson power splitter/combiner, a resistive divider, a T-junction or a reactive T, with a phase shift network applied to one of two inputs.

In the antenna feed network 20, connecting lines 61, 62, 63, 64, 43 and 44 interconnect the components and are described in more detail below. It is understood that components may be directly connected to each other and connecting lines omitted where feasible. In the preferred embodiment connecting lines 61 and 62 are electrically matched, connecting lines 63 and 64 are electrically matched, and connecting lines 43 and 44 are electrically matched. However, it will be understood that it is not necessary that each of these pairs of lines be matched provided that overall phase shifts of and attenuations of signals are such that the antenna feed signals have the requisite phase shift at the antenna assembly 209 for the assembly used, and the received signals from the antenna assembly 209 are combined substantially in phase to produce the received signal at the received signal output.

In order to provide adequate transmit channel to receive channel isolation, the overall phase shifts and insertion losses of the connecting lines or equivalents should present the reflected feed signals from the antenna 209 at approximately equal amplitude and shifted relative one another about 180 degrees at the received signal output to substantially cancel each other. Still further, it is desirable that the overall phase shift and insertion loss introduced by connecting lines 61, 62, 43 and 44, or their equivalents, present the transmission leakage signals of substantially equal amplitude and phase shifted relative one another about 180 degrees at the received signal output to substantially cancel each other.

In the preferred embodiment discussed below, improved isolation of the antenna feed network 20 is achieved by the effective cancellation of both the reflected feed signals and the transmission leakage signal at the received signal output. However, effective cancellation of at least one of these undesired signals is also considered to be a feature of the present invention. The phase shifting of these undesired signals to effect cancellation should be such that transmit to receive isolation of at least 25 dB is achieve over a frequency range associated with the system use. More preferably, the insertion losses and phase shifts should effect matching resulting in at least 30 dB, or at a further preferred level of at least 35 dB isolation over the frequency range. Still more preferably, the insertion losses and phase shifts should effect matching resulting in at least 40 dB isolation over the frequency range. Matching tolerances and effectiveness are discussed below.

It will be additionally appreciated from this disclosure that the phase shifts discussed herein are relative between the respective signals discussed and do not include multiples of 360 degrees electrical length difference that may exist in one connection over another. In other words and as merely an example, for the purposes of this disclosure, unless noted otherwise, a phase shift of 360 degrees or multiples thereof between signals is not considered to be a portion of a relative phase shift. Hence, a signal which is shifted 450 degrees relative another signal, is considered to be shifted 90 degrees for the purposes of this disclosure. Accordingly, it is understood that relative shifts and limitations related thereto recited herein do not exclude the addition of integer multiples of 360 degrees unless specifically stated. While it is preferable that electrical length differences of greater than 360 degrees are not introduced, such difference are not considered to be outside the scope of the present invention.

It will also be appreciated in view of this disclosure that practical production tolerances will result in slight differences in electrical characteristics between the connecting lines, between the antenna feed ports, and between the first and second routing devices. Tuning elements and/or phase adjustment may be inserted along any connecting line in order to adjust the amplitude and phase of the signal traveling along the line. Tuning the signal may improve the isolation between the transmit channel and receive channel by compensating for any differences between the signal paths and components. Such tuning elements may include stubs or lumped components or other devices as are known by those skilled in the art. Additionally, for the purposes of this disclosure and claims and unless stated otherwise in the pertinent claims, the connecting lines shown interconnecting components are not intended to exclude insertion of other components in those connecting lines for tuning or other purposes provided that the cancellation of at least one of the reflected feed signal or the transmission leakage signals, and preferably both, are achieved at the signal combining assembly 150. As previously noted, such tuning elements may be electronically controlled.

Figure 3B:
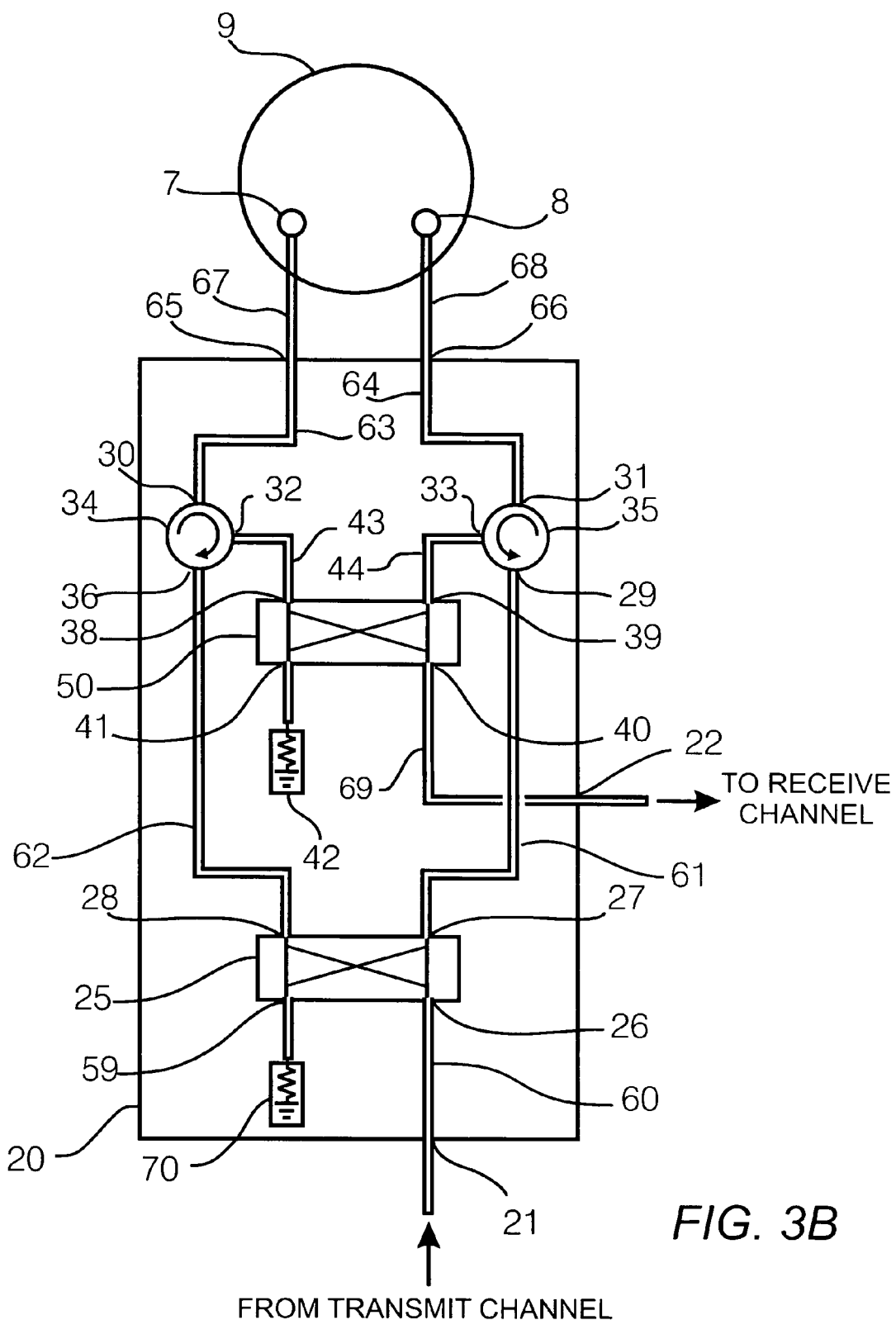
FIG. 3B is a diagram of an embodiment showing details of the antenna feed network.

Referring to FIG. 3B, details of a preferred embodiment of the present invention are described herein wherein the generalized internal components of the antenna network 20 as disclosed above are embodied in devices used in implementation of the preferred embodiment. It is understood that the above discussion with relation to the generalized components and interconnections shown in FIG. 3A applies to the preferred embodiment shown in FIG. 3B.

In FIG. 3B the antenna feed network 20 is connected to the CP antenna 9 through the antenna feed point 7 and antenna feed point 8 using antenna connecting line 67 and antenna connecting line 68 respectively. Connecting lines are typically transmission lines using coaxial, microstrip, stripline or other form of transmission line that functions to allow propagation of the RF energy. The antenna feed network 20 uses two quadrature hybrids, input quadrature hybrid and output quadrature hybrid, 25 and 50, and first and second circulators, 34 and 35, connected in such a way as to prevent unwanted transmission energy from the transmitter from entering the receiver. The input quadrature hybrid and output quadrature hybrids, 25 and 50, need not be of the same construction but the first and second circulators, 34 and 35, are preferably of the same construction and are more preferably electrically matched. If dictated by physical constraints of the application, the first and second circulators, 34 and 35, need not be physically identical, e.g., they may be mirror images or otherwise physically differ, but the first and second circulators, 34 and 35, are preferably electrically matched.

Figure 1:
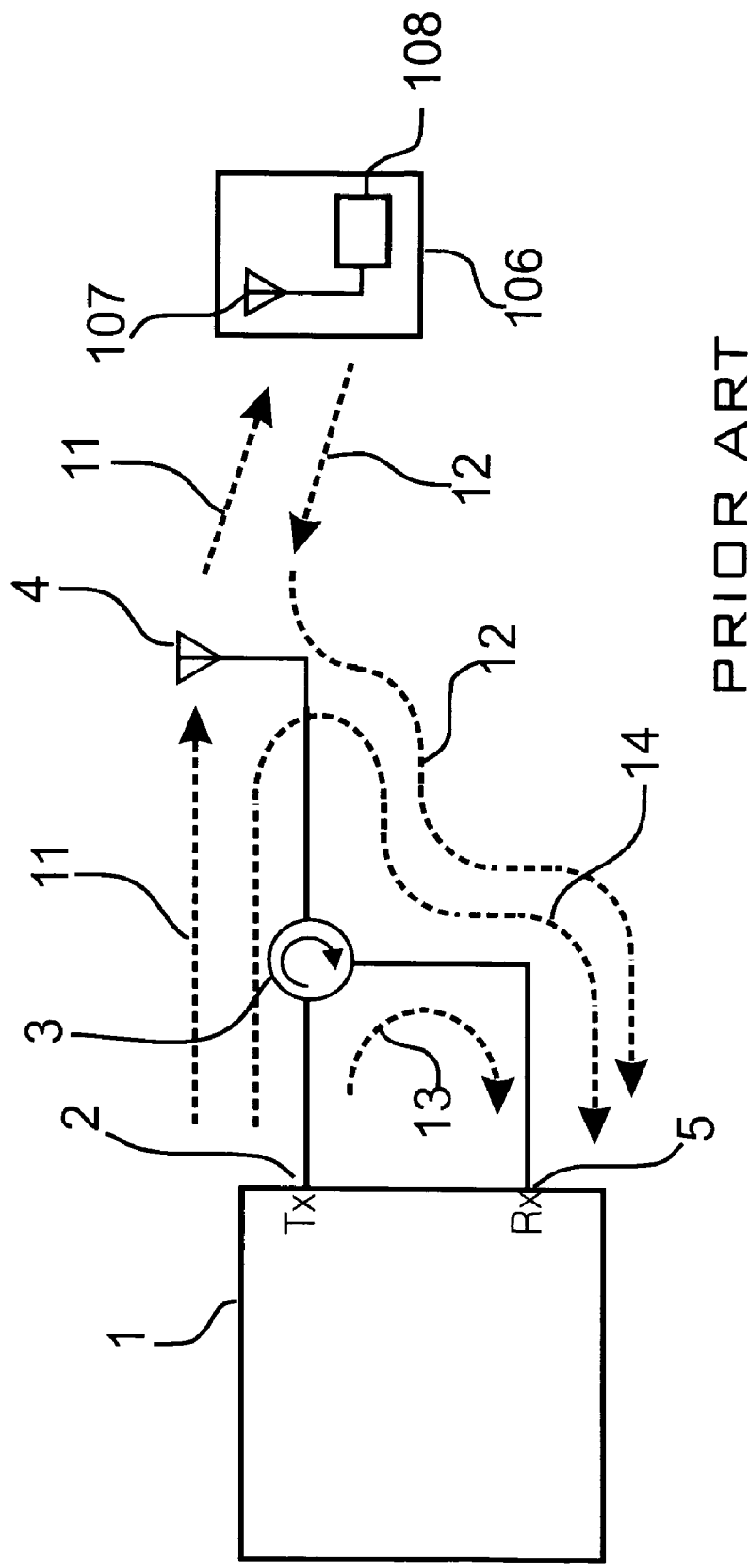
FIG. 1 is a prior art diagram of a complete RFID transceiver system and RFID tag showing signal paths for desired and undesired signals that enter the receiver.

The transmit channel from the transmitter output 2 shown in FIG. 1 is connected to the transmit channel input 21 of the antenna feed network 20. The receive channel is connected to output port 22 of the antenna feed network 20. The transmission signal enters transmit channel input 21, travels along transmission signal input connecting line 60 and enters an input port 26 of the input quadrature hybrid 25. This signal that enters the input quadrature hybrid 25 is split into two substantially equal amplitude signals with quadrature phase. One half of the signal input leaves port 28 with a relative phase of 90 degrees in relation to another half of the signal input that leaves through port 27. One half of the signal travels down connecting line 62 and enters port 36 of the first circulator 34. An isolated port 59 of the quadrature hybrid 25 is terminated with a termination 70 in order to absorb any reflected energy that may be coming from port 36 of first circulator 34 and port 29 of second circulator 35.

Rotation of the first circulator 34 is shown as clockwise which implies that a signal entering port 36 will leave through port 30 of the first circulator 34. This signal continues along connecting line 63 until it leaves first network antenna port 65 (corresponding to the 23 first network antenna port of FIG. 2A) for the antenna feed network 20.

The first network antenna port 65 may be directly connected to the first antenna feed port 7 or may be connected using a further antenna connecting transmission line 67. Due to impedance discontinuities between the connecting line 63, antenna connecting line 67 and the first antenna feed port 7 as well as other mismatch effects along the transmission path, some energy will be reflected back along connecting line 63 towards the circulator port 30. This reflected energy enters port 30 of first circulator 34 and leaves through the circulator port 32. This reflected energy travels along connecting line 43 and enters the output quadrature hybrid 50 at port 38. This signal is split into two substantially equal amplitude signals in quadrature phase. One half of the reflected signal is delivered to isolated port 41 and a second half is delivered to output port 40 with about a −90-degree relative phase shift.

The second half of the signal derived from the transmission signal leaves port 27 of quadrature hybrid 25, propagates down connecting line 61 and enters port 29 of the second circulator 35. Rotation of the second circulator 35 is shown as counter-clockwise which implies that the signal entering the port 29 will leave through port 31. This signal continues along feed line 64 and leaves port 66 of the antenna feed network 20.

The second network antenna port 66 may be directly connected to the second antenna feed port 8 or may be connected using a further antenna connecting transmission line 68. Impedance discontinuities between the connecting line 64, antenna connecting line 68 and the antenna feed port 8 as well as other mismatch effects along the transmission path produce reflection of some energy back along the feed line 64 towards the circulator port 31. This reflected energy enters port 31 of second circulator 35 and leaves through the circulator port 33. This reflected energy travels along connecting line 44 and enters the output quadrature hybrid 50 at port 39. This signal is split into two equal amplitude signals in quadrature phase. One half of the signal is delivered to the output port 40 and a second half is delivered to isolated port 41 with a −90-degree relative phase shift.

When the electrical performance of the two antenna feed ports 7 and 8 are similar, it is shown below that reflected energy from the first antenna feed point 7 and from the second antenna feed point 8 will result in two substantially equal amplitude signals appearing at the isolated port 41 and two substantially equal amplitude signals at output port 40. It is also shown that the phase relationship between these signals will result in signal addition at the isolated port 41 and signal cancellation at the output port 40. Therefore any reflected energy is consumed in termination 42 connected to isolated port 41 and no reflected energy is delivered to output port 40. The output port 40 is connected to the receiver channel through connecting line 69 and the receive channel output port 22. This circuit arrangement provides high isolation of antenna reflections from the transmit channel to the receive channel. In other words, portions of the transmission signal which are reflected at the antenna 9 are significantly reduced at the receive channel output port 22 and therefore do not appreciably diminish receiver performance.

It will be understood by those skilled in the art in view of this disclosure that the rotation of first circulator 34 and second circulator 35 in FIG. 3B was chosen for clarity in the diagram and that the rotation direction of the first and second circulators, 34 and 35, can be changed as long as the interconnecting lines are appropriately arranged to route the signals as described above.

Furthermore, it is to be understood from this disclosure that electrical characteristics of the routing of the transmission signals from the output ports 28 and 27 to the first and second antenna ports, 7 and 8, and the reflected portions to the ports, 38 and 39, of the output quadrature hybrid 50, are to be electrically similar and are preferably matched such that the amplitude and phase relationship of the reflected portions substantially conform to the mathematical description presented below. For example, the pair of connecting lines, 62 and 61, preferably have substantially equal electrical length and impedance in order to maintain the quadrature relationship developed by the input quadrature hybrid 25. Additionally, the pair of connecting lines, 63 and 64, preferably have substantially equal electrical length and impedance in order to maintain the quadrature relationship developed by the input quadrature hybrid 25. Still further, the pair of antenna connecting lines, 67 and 68, preferably have substantially equal electrical length and impedance in order to maintain the quadrature relationship developed by the input quadrature hybrid 25. Also, the pair of connecting lines, 43 and 44, preferably have substantially equal electrical length and impedance in order to maintain the quadrature relationship developed by the input quadrature hybrid 25. It also follows that the first and second circulators 34 and 35 preferably have approximately the same electrical performance in both amplitude and phase in order to maintain the quadrature relationship developed by the input quadrature hybrid 25.

The antenna feed network as shown in FIG. 3B develops a 90 degree phase difference between antenna feed ports 7 and 8 with the phase of antenna port 7 lagging the phase of antenna port 8. Depending on which direction the CP antenna is pointing, the CP antenna will create either a clockwise or counterclockwise rotation of the electromagnetic wave as the signal propagates away from the antenna. Accepted terminology in the art is that a wave approaching that rotates in the clockwise direction is referred as having left circulator polarization. If the rotation is counterclockwise, then it is right circularly polarized. If it desired to create a CP antenna with the opposite sense of rotation for the electromagnetic wave, then providing a phase lag at antenna feed port 8 relative to antenna feed port 7 will create the necessary conditions. One way to accomplish the change in rotation is to switch the connecting lines 67 and 68 to feed antenna feed port 8 and 7 respectively. Alternately, switching connections to port 40 and 41 and also switching connections to ports 59 and 26 would change the rotation sense of the CP wave.

The CP antenna 9 will receive desired signals from the surrounding environment and these signals will be routed to the receiver input 5 through the antenna feed network 20. The amount of received signal delivered to the receiver input 5 is dependent on the polarization of the incoming electromagnetic wave. If the CP antenna 9 receives a CP signal with the same sense of circular polarization, the antenna feed ports 7 and 8 simultaneously produce signals and the antenna feed network 20 will add these two signals and output them at the output port 40, which is applied to the input 5 to the receiver. If the CP antenna 9 receives a CP signal with the opposite sense of circular polarization, then the signals will combine in the antenna feed network and be terminated in termination 42. If the CP antenna 9 receives a linearly polarized signal from the surrounding environment, the antenna feed ports 7 and/or 8 will produce the signal and a portion of this signal will appear at the output port 40 and a portion of this signal will appear at port 41 which will be terminated in the termination 42. Hence, in the situation where a similarly circularly polarized signal is received, both antenna feed ports 7 and 8 will produce signals. Where the signal received is not similarly polarized a signal may appear at only one of the two antenna feed ports, 7 and 8, or both of the antenna feed ports. However, in any of functional situations, at least a portion of a signal from at least one of the two antenna feed ports, 7 and 8, is produced at the output port 40 to be acted on by the receiver.

As previously discussed, signal reflections from the antenna feed ports 7 and 8 are terminated by the termination 42 and substantially no reflected energy is delivered to the receive channel output 22. Presented below is a mathematical analysis of the functioning of the present invention. It is realized that certain simplifications for modeling purposes are made in the analysis and such simplifications are not considered to impose constraints upon the practice of the present invention or the scope of the appended claims unless so related in the claims. Referring to FIGS. 4-7 and Table I presented below, amplitudes and phases for the various signals are discussed below.

TABLE I

| Signal | Amplitude | Phase |
|---|---|---|
| S1 | 1 | 0 |
| S2 | 1/sqrt(2) | −90 |
| S3 | 1/sqrt(2) | 0 |
| S4 | 1/sqrt(2) | −90 − $\phi_1$ |
| S5 | 1/sqrt(2) | −$\phi_1$ |
| S6 | 1/sqrt(2) | −90 − $\phi_1$ − $\phi_2$ |
| S7 | 1/sqrt(2) | −$\phi_1$ − $\phi_2$ |
| S8 | A/sqrt(2) | −90 − $\phi_1$ − $\phi_2$ − $\phi_A$ |
| S9 | A/sqrt(2) | −$\phi_1$ − $\phi_2$ − $\phi_A$ |
| S10 | A/sqrt(2) | −90 − $\phi_1$ − 2$\phi_2$ − $\phi_A$ |
| S11 | A/sqrt(2) | −$\phi_1$ − 2$\phi_2$ − $\phi_A$ |
| S12 | A/sqrt(2) | −90 − $\phi_1$ − 2$\phi_2$ − $\phi_A$ − $\phi_3$ |
| S13 | A/sqrt(2) | −$\phi_1$ − 2$\phi_2$ − $\phi_A$ − $\phi_3$ |
| S14 | A | −90 − $\phi_1$ − 2$\phi_2$ − $\phi_A$ − $\phi_3$ |
| S15 | 0 | |

Figure 4:
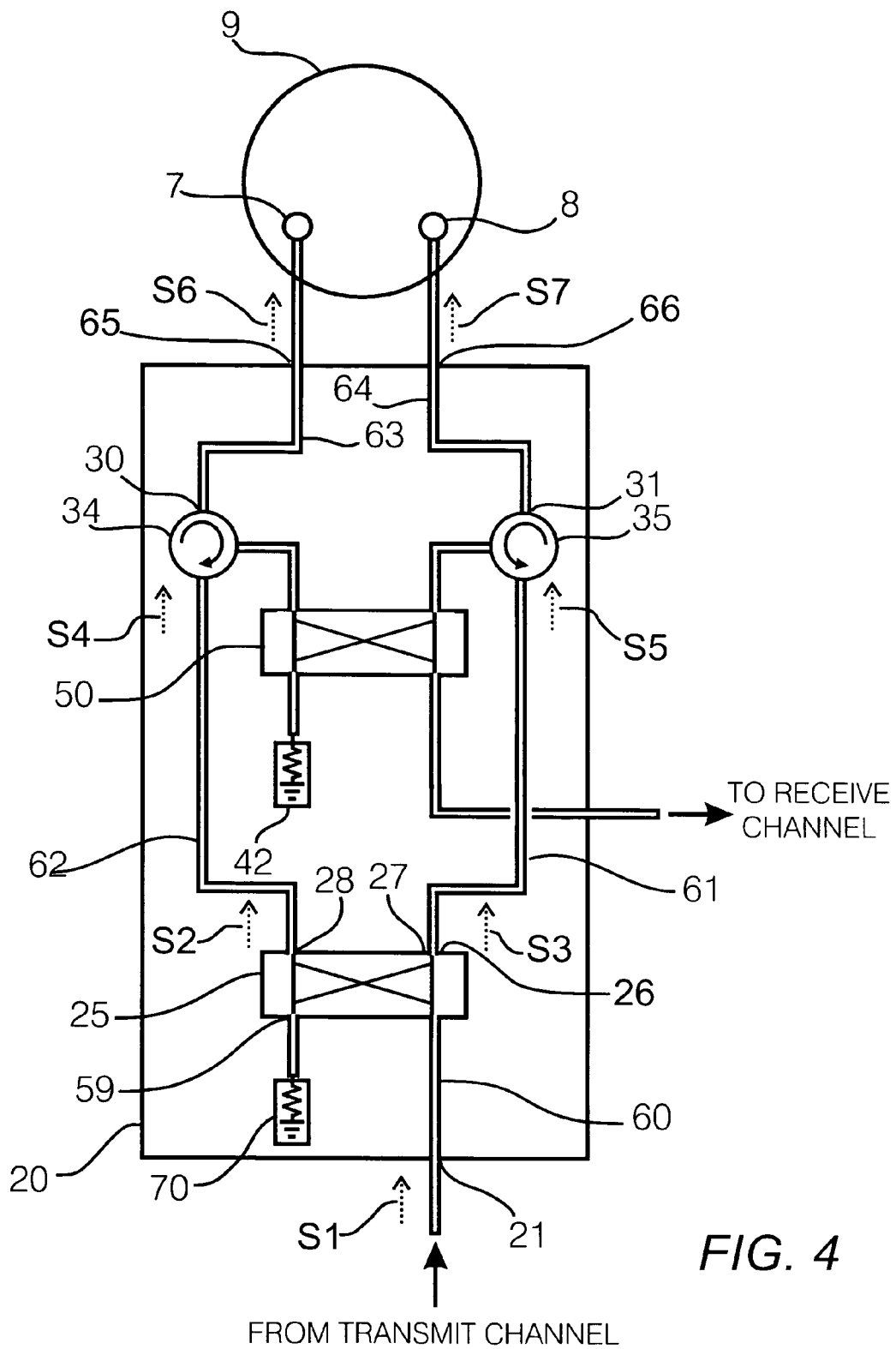
FIG. 4 is a diagram of an embodiment showing signal paths proceeding from the transmitter to the antenna feed ports.
Figure 5:
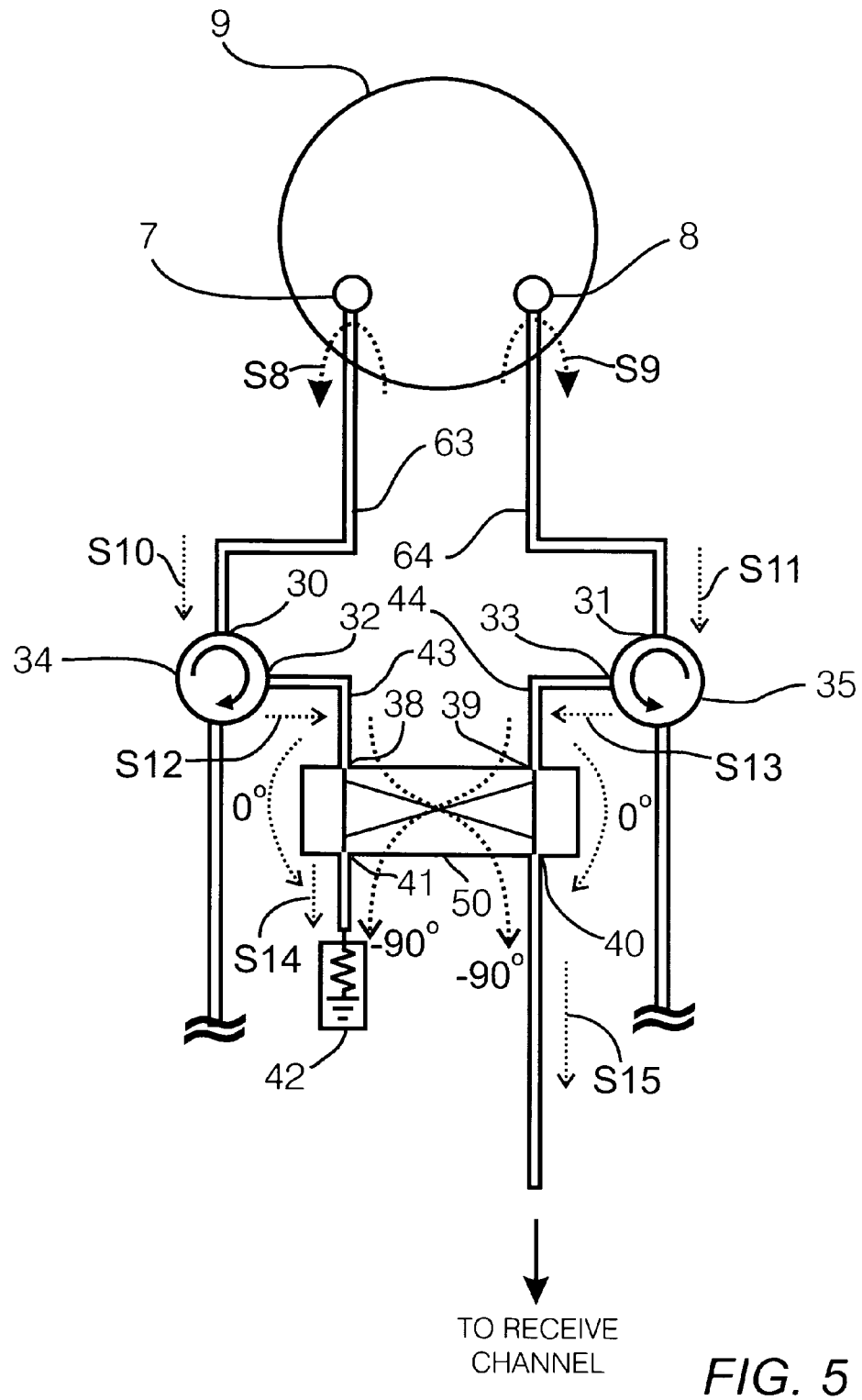
FIG. 5 is a diagram of an embodiment showing signal paths proceeding from the antenna feed ports to the receiver and termination.

FIG. 4 illustrates signals along the transmit path from the transmission signal input to the antenna feed network 20 at the transmit channel input port 21 to the antenna feed network connections to the antenna feed points 7 and 8 are explained below. In FIG. 5 the amplitudes and phases for the various signals along the paths resulting from portions of the transmission signals reflected from the antenna feed ports 7 and 8 are shown, and reflected portions S8 and S9 are illustrated as summing into signal S14 and being terminated in termination 42.

In this example, and to simplify the following discussion, it is assumed that the complex reflection coefficients, from the antenna feed ports, 7 and 8, are equal with amplitude A and phase angle −$\phi_A$. It is also assumed that the feed lines, 61, 62, 63, 64, 43 and 44, introduce only a phase shift to the signal as it passes through the respective connecting lines. The phase shift among connecting line pairs, namely 61 and 62, 63 and 64, and 43 and 44, are −$\phi_1$, −$\phi_2$, and −$\phi_3$ respectively. Here, the standard convention that a length of transmission lines will have a more negative phase angle is used. In addition, it is assumed that the quadrature hybrids, 25 and 50, and the first and second circulators, 34 and 35, are ideal and matched. In the practical case, the connecting lines will have amplitude changes due to the insertion loss inherent in the transmission lines, and the circulators and quadrature hybrids will have insertion loss and phase shifts.

FIG. 4 shows the antenna feed network 20 for signals that travel from the transmit channel to the antenna feed ports 7 and 8 and Table I summarizes the amplitudes and relative phases for the signals traveling through the network. The complex input signal S1 to the antenna feed network 20 will be assumed to have a voltage amplitude equal to 1 and phase equal to 0 degrees. As shown in FIG. 4, this signal enters the first quadrature hybrid 25 and the power is split in half into two equal amplitude signals with quadrature phase. The signal S2 leaving output port 28 has amplitude equal to 1/sqrt(2) and relative phase equal to −90 degrees and the signal S3 leaving output port 27 has amplitude equal to 1/sqrt(2) and phase equal to 0 degrees. The quadrature hybrid 25 can also be configured with the two output signal connections swapped. In this case, the connections to the other quadrature hybrid 50 would also need to be swapped in order to maintain the same performance. The two output signals from the first quadrature hybrid 25 travel along feed lines 62 and 61 respectively. The length of transmission line for feed lines 62 and 61 introduce an additional phase shift of $-\phi_1$ to each signal S4 and S5. The two signals then travel through the two circulators 34 and 35 respectively. It is assumed that the circulators are ideal and introduce no change to the amplitude or phase of the two signals. The two signals travel along feed lines 63 and 64 respectively. The length of transmission line for feed lines 63 and 64 introduce an additional phase shift of $-\phi_2$ to each signal S6 and S7. At this point the two signals enter the antenna feed ports 7 and 8 where some energy is reflected back to the antenna feed network 20. It is assumed that the complex reflection coefficient for the antenna feed ports 7 and 8 has amplitude equal to A and phase equal to $-\phi_A$.

FIG. 5 continues at the point of antenna reflection following the two paths taken in FIG. 4. FIG. 5 shows the signal paths for the reflected signals from the antenna ports 7 and 8 to the quadrature hybrids output port 40. The lower section of the antenna feed network 20 is not shown for clarity. The reflected signals have voltage amplitudes equal to A/sqrt(2). The phase of the reflected signal S8 to the input to connecting line 63 is $(-90-\phi_1-\phi_2-\phi_A)$. The phase of the reflected signal S9 to the input to connecting line 64 is $(-\phi_1-\phi_2-\phi_A)$ These two signals travel back along connecting lines, 63 and 64 respectively. The length of transmission line for connecting lines 63 and 64 introduce an additional phase shift of $-\phi_2$ to each signal S10 and S11. These signals pass through the circulators 34 and 35 and travel along the connecting lines 43 and 44 respectively. The length of transmission line for connecting lines 43 and 44 introduce an additional phase shift of $-\phi_3$ to each signal S12 and S13. Each input signal, S12 and S13 in FIG. 5, is divided in half in the quadrature hybrid 50. A relative phase shift of −90 degrees is introduced to the signal passing from the input port 38 over to the output port 40. A relative phase shift of −90 degrees is introduced into the signal passing from the input port 39 over to the output port 41. Vector addition of the output signals from the quadrature hybrid ports 40 and 41 shows that there is signal cancellation at the port 40 and signal addition at the port 41. Output port 40 is connected to the receive channel to prevent unwanted antenna reflections from entering the receiver. Output port 41 is connected to a termination 42 in order to terminate the reflected energy from the antenna. In some systems, the energy at the terminated port can be measured and used as an indication of the functioning of the antenna. For example, if a large signal level is measured at the port 41, then it may indicate a problem with the antenna, as most of the signal is being reflected and not transmitted through the antenna into the surrounding environment.

The antenna feed network 20 will also provide isolation between the transmit channel to the receive channel from any portion of the transmit signal that may couple through the first circulator 34 and second circulator 35. In FIG. 3B, the transmit channel is connected to the transmit channel input 21 of the antenna feed network 20. This signal travels along connecting line 60 and enters the quadrature hybrid, 25, and is split into two equal amplitude signals with quadrature phase. One half of the signal travels down connecting line 62 and enters port 36 of first circulator 34. In the ideal case, any signal entering the input port 36 will leave through port 30 and no portion of the transmission energy will be seen at port 32. In practice, the first circulator 34 has limited amount of isolation between the port 36 and port 32. This undesired coupling of energy from the input port 36 and output port 32 is caused predominately by practical limitations in the circulator design and mismatch between port 30 and connection to the connecting line 63. The portion of the transmission signal that couples through first circulator 34 will travel along connecting line 43 and enter quadrature hybrid 50 at the port 38. The coupled signal is split into two equal amplitude signals in quadrature phase. One half of the signal is delivered to the isolated port 41 and one half is delivered to the output port 40. The second circulator 35 also has a portion of its half of the transmission signal coupling to output port 33. This coupled signal travels along connecting line 44 then enters quadrature hybrid 50 at the port 39. This coupled signal is split into two equal amplitude signals with quadrature phase. One half of the signal is delivered to the isolated port 41 and one half is delivered to the output port 40. It will be shown that coupled signals through first circulator 34 and second circulator 35 will result in two equal amplitude signals appearing at the isolated port 41 and two equal amplitude signals at output port 40. It will also be shown that the phase relationship between these signals will result in signal addition at the isolated port 41 and signal cancellation at output port 40. In this way, any energy that is coupled through circulators 34 and 35 will be terminated by termination 42 and no coupled energy will be delivered to output port 40. Output port 40 can be connected to the receive channel of a full duplex transceiver thus providing high isolation between the transmit channel to the receive channel.

The rotation of first circulator 34 and second circulator 35 in FIG. 3B was chosen for clarity in the diagram. The rotation of these circulators can be changed as long as the interconnecting lines are routed to follow the connections described above. Also note that it is expected that the pair of connecting lines, 62 and 61, have equal electrical length and impedance in order to maintain the quadrature phase relationship developed by quadrature hybrid 25. Also note that it is expected that the pair of connecting lines, 63 and 64, have equal electrical length and impedance in order to maintain the quadrature phase relationship developed by quadrature hybrid 25. Also note that it is expected that the pair of connecting lines, 43 and 44, have equal electrical length and impedance in order to maintain the quadrature phase relationship developed by quadrature hybrid 25. Also note that it is expected that circulators 34 and 35 have approximately the same electrical performance in both amplitude and phase in order to maintain the quadrature phase relationship developed by quadrature hybrid 25. Tuning elements and/or phase adjustment may be inserted along any feed line in order to adjust the amplitude and phase of the signal traveling along the line. Tuning the signal may improve the isolation between the transmit channel and receive channel by compensating for any differences between the signal paths. It is also found that tuning elements, such as small stubs, placed on connecting line 63 and/or connecting line 64 and placed in close proximity to the circulator ports 30 and 31 can greatly improve the amount of isolation between the transmit and receive channels. The tuning element or elements achieve a better match between the two devices in regards to the electrical performance of the circulators.

Figure 6:
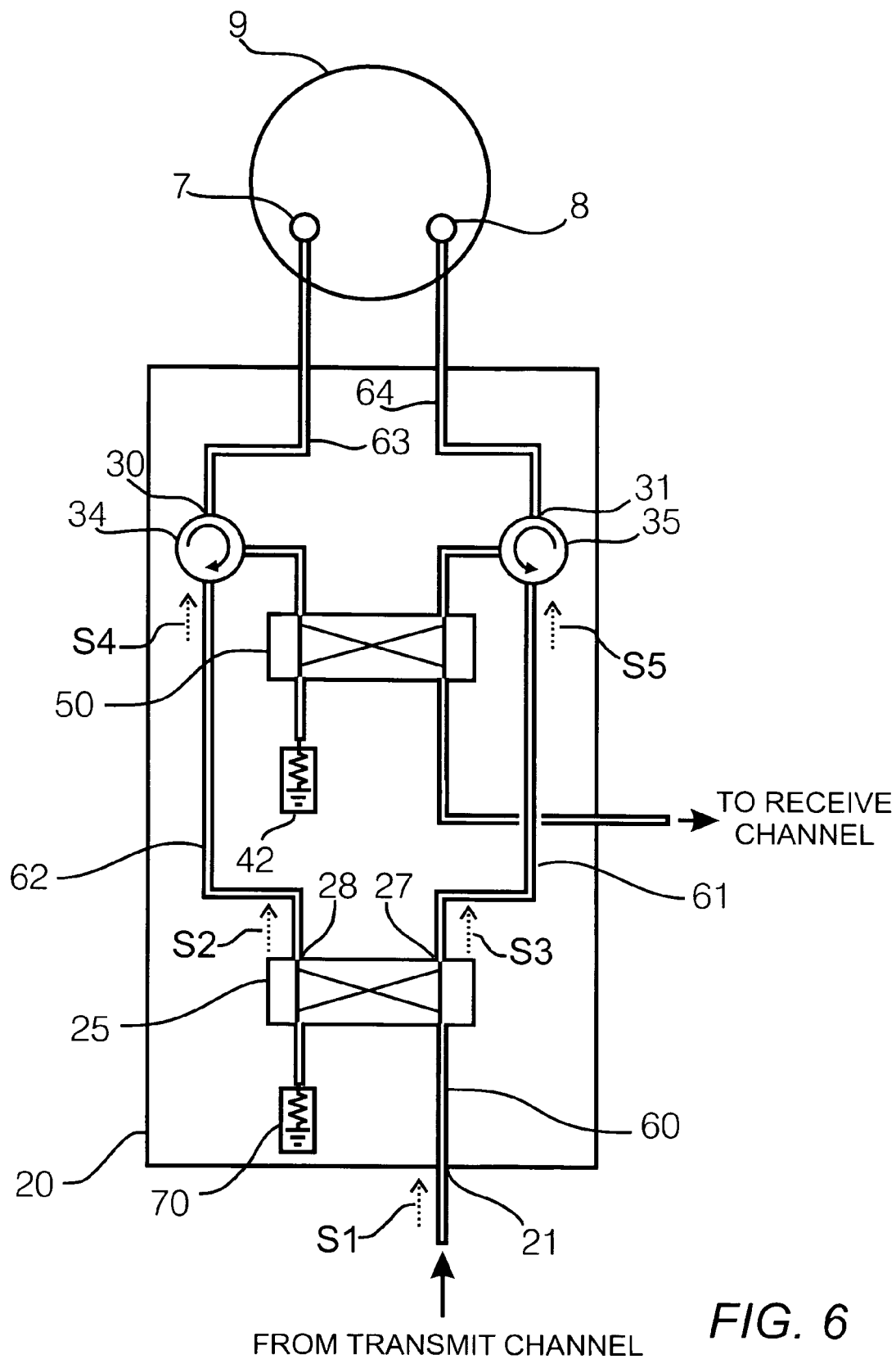
FIG. 6 is a diagram of an embodiment showing signal paths proceeding from the transmitter to the circulators.

FIG. 6 shows the antenna feed network 20 for signals that travel from the transmit channel to circulator 34 and circulator 35. The complex input signal S1 to the antenna feed network 20 will be assumed to have an voltage amplitude equal to 1 and phase equal to 0 degrees. Table II summarizes the amplitudes and relative phases for the signals traveling through the network. As shown in FIG. 6, this signal enters the first quadrature hybrid and the power is split in half into two equal amplitude signals with quadrature phase. The signal S2 leaving port 28 has amplitude equal to 1/sqrt(2) and relative phase equal to −90 degrees and the signal S3 leaving port 27 has amplitude equal to 1/sqrt(2) and relative phase equal to 0 degrees. The quadrature hybrid 25 can also be configured with these two connections swapped. In this case, the connections to the other quadrature hybrid 50 would also need to be swapped in order to maintain the same performance. The two output signals from the first quadrature hybrid 25 travel along connecting lines 62 and 61 respectively. The length of transmission line for connecting lines 62 and 61 introduce an additional phase shift of $-\phi_1$ to each signal S4 and S5.

TABLE II

| Signal | Amplitude | Phase |
|---|---|---|
| S1 | 1 | 0 |
| S2 | 1/sqrt(2) | −90 |
| S3 | 1/sqrt(2) | 0 |
| S4 | 1/sqrt(2) | −90 − φ1 |
| S5 | 1/sqrt(2) | −φ1 |
| S16 | B/sqrt(2) | −90 − φ1 − φB |
| S17 | B/sqrt(2) | −φ1 − φB |
| S18 | B | −90 − φ1 − φB − φ3 |
| S19 | 0 | |

Figure 7:
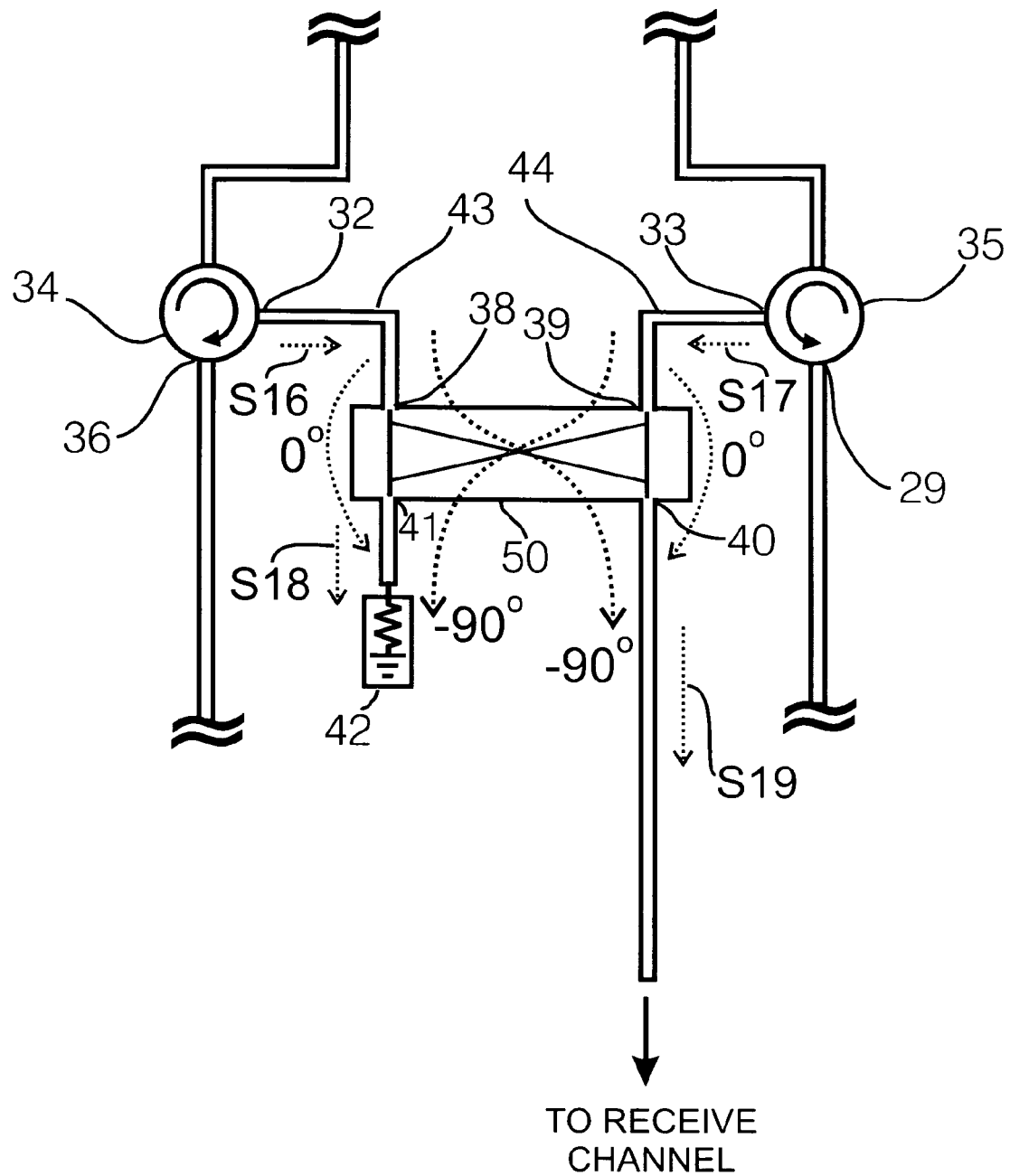
FIG. 7 is a diagram of an embodiment showing signal paths proceeding from the circulators to the receiver and termination.

FIG. 7 shows the signal paths for the coupled or leakage signals from the port 36 and port 29 of circulators 34 and 35 respectively to the ports 40 and 41. The upper and lower sections of the antenna feed network 20 are not shown for clarity. For this analysis, it is assume that any undesired signal that couples through the circulator will experience a change in amplitude equal to B and a phase shift equal to $-\phi_B$. Therefore, the signal S16 on the output port 32 will have an amplitude equal to B/sqrt(2) and relative phase of $(-90-\phi_1-\phi_B)$ degrees. The signal S17 on the output port 33 will have voltage equal to B/sqrt(2) and relative phase of $(-\phi_1-\phi_B)$ degrees. These signals travel along feed lines 43 and 44 respectively. The length of transmission line for connecting lines 43 and 44 introduce an additional phase shift of $-\phi_3$ to each signal. The energy in each input signal is divided in half by the quadrature hybrid 50. A relative phase shift of −90 degrees is introduced into the signal passing from the port 38 over to the port 40. A relative phase shift of −90 degrees is introduced into the signal passing from the port 39 over to the port 41. Vector addition of the output signals from the quadrature hybrid 50 at ports 40 and 41 show that there is signal cancellation at the port 40 and signal addition at the port 41. Port 40 is connected to the receive channel to prevent undesired circulator coupling or leakage from entering the receiver. Port 41 is connected to termination 42 in order to terminate the undesired energy that coupled through the circulators. In some systems, the energy at the terminated port can be measured and used as an indication of the operation of the circulators. For example, if a large signal level is measured at the port 41 then it may indicate a problem with the one or both circulators, as most of the signal is being coupled across the circulator and not properly transmitted through the antenna into the surrounding environment.

The above derivation assumed that the two signal paths were balanced in both relative amplitude and relative phase in order that signal cancellation would occur at the output port 22 of the antenna feed network 20. Tolerances in the components, connecting lines and antenna feed ports may result in a degradation of the transmit-to-receive isolation provided by the antenna feed network 20. A study of the amplitude balance and phase balance for the signals entering the quadrature hybrid 50 can show what level of transmit-to-receive isolation is achievable in the antenna feed network 20. Also note, that the quadrature hybrid 50 or other power combiner may also have a relative amplitude and phase imbalance that may reduce the isolation performance. In this case, the tolerance within the quadrature hybrid 50 or other power combiner can be considered as part of the following analysis. The following Tables III and IV show the required amplitude and phase balance between two signal paths that would result in a 30 dB or 40 dB isolation between the transmit channel to receive channel. The tables list the required relative amplitude and phase tolerance as a function of the signal level of the undesired signals. The undesired signals can be from the return loss of the antenna feed ports 7 and 8, the leakage or coupling through the two routing devices, such as the circulators or directional couplers, and/or coupling between the two antenna feed ports 7 and 8. It is assumed that the amplitude and phase imbalances are created by differences in the insertion loss and electrical lengths of the connecting lines, electrical variations between the ports of the power dividers and combiners, electrical variations between the pair of routing devices and variations in the return loss between the pair of antenna ports. For example, antenna feed ports that are poorly matched, thus having a small return loss value (5 dB), would require tighter tolerance in the balance between the two combined signals in order to achieve a high isolation between the transmit and receive channels.

As a numerical example using the Table III, if the required transmit-to-receive isolation is 30 dB and the antenna return loss is the undesired signal having a value of 10 dB, then the relative amplitude balance between the two paths would need to be within the range of +1.9 dB/−1.6 dB. This analysis assumes that the phase balance is ideal. Using this same example but with an ideal amplitude balance, the relative phase balance between the two paths would be +/−11.4 degrees. For an antenna feed network having both amplitude and phase imbalances, a Monte Carlo analysis is one technique that can be used to estimate the range of tolerances required to achieve a certain level of isolation between the transmit channel to receive channel. For example, antenna feed ports with a 10 dB return loss would require a relative amplitude balance of +1.2 dB/−0.8 dB and a relative phase balance +/−10 degrees in order to achieve approximately 30 dB isolation between the transmit channel to receive channel. There are other combinations of amplitude and phase tolerances that can achieve this isolation value.

In practice, amplitude and phase adjustments within the antenna feed network 20 can be implemented to improve the final isolation of the network. In this case, amplitude and phase shift tuning, using such components as attenuators and lengths of transmission lines, can adjust the balance between the two signal paths in order to optimize the isolation between the transmit channel and receive channel. Additionally, electronically controlled elements maybe introduced into the connecting lines or components to vary attenuation or phase in the transmission path. Such components may be varactors or PIN diodes, or other voltage or current controlled devices which can vary the amplitude and/or phase of the signals. In addition, proper selection of the components, and when using a printed circuit board, symmetrical layout of the connecting lines, can result in amplitude and phase balances within +/−0.3 dB and +/−5 degrees with minimal tuning at 915 MHz. These tolerances can achieve approximately a 35 dB isolation between transmit to receive channels.

Similar results to Tables III and IV would be found if the analysis proceeded with leakage or coupling differences between the paired routing devices. For example, if a circulator leakage, or as sometimes referred circulator isolation, is 20 dB and the required transmit to receive isolation was 30 dB, then the amplitude balance between the two signal paths would need to be in the range of +8.7 dB and −4.2 dB assuming an ideal phase balance. If the amplitude balance were ideal, then the phase balance would need to be in the range +/−36.9 degrees. Thus, the table represents the extreme tolerance ranges for a given parameter of phase or amplitude balance presuming the other parameter is maintained exactly. If combinations of amplitude and phase balances were required, a Monte Carlo analysis can be performed to estimate the isolation of the transmit channel to receive channel.

It will be understood that the cancellation provided in the signal combining assembly 150 can be expressed in terms of the attenuation achieved of the undesired signal level. Tables III and IV are each for a given transmit to receive isolation of 30 dB and the calculated numbers assume idealized components and connections with the exception of the undesired signal level which can be conceived as either one of antenna reflection or circulator, or routing device, leakage. The transmit to receive isolation is based on an input level at the power dividing assembly 125 input and the output level of the transmission signal appearing the output of the power combining assembly 150. Since idealized components are assumed in this simulation, the total power applied to antenna 209 is the power level at the input of the power diving assembly 125 since this power is theoretically recombined. So in accordance with these simulations the cancellation attenuation is the difference between the transmit to receive isolation and the undesired signal isolation. The simulations lump the undesired signals together into a number where, for instance, 5 dB would represent a theoretical situation of a 5 dB reflection coefficient of the antenna and an infinite isolation of the routing device, or, vice versa. Since attenuations in practice will occur prior to the circulators which will affect determination of cancellation attenuation when based on the input at the power dividing assembly, for the purposes of defining this invention the cancellation attenuation will be considered the reduction in level of a given pair of signals, such as the pair of reflection signals or the pair of leakage signals for both channels, or both types for both channels if not otherwise defined, at the output of the power combining assembly 150 versus the level that would appear had the pair of undesired signals been constructively combined to essentially double the power of either single signal at the output of the power combining assembly 150.

It will further be understood that parameters referred to such as phase, amplitude, and isolation are parameters that are generally specified over a frequency range of operation. In the working example of the present invention the frequency of 902 MHz to 928 MHz was used and test results discussed below regarding isolation relate the isolation is equal to or better than a certain level across the band of operation. Here the bandwidth to center frequency percentage is 2.8%, but the present invention is by no means limited to such a bandwidth. Wider bandwidths are envisioned of up to 5, 10 and 20% since the cancellation can be achieved by maintaining matching electrical characteristics of components and connecting lines over the band. Furthermore, unless specified otherwise in the claims, the isolation, phase and amplitude values are not considered to be required over any given bandwidth.

TABLE III

Transmit to Receive Isolation = 30 dB

| Undesired Signal Level (dB) | Amplitude Balance (dB) | Phase Balance (deg) |
|---|---|---|
| 5 | +1/−0.9 | +/−6.4 |
| 10 | +1.9/−1.6 | +/−11.4 |
| 15 | +3.8/−2.6 | +/−20.5 |
| 20 | +8.7/−4.2 | +/−36.9 |
| 25 | +inf/−6.5 | +/−68.4 |

TABLE IV

Transmit to Receive Isolation = 40 dB

| Undesired Signal Level (dB) | Amplitude Balance (dB) | Phase Balance (deg) |
|---|---|---|
| 5 | +/−0.3 | +/−2.0 |
| 10 | 0.6/−0.5 | +/−3.6 |
| 15 | +1/−0.9 | +/−6.4 |
| 20 | +1.9/−1.6 | +/−11.4 |
| 25 | +3.8/−2.6 | +/−20.5 |

From the above analysis and data, it will be understood by those skilled in the art that amplitude levels that are exactly the same or phase differences that are exactly 180 degrees, while desirable for the practice of this invention, are not required for the practice of this invention. As indicated in the above Tables III and IV, the amplitude balance and phase balance required to practice the invention will depend on the transmit to receive channel isolation desired and the undesired signal level produced by the antenna assembly reflections and the transmission leakage through the circulators. The undesired signal levels are presented in terms of attenuation of the divided transmission input signal, i.e., the attenuation of the transmission signal passed from port one of the routing devices, 134 and 135, or the attenuation of the transmission signal reflected from the antenna assembly 209, which results in the undesired signal appearing at the combining assembly. Thus, for the present invention, the requirements for approximately the same level signals and approximately the desired phase shift, e.g., 180 degrees, are understood to mean within tolerances yielding a desired isolation between transmit channel and receive channel based on the characteristics of the antenna assembly 209 and signal routing devices, 134 and 135. Such tolerances are illustrated in the above tables III and IV for transmit to receive channel isolation levels of 30 dB and 40 dB. The undesired signal referred to is either of the reflected signal from one of the input feeds of the antenna assembly 209 or the leakage transmission signal from one of the routing devices 134 and 135, or the sum of those two signals, the value in dB represents the attenuation ratio relative to the divided transmission signals at the first ports of the routing devices, 134 and 135, for the leakage transmission signal, or the antenna feed signals applied to the antenna first and second feed ports, 7 and 8.

In practice the amount of cancellation in the signal combining assembly 150 varies with the matching of the signal. It is considered that the undesired signals, leakage or reflection substantially cancel when the receiver front end functions adequately. Depending on the application, the amount of cancellation necessary will vary on the amount of leakage in the routing devices 134 and 135 and the reflection from the antenna assembly 209. In applications such as RFID tag excitation and reading, it may be acceptable that the first and second reflected feed signals substantially cancel each other such that a signal appearing at the received signal output of the signal combining assembly 150 which is produced by the transmission signal, and does not include any signal received by the antenna by reception of radiation, is at least 17 dB below a level the divided transmission signal at any one the first and second antenna feeds 23 and 24. Preferably, such a signal is 22 dB down, more preferably such a signal is 27 dB down, and still more preferably such a signal is 37 dB down. When a 3 dB loss in the signal dividing assembly 125 is considered, this yields a 40 dB transmit to receive channel isolation.

It should further be noted that this cancellation is achieved routing the signals using passive components without employing active cancellation generating a cancellation signal to cancel the undesired signals. For the purposes of the present invention it has been noted that tuning devices may be employed to adjust amplitude and phase and that electronically controlled elements maybe introduced into the connecting lines or components to vary attenuation or phase in the transmission path, for example, such components as varactors or PIN diodes, or other voltage or current controlled devices which can vary the amplitude and/or phase of the signals. It is realized that other devices such as FETs, and yet to be developed control device may be introduced and such controls are considered to be within the scope of the present invention. The use of the term passive is intended to include such devices unless noted otherwise as the devices do not generate a signal but merely modify a signal. Therefore, control power is usually minimal.

Figure 8:
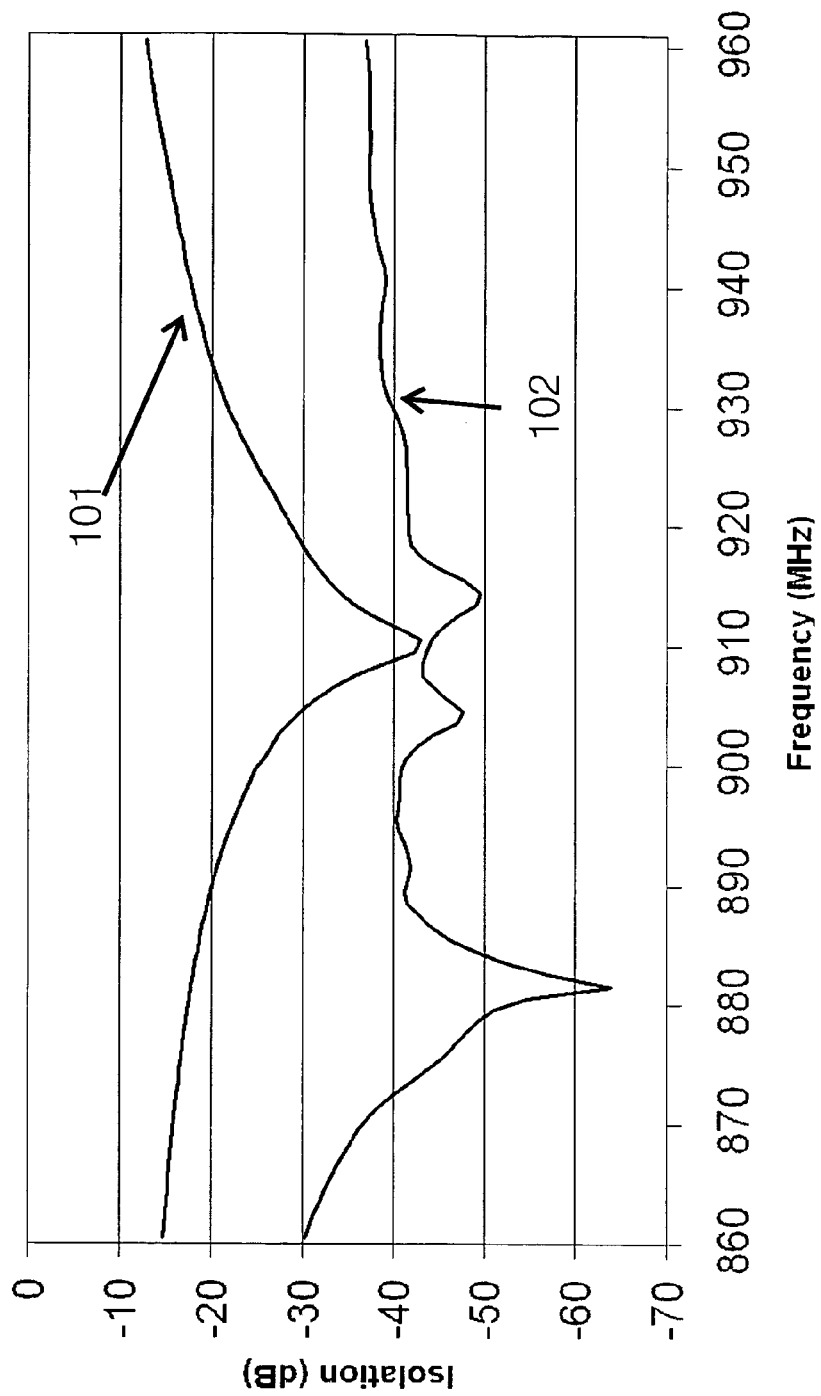
FIG. 8 is the measured results for the isolation between the transmit channel to the receive channel.

FIG. 8 shows two measured results for transmit channel to receive channel isolation. The upper curve 101 in FIG. 8 is the isolation for the standard antenna configuration as shown in FIG. 1. This measurement was made by measuring the difference in the signal level leaving port 2 relative to the input signal at port 5 as shown in FIG. 1. A CP antenna was fabricated using a single-layer foam-dielectric circular microstrip patch antenna. The antenna and circulator were tuned for best performance in the 902 MHz to 928 MHz frequency range. The lower curve 102 in FIG. 8 was measured using the preferred embodiment of antenna feed network 20 as shown in FIG. 3B. This measurement was made by measuring the signal level between receive channel output 22 relative to the signal level at the transmit channel input 21. The same CP antenna and circulators were used in both tests. It is shown from the measured results that the antenna feed network 20 provides a much higher isolation over a much wider range of frequencies. For example, the measured worst case isolation over the operating band of 902 MHz to 928 MHz is 23 dB for the standard configuration and 40 dB using the antenna feed network 20.

Figure 9:
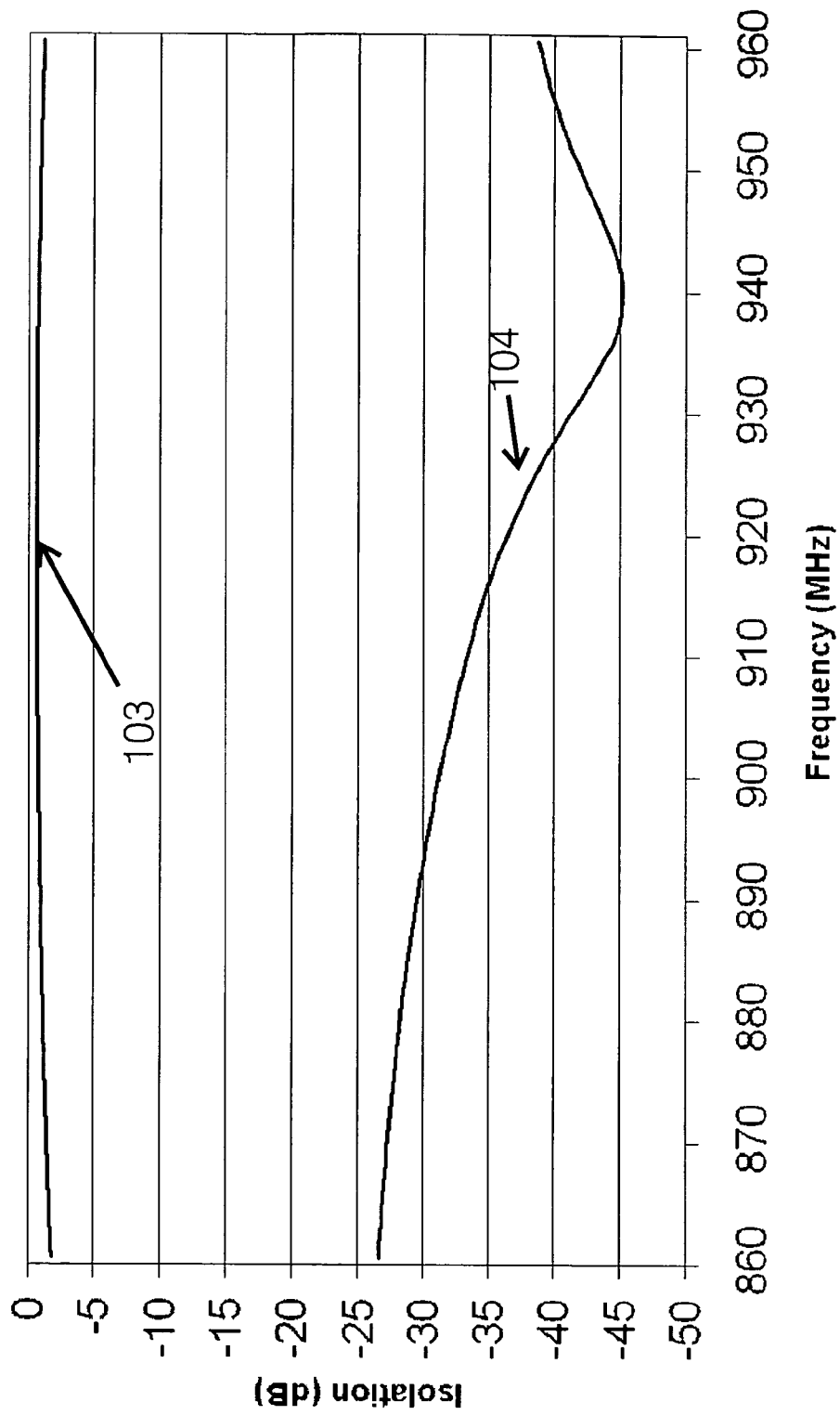
FIG. 9 is the measured results for the isolation between the receive channel to the transmit channel.

FIG. 9 shows the measured results for the receive channel to transmit channel isolation. The upper curve 103 shows the measured isolation for the standard antenna configuration as shown in FIG. 1. The standard antenna configuration provides little isolation (<1 dB) between the receive channel to transmit channel. The lower curve 104 is the measured isolation using the preferred embodiment of the antenna feed network 20 as shown in FIG. 3B. As shown in FIG. 9, the receive channel to transmit channel isolation is greater than 32 dB over the 902 MHz to 928 MHz frequency range.

Figure 10:
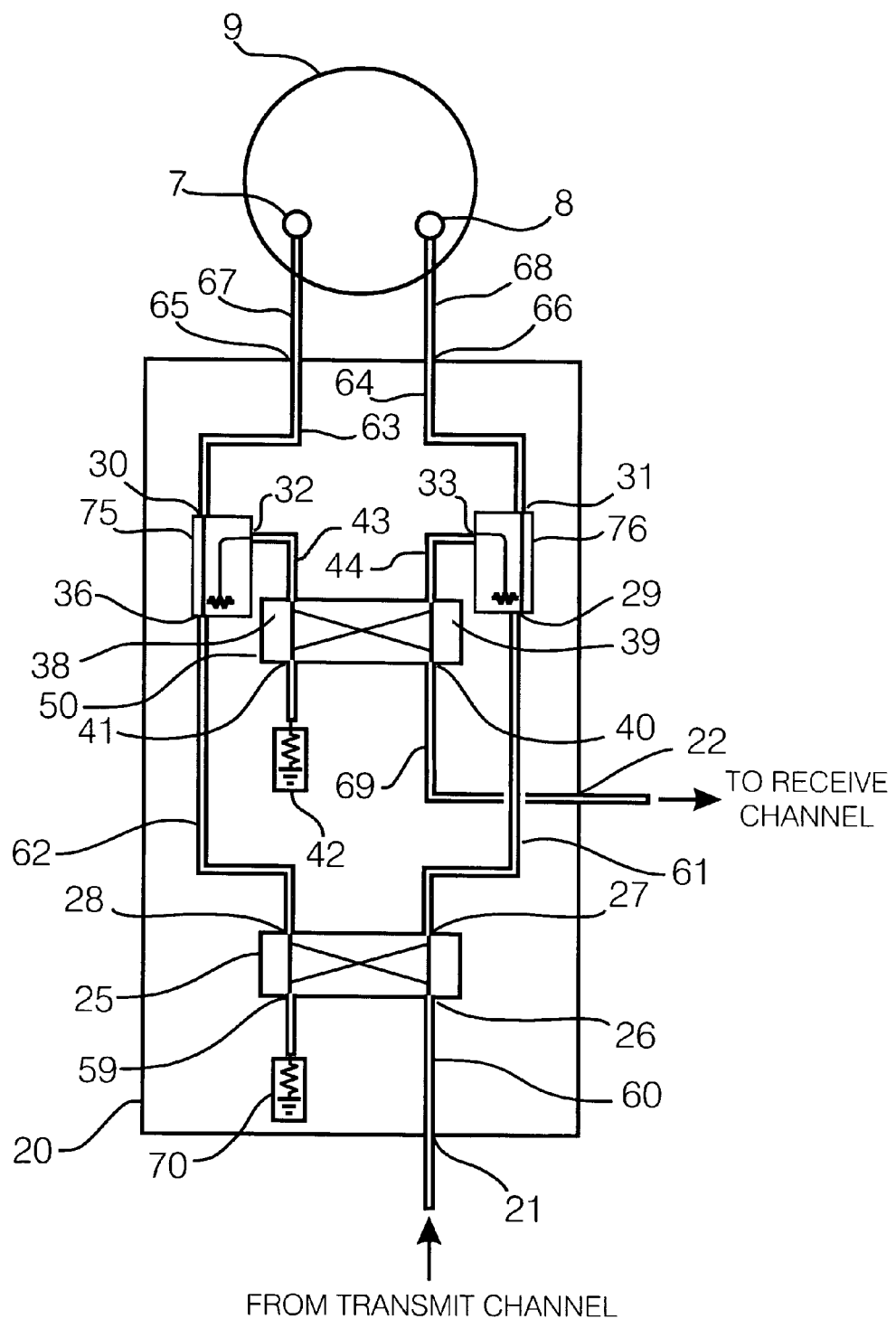
FIG. 10 is an embodiment of the antenna feed network using directional couplers as the routing device.

Another embodiment of the present invention makes use of directional couplers in place of the circulators to route the signals to and from the antenna feed points 7 and 8 through the antenna feed network 20. FIG. 10 shows the antenna feed network 20 implemented with directional couplers 75 and 76. The mathematical analysis using directional couplers in place of circulators follows the same derivation as shown in FIG. 4, FIG. 5, FIG. 6 and FIG. 7. One of the key differences when using directional couplers in place of circulators is an additional reduction in the amplitude of the signals as they pass through the directional coupler moving from connecting lines 63 and 64 to connecting lines 43 and 44 respectively. As the amplitude reduction is seen equally in both signals, the cancellation effect seen at the output port 40 remains intact. Once again the undesired reflected energy is terminated by the termination, 42. Also note that practical directional couplers have undesired leakage paths between the ports 36 and 29 to the ports 32 and 33 respectively. As in the case using circulators, the antenna feed network 20 is capable of canceling the undesired leakage energy at the output port 40 and allowing this energy to be terminated in the termination 42.

Figure 11:
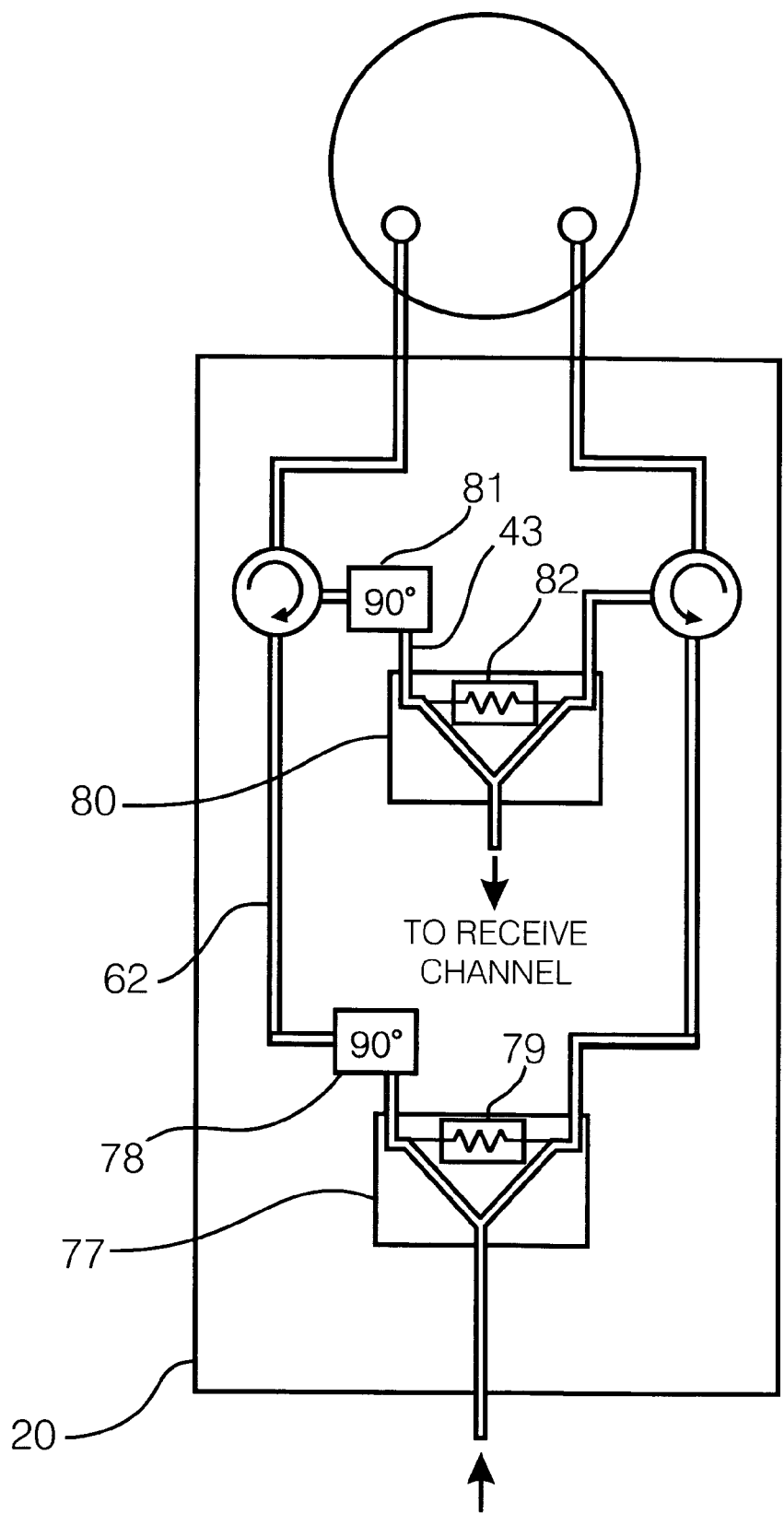
FIG. 11 is an embodiment of the antenna feed network using equal-phase power dividers and equal-phase power combiners that include a phase shift network.

Another embodiment of the present invention replaces the quadrature hybrids 25 and 50 in FIG. 3B and FIG. 10 with other types of power division networks as long as the output signals from these devices maintain the amplitude and the relative phase relationships required for proper operation of the antenna feed network. One skilled in the art will recognize in view of this disclosure other types of power dividers that have equal amplitude split with a 90-degree phase difference between the outputs that can be used to practice this invention such as the branchline coupler and Lange coupler. Likewise, other types of power division networks with equal amplitude but equal phase between the outputs may be employed to practice the present invention. These equal phase dividers include the Wilkinson tee, resistive divider and T-junction or reactive tee. Using one of these equal amplitude-equal phase dividers in place of quadrature hybrid 25 and/or 50 requires the addition of a 90-degree phase shift network on one side of the divider output. For example, FIG. 11 shows another embodiment of the antenna feed network 20 using a Wilkinson divider 77 on the input of the antenna feed network 20. To create the required quadrature signal, an additional 90-degree phase shift 78 is added to connecting line 62 to create the necessary conditions for the feeding a CP antenna while providing the necessary signal conditions for isolation between the transmit and receive channels. A Wilkinson tee divider or any other type of equal phase power divider/combiner in combination with a 90-degree phase shift can also be used at the output to the antenna feed network 20. For example, FIG. 11 shows a Wilkinson divider, 80, configured as a power combiner. For this configuration, a 90-degree phase shift 81 is required in the connecting line 43 in order to maintain the proper phase relationship to the input ports of the combiner 80. In this case, the resistor 82 terminates reflected energy from antenna feed ports 7 and 8. The resistor 82 also termination signals that leak or couple through circulators 34 and 35. In this configuration, energy reflected from the circulators 34 and 35 are terminated in resistor 79. Additionally, it is realized that different combinations of divider types can be used in the antenna feed network to provide isolation between the transmit channel and receive channel.

One skilled in the art will understand in light of this disclosure that other types of power divider networks are usable in the practice of this invention that result in a variety of phase differences between the divider's output signals. For example, the ring hybrid, or "rat-race", results in a power division with a 180-phase difference between two of the output ports. Here again, a phase shift network is required to adjust the phase difference between the two output signals to be 90 degrees.

Figure 12:
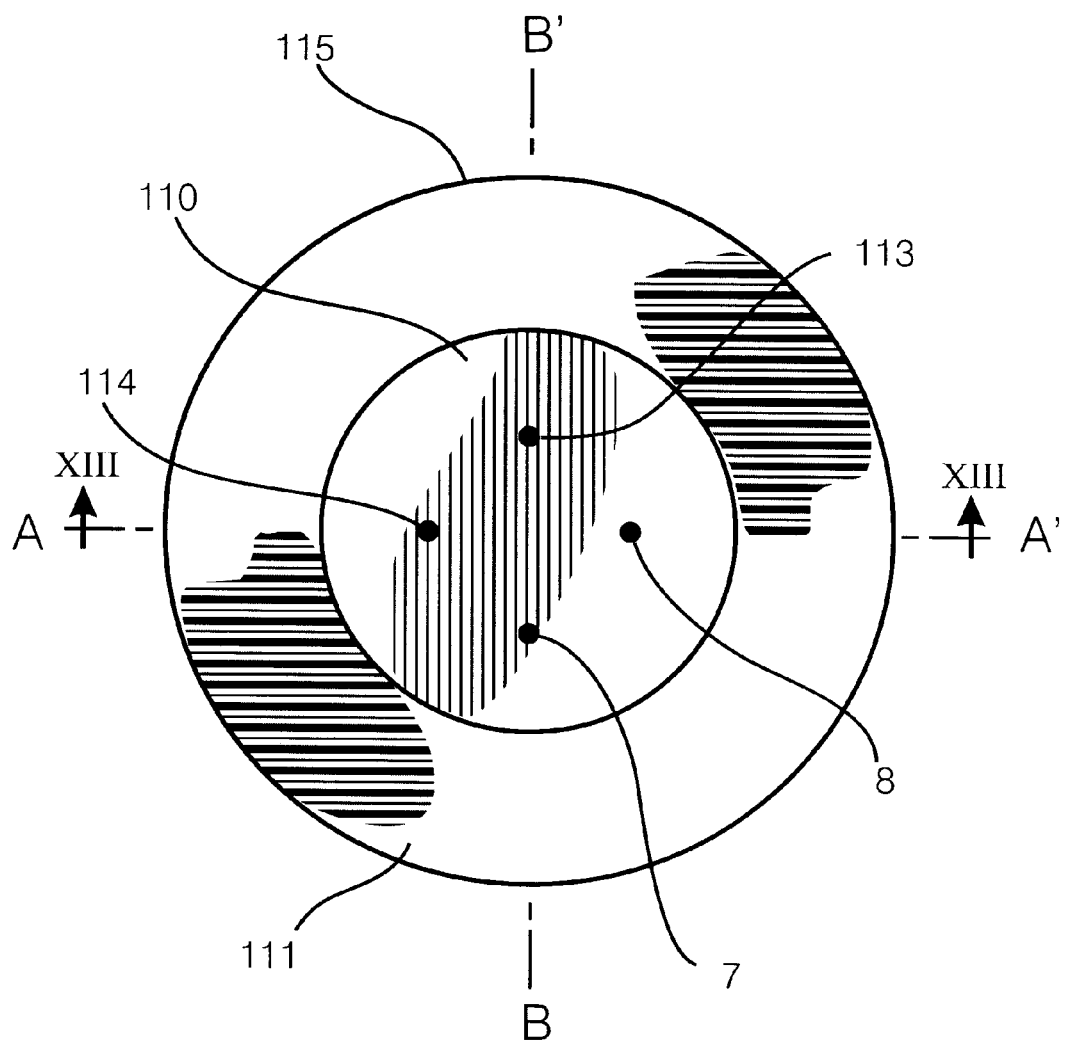
FIG. 12 is a front view perspective of an embodiment of a microstrip patch antenna of the present invention and a work object.

In the preferred embodiment, a microstrip patch antenna with two orthogonal antenna feeds was used to verify the operation of the antenna feed network. Referring to FIGS. 12 and 13, a microstrip patch antenna 115 of the preferred embodiment has a metallic planar patch element 110 placed over a planar dielectric layer 111 and ground plane 112. The patch element 110, dielectric 111 and ground plane 112 have a shape that is circular in form but can take on a variety of different geometries such as a square. The dielectric layer 111 separates the patch element 110 from the ground plane placed underneath the dielectric layer 111. The dielectric may be any plastic, foam or other material that can support the patch and provide good electrical performance for the antenna. The dielectric may also be air where the patch element is held in position using standoffs (not shown). The ground plane 112 placed under the dielectric is typically planar which can have the same or different geometry as the patch element 110. In the preferred embodiment, the ground plane 112 is also circular. The size of the patch element 110 is approximately one-half wavelength if the dielectric 111 is air. If the dielectric is something other than air the size of the patch is approximately one-half wavelength divided by the square root of the dielectric constant. In microstrip circuits, the dielectric constant used in calculations is slightly modified due to fringing fields in air and therefore results in an effective dielectric constant that can be used to calculate the size of the patch element. Also note that the size of the patch element will also be dependent on the geometry selected for the element.

For the preferred embodiment described herein, a 902 MHz to 928 MHz antenna was designed using low-loss dielectric foam was used to support a 6.6-inch diameter microstrip patch element. A thicker dielectric layer 111 may increase the operating bandwidth for the antenna but may also increase the chance for higher order modes. In some applications, a shorting pin can be placed in the center of the patch element which directly connects the element 111 to the ground plane 112. The shorting pin may suppress the higher order modes for the thicker substrates. In the preferred embodiment, the thickness of the dielectric is 0.02 of a wavelength of operation. Other dielectric thickness over the range of 0.005 to 0.05 of a wavelength may also be used. The thickness of the dielectric was 0.258 inches. The antenna feed network 20 is attached to antenna feed ports 7 and 8 from underneath the ground plane using transmission lines such as coax, microstrip or stripline. For circular polarization, the two feed ports 7 and 8 are positioned orthogonal to each other along the lines of symmetry A-A' and B-B'.

In the preferred embodiment, two additional antenna ports 113 and 114 are added to the microstrip patch antenna 115. The antenna tuning ports 113 and 114 may or may not have the same physical distance from the center of the patch element as antenna feed ports 7 and 8. These additional ports 113 and 114 may be used for tuning the input match and isolation of the antenna over the frequency range of interest. This approach to antenna tuning is discussed below.

Figure 13A:
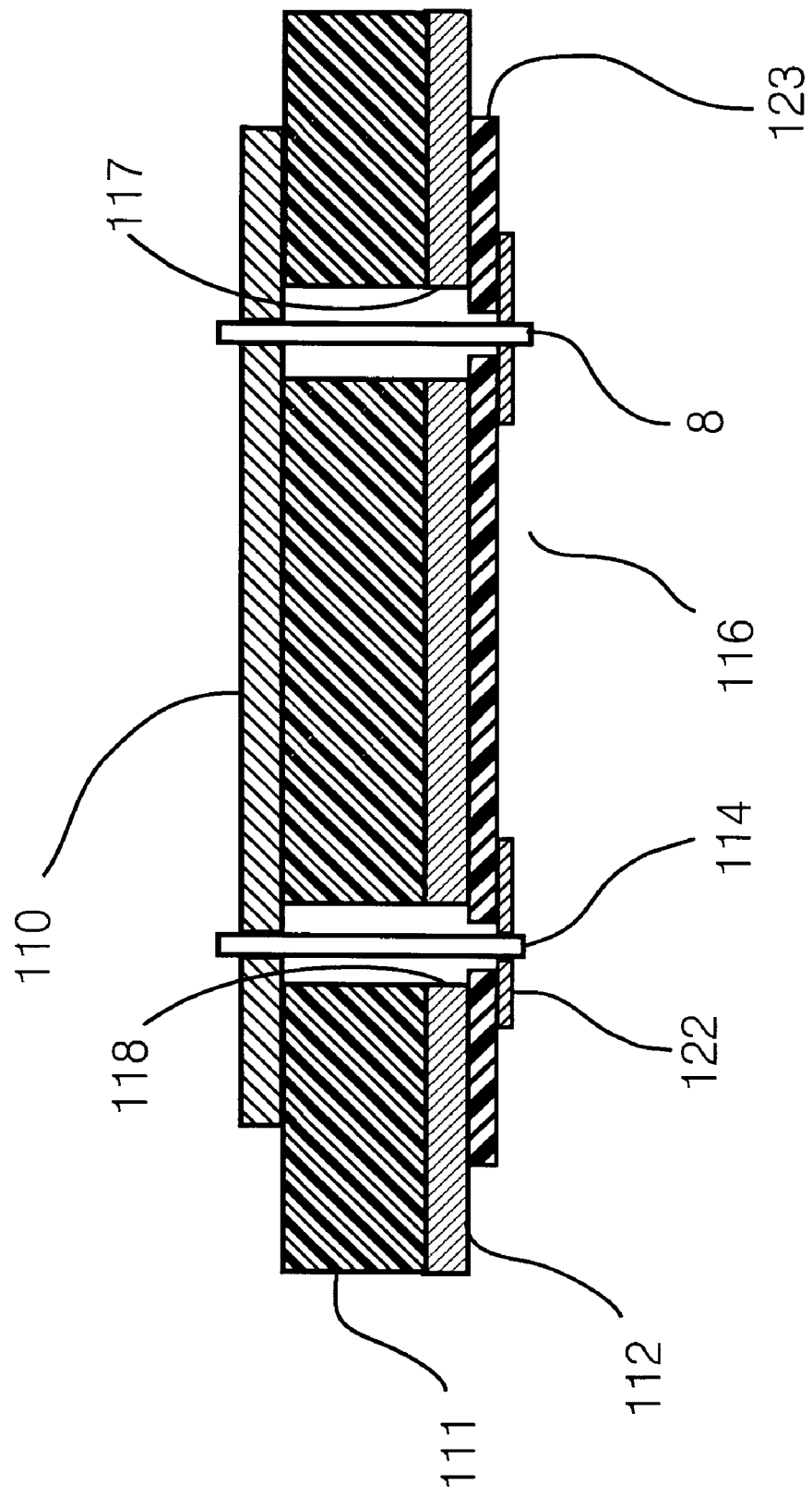
FIG. 13A is a side elevation cross-sectional view of the circularly polarized microstrip patch antenna of FIG. 12 taken along XIII-XIII.

FIG. 13A shows a cross-sectional view of the microstrip patch antenna 115. As shown in FIG. 13A, the patch element 110 is supported by the dielectric 11 over the metallic ground plane 112. The dielectric layer 111 is not required to extend throughout the antenna but only provide adequate mechanical support to the patch element 110 over the ground plane 112. As previously mentioned, the dielectric may also be air where the patch element is held in position using standoffs (not shown).

Antenna feed port 8 is shown as a pin extending through a hole 117 in the ground plane 112 and attached to the patch element 110. The attachment to the patch element is made by solder, screw or any attachment that provide good electrical contact between the pin and the patch. Antenna feed port 8 could be the extension of a center pin from a coaxial transmission line that uses the ground plane 112 for attachment to the outer conductor of the coaxial line. The other end of the pin for antenna port 8 can be attached to the conductor of a microstrip or stripline circuit.

FIG. 13A shows the preferred embodiment where antenna feed port 8 is attached to a microstrip circuit board 116. The microstrip circuit board has a metal conductor 122 supported over a ground plane 112 by a dielectric layer 123. The ground plane 112 may be part of the microstrip board 116 as a metallization physically attached to the dielectric 123. The patch antenna 115 may use the ground plane 112 that may be attached to the microstrip board 116 as the antenna ground plane. Alternately the microstrip board 116 may use a separate metal as the ground plane 112 which could be part of the patch antenna 115.

The pin can be attached using solder, screw or other technique that provides good electrical contact between the pin and the conductor of the microstrip circuit board 116. The microstrip circuit board 116 can also be used to interconnect the antenna feed ports 7 and 8 to the antenna feed network 20. In the preferred embodiment, the antenna feed network 20 is fabricated on the same microstrip circuit board 116 that connects to the antenna feed ports 7 and 8. In this way the antenna feed network 20 is attached to the ground place 112 and becomes integrated as part of the patch antenna 115.

FIG. 13A also shows the attachment of antenna tuning port 114 to the patch element 110. Antenna tuning port 114 is shown as a pin extending through a hole 118 in the ground plane 112 and attached to the patch element 110. The attachment to the patch element is made by solder, screw or any attachment that provide good electrical contact between the pin and the patch. Antenna tuning port 114 could be the extension of a center pin from a coaxial transmission line that uses the ground plane 112 for attachment to the outer conductor of the coaxial line. The other end of the pin for antenna tuning port 14 can be attached to the conductor of a microstrip or stripline circuit. From symmetry, antenna feed port 7 and antenna tuning port 113 follow the same construction and attachment as antenna feed port 8 and antenna tuning port 114 respectively. In the preferred embodiment, a microstrip transmission line was attached to the pins of antenna tuning ports 113 and 114.

It should be noted that the antenna feed ports 7 and 8 and antenna tuning ports 113 and 114 do not need to be physically attached to the patch element 110. They can be proximity coupled to the patch element 110 using probe elements directly connected to the pins and placed under the patch element. These proximity-coupled techniques are well documented in the literature.

The operating frequency range for the antenna is primarily determined by the size of the patch element 110 and the dielectric constant of the dielectric layer 111 placed under the patch element 110. Tolerances in the size of the patch element 110 of 0.1-5% and variations in dielectric constant of 1-15% within the dielectric layer 111 may cause the operating frequency to shift from the desired. In addition, asymmetries in the antenna geometry and changes in the dielectric constant across the material may create a difference in the reflection properties of antenna feed port 7 relative to the antenna feed port 8. As noted earlier, the reflected energy from these feed ports is absorbed within the antenna feed network when the two antenna feed ports have the same or similar reflection properties.

As it is important to match the reflection properties of the two antenna feed ports, 7 and 8, a method to independently tune each port may be required. Traditionally, tuning can be accomplished with stubs or lumped elements placed on the feed lines leading up to the antenna ports 7 and 8.

An aspect of the present invention is an approach to tuning the antenna by addition of one and/or two additional antenna tuning ports 113 and/or 114 as shown on FIG. 12. Energy entering the patch antenna 115 from antenna feed port 7 is coupled to the other three antenna ports, 8, 113 and 114. The strongest coupling occurs between antenna feed port 7 and antenna tuning port 113. By symmetry, energy entering antenna feed port 8 is coupled to the other three antenna ports, 7, 113 and 114. In this case the strongest coupling occurs between antenna feed port 8 and antenna tuning port 114. If the antenna tuning ports 113 and 114 absorb little or no energy, then signals reflected from these ports will re-enter the patch antenna. Antenna tuning ports 113 and 114 can be attached to low-loss transmission lines and/or reactive lumped elements so that any coupled energy is reflected back into the antenna with an adjustable amount of amplitude and/or phase change. The reflected energy from the antenna tuning port 113 is added to the reflected energy from antenna feed ports 7. The reflected energy from the antenna tuning ports 114 is added to the reflected energy from antenna feed ports 8. Adjustment of the signals reflected from antenna tuning ports 113 and 114 allow independent tuning of the frequency response of the reflection properties from antenna feed ports 7 and 8. Tuning allows the frequency response for the antenna to be centered on the desired operating frequency and independent tuning of the two antenna ports allows the reflection properties of the two antenna feed ports 7 and 8 to be closely matched so that the antenna feed network will properly absorb reflected energy from these two ports.

Tuning the frequency response of the antenna can be accomplished by adjusting a length of open-circuited and/or short-circuited transmission line attached at each antenna tuning ports 113 and 114. Tuning may also be accomplished with lumped element components connected to antenna tuning ports 113 and 114. Tuning may also be accomplished with a combination of lumped elements and transmission lines attached to the antenna tuning port 113 and 114.

Figure 13B:
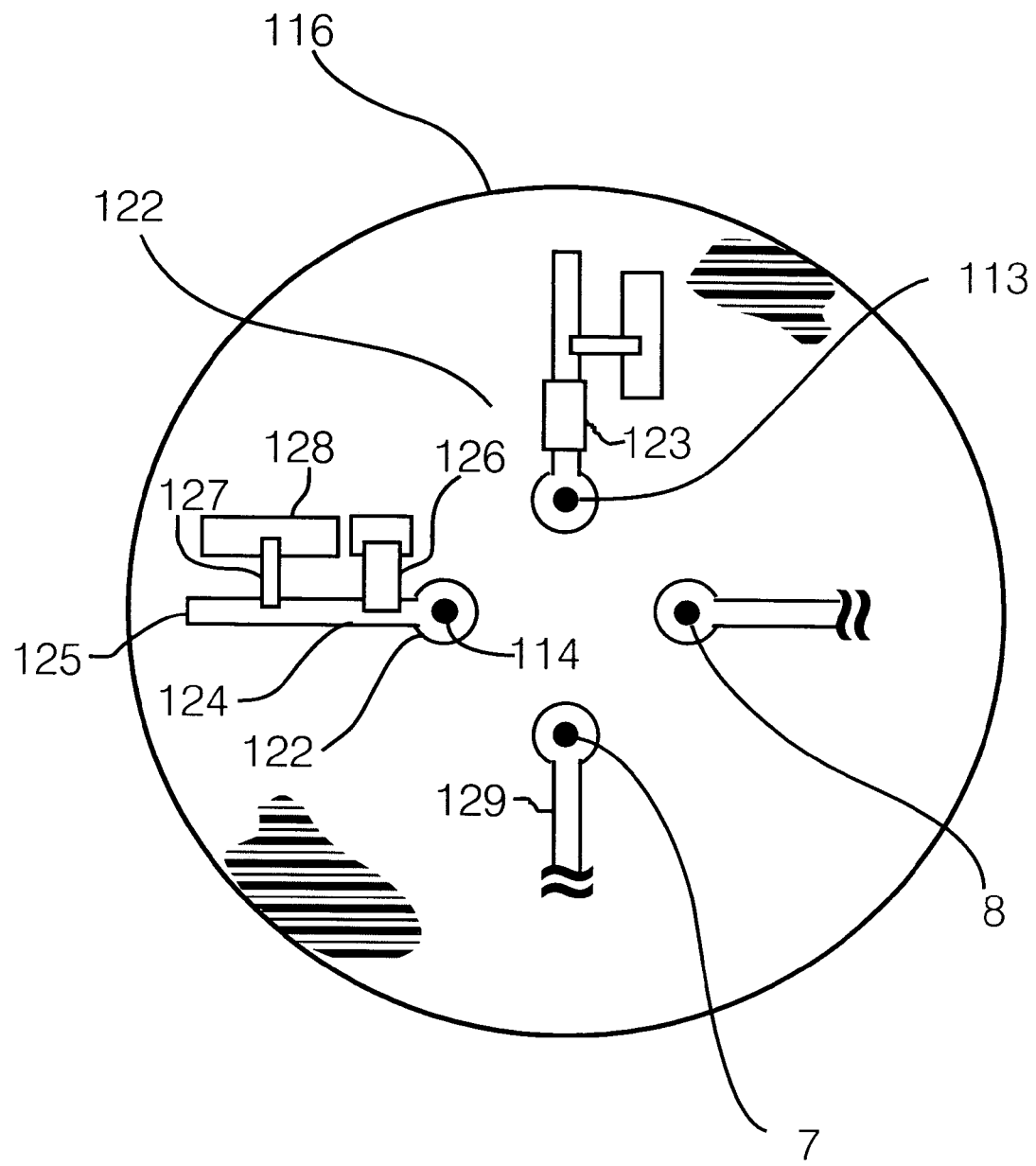
FIG. 13B is a top view of a microstrip circuit used for tuning the antenna.

FIG. 13B shows a top view of the preferred embodiment using a microstrip circuit board 116 that connects the metal conductors 122 of microstrip circuit to the antenna ports 7, 8, 113 and 114. Microstrip transmission lines 124 and 129 can be connected to the metal conductors 122 on up to all four ports. Microstrip lines 129 that are connected to antenna feed ports 7 and 8 may be used to connect to the antenna feed network 20 not shown. Microstrip lines 124 may be used to connected an open-circuited transmission line 125. Tuning is optionally accomplished by moving the open-circuit 125 along the microstrip line 124. Moving the open-circuit can be accomplished by cutting across the microstrip line 124 or by adding a length of open-circuit line to the end of the microstrip line 124. Alternately, tuning can be accomplished by moving a short-circuited line 127 along the microstrip line 124. The short circuit can be created with a piece of metal connected to a shorting plate 128. The shorting plate 128 can be created with a one or more via holes connected to the ground plane. Alternately, tuning can be accomplished with adjusting the value of shunt tuning components 126 such as capacitors and inductors. The shunt elements can be positioned in various locations along the microstrip line 124 or they can be attached directly to the antenna feed port 114 and 113. The shunt elements can also be attached to a shorting plate similar to 128. Alternately, tuning can be accomplished with adjusting the values of series tuning components 123 such as capacitors or inductors placed along the microstrip line 124 or attached directly to the antenna feed port 113 and 114. It is also possible to use resistor shunt and/or series components to properly tune the antenna. The resistors will result in some loss in radiated energy but the additional flexibility in adjusting the amplitude of the reflected signal may also improve antenna performance. It should be noted that combinations of any two or more of these tuning techniques could be applied to each of the antenna ports 113 and 114. Also note that it may only be necessary to apply tuning to one of the two antenna tuning ports 113 and 114 in order to properly tune the antenna.

It should be noted that when using vertical probes to excite the antenna that the currents on these probes may radiate and add to the antenna pattern. These probes are the pins that connect the patch element 110 to the antenna feed ports 7, 8, 113 and 114 as shown in FIG. 13A. Asymmetries in the placement of the probes under the patch element may distort the antenna pattern and reduce the axial ratio performance of the CP antenna. By arranging the antenna feed ports 7 and 8 and the antenna tuning ports 113 and 114 in a symmetrical pattern relative to the center of the patch, the axial ratio may be improved.

It is advantageous to the operation of the antenna feed network 20 that adequate isolation is provided between antenna ports 7 and 8. If the antenna ports 7 and 8 are poorly isolated, then transmit energy entering antenna feed port 7 will couple to antenna feed port 8 and may appear at the receiver input. By symmetry, transmit energy entering antenna feed port 8 will couple to antenna feed port 7 and may appear at the receiver input. The antenna feed network 20 as shown in FIG. 3B does not provide cancellation of these coupled signals at the receiver input. Therefore it is advisable to use antenna(s) that provide an adequate amount of isolation between the two antenna feed ports 7 and 8.

It was determined that proper positioning of the antenna feed ports on the microstrip patch element was a factor in providing good isolation between the feed ports. Traditionally, patch antennas use feed points positioned on the element for best impedance match to the transmission line that is feeding the antenna. It is known that the center of the patch element is a virtual short circuit and the edges of the patch are open circuits. A point along the patch element radius will result in a proper impedance match, typically 50 ohms, to the feed transmission line. It was found that the placement of the feed point for best impedance match does not always coincide with the place for best isolation between the two antenna feed points 7 and 8. In the preferred embodiment, the antenna ports 7 and 8 are located 1 inch from the center of the patch element 110 or about 0.08 of a wavelength from the center of the patch element 110. This antenna port location was found to provide good isolation between antenna ports 7 and 8. To maintain symmetry in the antenna, the additional antenna ports 113 and 114 are also located 1 inch or 0.08 of a wavelength from the center of the patch element 110. As different patch geometries, dielectric thicknesses and dielectric constants may be used, the placement of the antenna ports for optimal isolation can cover the range 0.005 to 0.2 wavelengths. As mentioned previously, variations in dielectric constant of the dielectric layer 111 as well as mechanical tolerances in the patch assembly may create a condition where tuning the antenna for good port to port isolation may be required. Tuning the isolation between antenna ports 7 and 8 may be accomplished using transmission line stubs attached to antenna ports 113 and 114. As mentioned previously, energy entering the patch antenna 115 from antenna feed port 7 is coupled to the other three antenna ports, 8, 113 and 114. The strongest coupling occurs between antenna feed port 7 and antenna tuning port 113. By symmetry, an equal amount of energy is coupled between antenna feed port 7 to antenna feed port 8 and antenna feed port 7 to antenna tuning port 114. If antenna tuning port 114 absorbs little or no energy, the energy is reflected from antenna port 114 and strongly coupled back to antenna port 8. This energy adds to the energy that directly couples between antenna feed port 7 and antenna feed port 8. By proper tuning of the amplitude and/or phase of the energy reflected from antenna tuning port 114, it is possible to improve the isolation characteristics between antenna port 7 and antenna port 8. By symmetry, a similar process can be shown for the isolation between antenna feed port 8 to antenna feed port 7. The isolation characteristics between antenna port 7 to port 8 and antenna port 8 to port 7 are the identical as the antenna is a passive, linear component, therefore tuning antenna port 113 and/or antenna port 114 will result in an same level of coupling between the two antenna feed ports 7 and 8. The antenna tuning ports 113 and 114 can be attached to low-loss transmission lines and/or lumped element components. The transmission line stubs are open-circuited and/or short-circuited transmission lines. Lumped elements attached to antenna ports 113 and 114 may also be used to tune the isolation of the antenna. These various techniques were previously discussed with reference to FIG. 13B. In the preferred embodiment, open-circuited microstrip stubs were attached to antenna ports 113 and 114 and the lengths of the stubs were adjusted to improve both the antenna's input match and port-to-port isolation over the frequency range of 902 MHz to 928 MHz. In the preferred embodiment, the open-circuited microstrip transmission line attached to antenna tuning ports 113 and 114 were fabricated on the same microstrip circuit used for the antenna feed network 20. This antenna was used in the measurements of FIG. 8 and FIG. 9.

It is also important to note that the antenna ports 7 and 8 can be connected to numerous types of antennas that require two quadrature input signals such as other forms of microstrip patch antennas, cross-polarized dipoles, crossed-slot antenna and the quadrifilar helix antenna to name a few. In addition, it can be shown that any two antennas can be connected to the antenna feed network 20 with similar transmit-to-receive isolation performance as long as the complex reflection coefficient from the two separate antenna feed points are approximately the same and the isolation between the two antennas is adequate for the application.

In the general case, the antenna feed network of the present invention can be configured with phase shift components placed along every connecting line. The phase shift at each component can be adjusted until an appropriate relative phase is created at the antenna feed ports 7 and 8 for the antenna type that will be connected to the antenna feed network. The phase shift for each phase shift component can also be adjusted to cancel one or more of the undesired signals that may enter the receive channel. In application, a selected one or ones of the phase shift components are optionally used.

As previously discussed, there are predominately three undesired signal paths between the transmit channel to receive channel. These paths are created from reflection from the antenna ports, leakage and/or coupling through the circulator or routing device, and cross coupling between the antenna ports. For cases when an undesired signal is small, it may not be necessary to cancel this signal and the antenna feed network can be adjusted to cancel those signals that are large enough to create problems in the receiver. The relative phase relationship of these undesired signals at the second quadrature hybrid or power combiner will determine which undesired signal or signals will be canceled.

Figure 14:
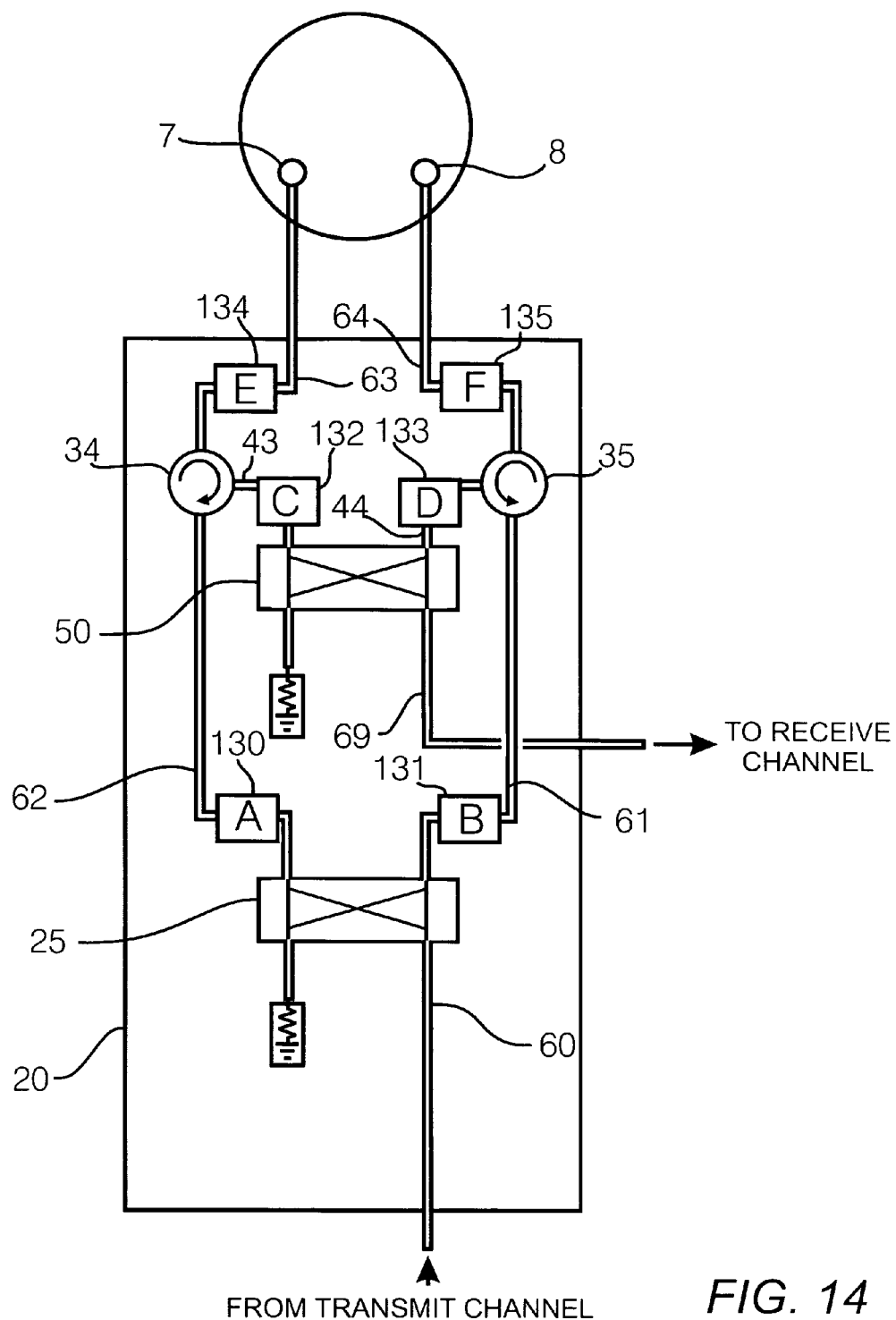
FIG. 14 is an embodiment of the antenna feed network using a phase shift network in each connecting line.

FIG. 14 shows the antenna feed network 20 with the phase shift components 130, 131, 132, 133, 134, 135 placed along connecting lines 62, 61, 43, 44, 63, 64 respectively. In this figure, quadrature hybrids 25 and 50 are used for power division and power combining. As discussed above, the quadrature hybrids could be replaced with equal-phase power divider and/or combiner to achieve the same power division and phase shifting properties once the relative phases are appropriately adjusted using the phase shift components. It will be further understood from this disclosure that the quadrature hybrids could be replaced with other types of power dividers and/or combiners with arbitrary phase outputs in order to achieve the same power division and phase shifting properties once the relative phases are appropriately adjusted using the phase shift components. Table V shows the relative phase between the antenna feed ports and the type of signal cancellation possible for all combinations of phase shift using 0-degree and 90-degree sections for the antenna feed network shown in FIG. 16. Note that in the table, the phase shifts of A through F use −90 in the calculations but the results would be same if +90 degrees were used with the only difference in the sign of the relative phase between the antenna feed ports.

TABLE V

| Config. # | phase shift | | | | | | Relative Phase Difference at Antenna Feed Ports | Cancel Antenna Reflection (y = yes) | Cancel Circulator Leakage (y = yes) | Cancel Antenna Port to Port Coupling (y = yes) | Comments |
| | A | B | C | D | E | F | | | | | |
|---|---|---|---|---|---|---|---|---|---|---|---|
| 1 | 0 | 0 | 0 | 0 | 0 | 0 | −90 | y | y | | CP, Preferred Embodiment |
| 2 | 0 | 0 | 0 | 0 | 0 | 90 | 0 | | y | | Linear, In-phase feed, Iso cancel |
| 3 | 0 | 0 | 0 | 0 | 90 | 0 | −180 | | y | | Linear, Differential feed, Iso cancel |
| 4 | 0 | 0 | 0 | 0 | 90 | 90 | −90 | y | y | | CP, Preferred Embodiment |
| 5 | 0 | 0 | 0 | 90 | 0 | 0 | −90 | | | | |
| 6 | 0 | 0 | 0 | 90 | 0 | 90 | 0 | | | | |
| 7 | 0 | 0 | 0 | 90 | 90 | 0 | −180 | | | | |
| 8 | 0 | 0 | 0 | 90 | 90 | 90 | −90 | | | | |
| 9 | 0 | 0 | 90 | 0 | 0 | 0 | −90 | | | | |
| 10 | 0 | 0 | 90 | 0 | 0 | 90 | 0 | | | | |
| 11 | 0 | 0 | 90 | 0 | 90 | 0 | −180 | | | | |

TABLE V-continued

| Config. # | phase shift A | B | C | D | E | F | Relative Phase Difference at Antenna Feed Ports | Cancel Antenna Reflection (y = yes) | Cancel Circulator Leakage (y = yes) | Cancel Antenna Port to Port Coupling (y = yes) | Comments |
|---|---|---|---|---|---|---|---|---|---|---|---|
| 12 | 0 | 0 | 90 | 0 | 90 | 90 | −90 | | | | |
| 13 | 0 | 0 | 90 | 90 | 0 | 0 | −90 | y | y | | CP, Preferred Embodiment |
| 14 | 0 | 0 | 90 | 90 | 0 | 90 | 0 | | y | | Linear, In-phase feed, Iso cancel |
| 15 | 0 | 0 | 90 | 90 | 90 | 0 | −180 | | y | | Linear, Differential feed, Iso cancel |
| 16 | 0 | 0 | 90 | 90 | 90 | 90 | −90 | y | y | | CP, Preferred Embodiment |
| 17 | 0 | 90 | 0 | 0 | 0 | 0 | 0 | | | | |
| 18 | 0 | 90 | 0 | 0 | 0 | 90 | 90 | | | | |
| 19 | 0 | 90 | 0 | 0 | 90 | 0 | −90 | | | | |
| 20 | 0 | 90 | 0 | 0 | 90 | 90 | 0 | | | | |
| 21 | 0 | 90 | 0 | 90 | 0 | 0 | 0 | | | | |
| 22 | 0 | 90 | 0 | 90 | 0 | 90 | 90 | y | | | CP, antenna reflection cancel |
| 23 | 0 | 90 | 0 | 90 | 90 | 0 | −90 | y | | | CP, antenna reflection cancel |
| 24 | 0 | 90 | 0 | 90 | 90 | 90 | 0 | | | | |
| 25 | 0 | 90 | 90 | 0 | 0 | 0 | 0 | y | y | y | Linear, In-Phase Feed Cancel All |
| 26 | 0 | 90 | 90 | 0 | 0 | 90 | 90 | | y | y | CP, ant. reflection not cancelled |
| 27 | 0 | 90 | 90 | 0 | 90 | 0 | −90 | | y | y | CP, ant. reflection not cancelled |
| 28 | 0 | 90 | 90 | 0 | 90 | 90 | 0 | y | y | y | Linear, In-Phase Feed Cancel All |
| 29 | 0 | 90 | 90 | 90 | 0 | 0 | 0 | | | | |
| 30 | 0 | 90 | 90 | 90 | 0 | 90 | 90 | | | | |
| 31 | 0 | 90 | 90 | 90 | 90 | 0 | −90 | | | | |
| 32 | 0 | 90 | 90 | 90 | 90 | 90 | 0 | | | | |
| 33 | 90 | 0 | 0 | 0 | 0 | 0 | −180 | | | | |
| 34 | 90 | 0 | 0 | 0 | 0 | 90 | −90 | | | | |
| 35 | 90 | 0 | 0 | 0 | 90 | 0 | −270 | | | | |
| 36 | 90 | 0 | 0 | 0 | 90 | 90 | −180 | | | | |
| 37 | 90 | 0 | 0 | 90 | 0 | 0 | −180 | y | y | y | Linear, Differential Feed, Cancel All |
| 38 | 90 | 0 | 0 | 90 | 0 | 90 | −90 | | y | y | CP, ant. reflection not cancelled |
| 39 | 90 | 0 | 0 | 90 | 90 | 0 | −270 | | y | y | CP, ant. reflection not cancelled |
| 40 | 90 | 0 | 0 | 90 | 90 | 90 | −180 | y | y | y | Linear, Differential Feed, Cancel All |
| 41 | 90 | 0 | 90 | 0 | 0 | 0 | −180 | | | | |
| 42 | 90 | 0 | 90 | 0 | 0 | 90 | −90 | y | | | CP, antenna reflection cancel |
| 43 | 90 | 0 | 90 | 0 | 90 | 0 | −270 | | | | |
| 44 | 90 | 0 | 90 | 0 | 90 | 90 | −180 | | | | |
| 45 | 90 | 0 | 90 | 90 | 0 | 0 | −180 | | | | |
| 46 | 90 | 0 | 90 | 90 | 0 | 90 | −90 | | | | |
| 47 | 90 | 0 | 90 | 90 | 90 | 0 | −270 | | | | |
| 48 | 90 | 0 | 90 | 90 | 90 | 90 | −180 | | | | |
| 49 | 90 | 90 | 0 | 0 | 0 | 0 | −90 | y | y | | CP, Preferred Embodiment |
| 50 | 90 | 90 | 0 | 0 | 0 | 90 | 0 | | y | | Linear, In-phase feed, Iso cancel |
| 51 | 90 | 90 | 0 | 0 | 90 | 0 | −180 | | y | | Linear, Differential feed, Iso cancel |
| 52 | 90 | 90 | 0 | 0 | 90 | 90 | −90 | y | y | | CP, Preferred Embodiment |
| 53 | 90 | 90 | 0 | 90 | 0 | 0 | −90 | | | | |
| 54 | 90 | 90 | 0 | 90 | 0 | 90 | 0 | | | | |
| 55 | 90 | 90 | 0 | 90 | 90 | 0 | −180 | | | | |
| 56 | 90 | 90 | 0 | 90 | 90 | 90 | −90 | | | | |
| 57 | 90 | 90 | 90 | 0 | 0 | 0 | −90 | y | | | CP, antenna reflection cancel |
| 58 | 90 | 90 | 90 | 0 | 0 | 90 | 0 | | | | |
| 59 | 90 | 90 | 90 | 0 | 90 | 0 | −180 | | | | |
| 60 | 90 | 90 | 90 | 0 | 90 | 90 | −90 | | | | |
| 61 | 90 | 90 | 90 | 90 | 0 | 0 | −90 | y | y | | CP, Preferred Embodiment |
| 62 | 90 | 90 | 90 | 90 | 0 | 90 | 0 | | y | | Linear, In-phase feed, Iso cancel |

TABLE V-continued

| Config. # | phase shift | | | | | | Relative Phase Difference at Antenna Feed Ports | Cancel Antenna Reflection (y = yes) | Cancel Circulator Leakage (y = yes) | Cancel Antenna Port to Port Coupling (y = yes) | Comments |
|---|---|---|---|---|---|---|---|---|---|---|---|
| | A | B | C | D | E | F | | | | | |
| 63 | 90 | 90 | 90 | 90 | 90 | 0 | −180 | | y | | Linear, Differential feed, Iso cancel |
| 64 | 90 | 90 | 90 | 90 | 90 | 90 | −90 | y | y | | CP, Preferred Embodiment |

It is to be understood that the phase shift components could have values other than 0 or 90 degrees as long as that the relative phases at the required ports have the appropriate relative phases for the antenna and the antenna feed network. For example, configuration 1 on the table shows that each phase shift component (A through F) uses a 0-degree phase shift. The resulting relative phase difference between the antenna feed ports is shown as −90 degrees. In this configuration, the antenna reflections and circulator leakages are canceled. This configuration does not cancel the coupling between antenna feed ports. This configuration is consistent with the preferred embodiment previously discussed.

Equal phase shifts placed along symmetrical feed lines do not introduce a change to the antenna feed network performance. For example, configuration 4 uses 90-degree phase shifts in E and F, which result in the same conditions as configuration 1. Also note that configurations 1, 4, 13, 16, 49, 52, 61 and 64 all result in relative phases consistent with the preferred embodiment.

There are configurations, 26, 27, 38 and 39, that create a relative 90-degree phase difference at the antenna feed ports but do not cancel antenna reflection. These suboptimal configurations can be used when the antenna feed ports are well matched to the transmission lines.

There are other configurations, 22, 23, 42 and 57, that create 90-degree relative phase difference at the antenna port and only cancel antenna reflection. These suboptimal configurations can be used when the antenna reflection is the only undesired signal that requires cancellation.

Other relative phase relationships can be created to feed various types of antennas. For example, in configurations 37 and 40, the antenna feed network creates a 180-degree phase difference at the antenna feed ports that can be used to drive dipoles, patches and other antennas requiring differential feeds and linear polarization. Unfortunately, in these configurations received signals from the environment operating at the same RF carrier frequency would also be canceled by the network and not be received by the receiver.

There are other configurations such as 3, 15, 51 and 63 that create differential antenna feeds but only cancel the circulator leakage signals. These suboptimal configurations can be used when antenna reflection and port-to-port coupling are not a problem. There are configurations, such as 25 and 28, which produce 0-degree phase difference at the antenna feed ports and can cancel all the undesired signals. These configurations can be used to drive antennas requiring in-phase feeds such as patches and antenna arrays using two separate elements. Once again there are suboptimal configurations, 2, 14, 50 and 62, that produce the in-phase antenna feed but only cancel the leakage signals through the circulators.

The configurations present in Table V and/or as described above are each considered to be disclosed and described as optional variations and modifications of the present invention. The discussions presented above regarding effecting phase shifts producing the cancellation attenuation effects described above with regard to the preferred embodiment of the present invention are also applicable to the further configurations presented in the above Table V.

The antenna feed network of the present invention is optionally operated in full duplex mode with different transmit and receive RF carrier frequencies. In this way, cancellation of the transmit energy at frequency f1 will be performed by the antenna feed network allowing the receiver to be simultaneously receiving signals at a different frequency f2. The only limitation to the frequency spacing between f1 and f2 is the operational bandwidth of the circulators, couplers and antenna(s) used in the antenna feed network and antenna components.

It will also be appreciated in view of this disclosure that practical limitations in the performance of the antenna assembly 209, which may be embodied as any two port antenna but is optionally the CP antenna 9 or the patch antenna 115 embodiment thereof, may introduce undesired leakage signals that may reduce the transmit to receive channel isolation of the antenna feed network 20. For example, an antenna leakage signal may exist in the antenna assembly 209 resulting in third and fourth transmission leakage signals appearing at first antenna port 23 and second antenna port 24. In the practical case, a portion of the second divided signal entering second antenna port 24 of the antenna assembly 209 may undesirably leak to first antenna port 23 as a third transmission leakage signal and enter the second port of the first routing device 134. This leakage is created by but not limited to the isolation of the antenna assembly 209. In the similar way, a portion of the first divided signal entering first antenna port 23 of the antenna assembly 209 may undesirably leak to second antenna port 24 as a fourth transmission leakage signal and enter the second port of the second routing device 135. These leakage signals are routed to the respective third port of the first and second routing devices and combine in the signal combiner 150 into antenna leakage signal, Ls, appearing at received signal output which connects to the receiver. The antenna leakage signal, Ls, may interfere with the proper operation of the receiver. The antenna leakage signal, Ls, is a complex value having an amplitude and relative phase.

It can be shown that when antenna assembly 209 has finite isolation between port 23 and port 24 then the transmit-to-receive isolation of antenna feed network 20 will degrade. In practice, when antenna assembly 209 is a patch antenna, crossed-dipole, quadrature helix or other multi-port antenna known to the industry, the port-to-port isolation may be in the range of 15-32 dB. The finite isolation creates a transmitter leakage signal that is not cancelled by the antenna feed network 20. In this case, the antenna leakage signal, Ls, appearing at received output port of the antenna feed network 20 is limited by the value of the finite isolation of the antenna assembly 209.

Figure 15:
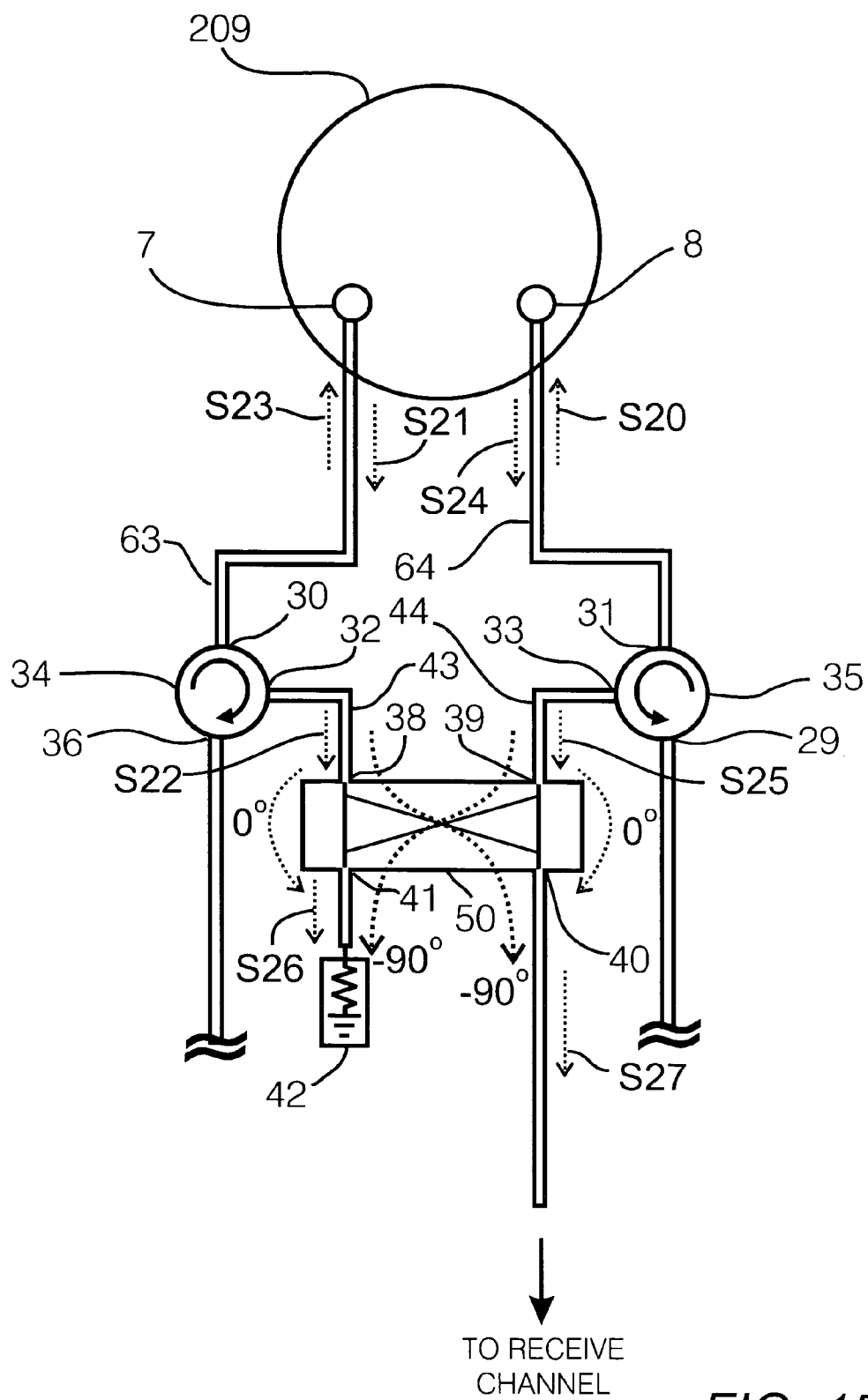
FIG. 15 is a diagram of an embodiment showing signal paths proceeding from a leakage source to the receive channel.

FIG. 15 shows the signal paths for the transmitted signal entering antenna feed port 7 and leaking to output port 40 and the transmitted signal entering antenna feed port 8 and leaking to output port 40. The lower sections of the antenna feed network 20 are not shown for clarity. For the transmitted signal entering the antenna feed network 20 and divided into the first and second divided transmission signals and routed by the first and second routing devices 34 and 35 to the first and second divided transmission output signals represented in FIG. 15 as S23 and S20 respectively and having substantially equal amplitudes and a relative phase shift therebetween. The first and second routing devices 34 and 35 are shown as circulators but can be any other routing device such as directional couplers or other routing device. For this analysis, the first and second divided transmission output signals S23 and S20 will be assumed to have a voltage amplitude of 1/sqrt(2) and relative phase difference equal to 90 degrees as listed in TABLE VI. For this analysis, it is assumed that the first and second routing devices 34 and 35 are ideal and signals entering port 36 and 29 are routed to ports 30 and 31 respectively with no change in amplitude and phase shift equal to $-\phi 10$. Also, signals entering ports 30 and 31 are routed to ports 32 and 33 with no change in amplitude and phase shift equal to $-\phi 10$. For this analysis, it is further assumed that the connecting lines 63 and 64 will introduce a phase shift of $-\phi 4$ degrees and that the connecting lines 43 and 44 will introduce a phase shift of $-\phi 5$ degrees. In practice, these connecting lines will have an associated insertion loss but the insertion loss will not be included as part of this analysis. A portion of second divided transmission output signal S20 entering antenna feed port 8 of generalized antenna assembly 209 will leak to antenna feed port 7 as a third transmission leakage signal S21. A portion of the first divided transmission output signal S23 entering port 7 of antenna assembly 209 will leak to port 8 as a fourth transmission leakage signal S24. The leakage signals can be measured and/or calculated using standard techniques known in the industry.

For this analysis, the third and fourth transmission leakage signals S21 and S24 will experience a change in amplitude equal to H and a phase shift equal to $-\phi H$ relative to the respective input to the antenna assembly 209. The third and fourth transmission leakage signals S21 and S24 will travel along feed lines 63 and 64 respectively and be routed through the signal routing devices 34 and 35 respectively and exit through port 32 and 33 respectively as third and fourth transmission leakage output signals In practice, these transmission paths will include insertion loss and the amplitude and phase will be a function of frequency. The third and fourth transmission leakage output signals entering port 38 and port 39 are represented as S22 and S25 respectively in FIG. 15 and TABLE VI. The signal S22 will have an amplitude equal to H/sqrt(2) and relative phase of $(-90-2(\phi 10)-2(\phi 4)-\phi 5-\phi H)$ degrees. The signal S25 will have amplitude equal to H/sqrt(2) and relative phase of $(-2(\phi 10)-2(\phi 4)-\phi 5-\phi H)$ degrees. The power in each input signal to the output quadrature hybrid 50 is divided in half or the voltage amplitude is scaled by a factor of 1/sqrt(2) in voltage. A relative phase shift of $-90$ degrees is introduced into the signal passing from the port 38 over to the port 40. A relative phase shift of $-90$ degrees is introduced into the signal passing from the port 39 over to the port 41. A relative phase shift of 0 degrees is introduced into the signal passing from the port 38 over to the port 41. A relative phase shift of 0 degrees is introduced into the signal passing from the port 39 over to the port 40.

Vector addition of these leakage signals at port 41 of the quadrature hybrid 50 will show signal cancellation resulting in output amplitude S26 equal to 0. Vector addition of these leakage signals at port 40 of the quadrature hybrid 50 will show signal addition resulting in output amplitude S27 equal to H and relative phase shift of $(-90-2(\phi 10)-2(\phi 4)-\phi 5-\phi H)$. Output port 40 is connected to the receiver and the total leakage signal S27 is undesired and may affect the proper operation of the receiver. The total leakage signal S27 described here was previously referred to as antenna leakage signal, Ls. Therefore, the antenna leakage signal, Ls, will have a relative amplitude of H and a relative phase shift of $(-90-2(\phi 10)-2(\phi 4)-\phi 5-\phi H)$.

$$Ls = |Ls| < \phi_{Ls} = H < (-90-2(\phi 10)-2(\phi 4)-\phi 5-\phi H)$$

It is therefore necessary to eliminate or reduce the amplitude of the antenna leakage signal, Ls, to an acceptable level for proper operation of the receiver.

TABLE VI

| Signal | Amplitude | Phase |
| --- | --- | --- |
| S23 | 1/sqrt(2) | $-90 - \phi 10 - \phi 4$ |
| S20 | 1/sqrt(2) | $-\phi 10 - \phi 4$ |
| S21 | H/sqrt(2) | $-90 - \phi 10 - \phi 4 - \phi H$ |
| S24 | H/sqrt(2) | $-\phi 10 - \phi 4 - \phi H$ |
| S22 | H/sqrt(2) | $-90 - 2(\phi 10) - 2(\phi 4) - \phi 5 - \phi H$ |
| S25 | H/sqrt(2) | $-2(\phi 10) - 2(\phi 4) - \phi 5 - \phi H$ |
| S26 | 0 | |
| S27 | H | $-90 - 2(\phi 10) - 2(\phi 4) - \phi 5 - \phi H$ |

It was previously discussed that tuning elements and/or phase adjustment may be inserted along any connecting line in order to balance the amplitude and phase of the signals traveling within the antenna feed network 20. Unfortunately, tuning elements that "balance" or match signal paths will not reduce the amplitude of the antenna leakage signal, Ls. In contrast to using tuning elements to balance the amplitude and phase characteristics, the present invention optionally provides for the use of reflector devices introduced to the antenna feed network 20 and configured to "imbalance" a portion of the signal paths in order to introduce a compensating signal, Cs, that is substantially equal in amplitude to the antenna leakage signal, Ls, but having approximately 180-degree relative phase difference for the purpose of reducing the amplitude of the antenna leakage signal, Ls, appearing at output port 40 of the signal combiner 50. In practice exact matching of Cs and Ls so as to be equal in amplitude and have exactly 180 degree phase difference is impracticable, hence the present invention is directed to an embodiment where this matching is substantially or approximately achieved such that the antenna leakage signal, Ls, is reduced to a level permitting desired system operation such as or better than that illustrated in FIG. 8 isolation characteristic 102. Such reflector devices may include stubs or lumped components or other devices as are known by those skilled in the art.

The present invention further includes embodiments which include a reflector device to create an imbalance in the antenna feed network 20 resulting in a compensation signal, Cs, that will effectively reduce the antenna leakage signal, Ls, created from the finite isolation of the antenna assembly 209.

As described above and shown in TABLE VI, one of the limitations for achieving high transmit to receive isolation using the antenna feed network 20 is the direct result of antenna leakage signal, Ls. In order to reduce the effect of this leakage signal and improve the overall isolation of the signal routing device 50, a separate compensating signal, Cs, can be added at the output port 40. This additional compensating signal needs to have approximately the same amplitude as the antenna leakage signal, Ls, and approximately 180-degree relative phase shift to the phase of the antenna leakage signal S27.

Figure 16:
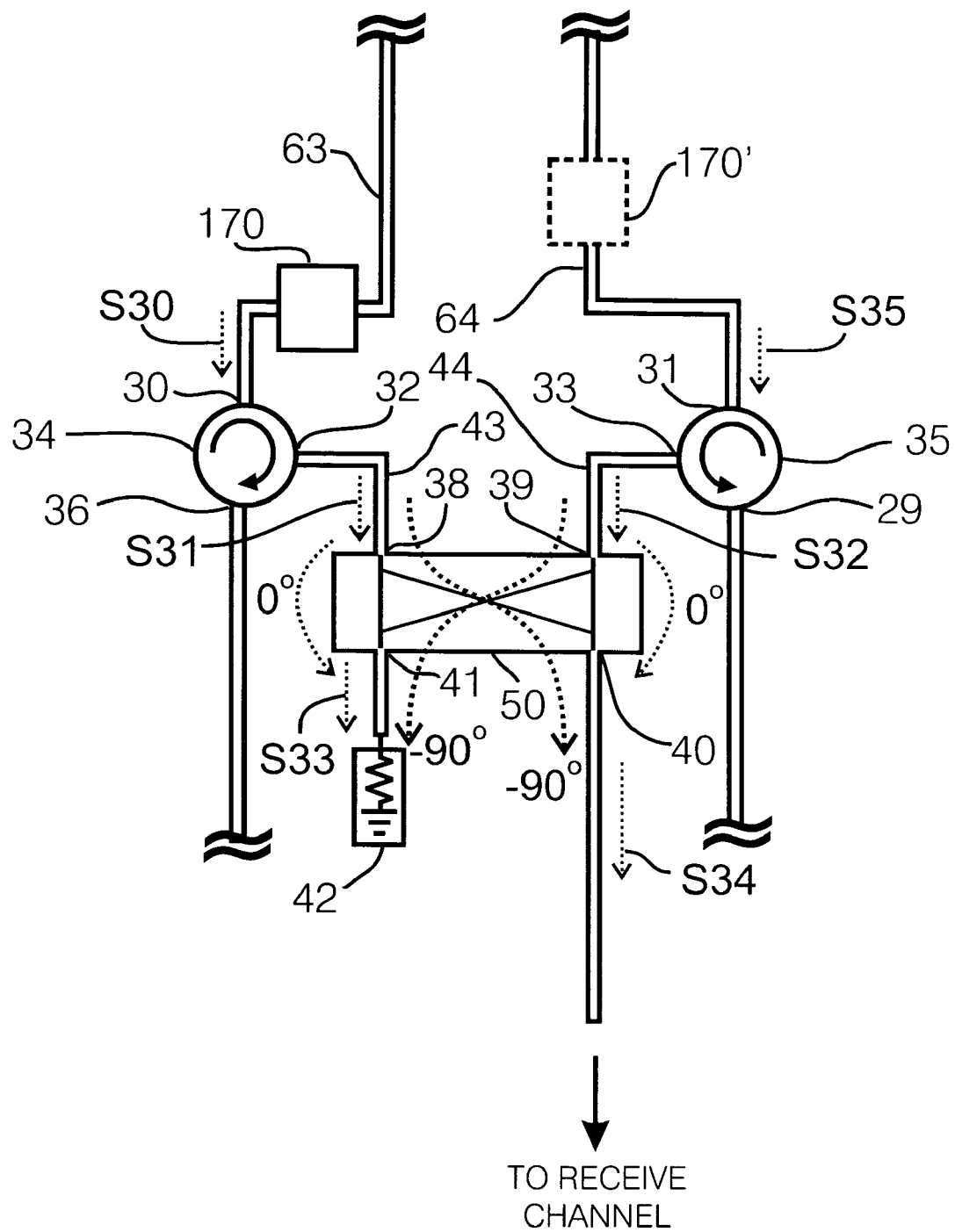
FIG. 16 is a diagram of an embodiment showing the signal paths from a reflective device to the receive channel.

The present invention provides for a reflector device 170 or 170' respectively placed along connecting line 63 or 64 which will introduce an imbalance in antenna feed network 20 and create a compensating signal, Cs, at the receiver port thus effecting an improvement in transmit to receive isolation when the compensating signal, Cs, is properly set to cancel the antenna leakage signal, Ls. The present invention further provides a configuration wherein both reflector devices 170 and 170' are used. In configurations when both reflector devices 170 and 170' are simultaneously used, the combination can be set so they effect an imbalance in antenna feed network 20 and the combined compensation signal, Cs, can also be used to effect a cancellation of the antenna leakage signal, Ls. FIG. 16 shows the signal paths for the signal S30 reflected from reflector device 170 placed along connecting line 63. The upper and lower sections of the antenna feed network 20 are not shown for clarity. The reflected signal S30 is a portion of the first divided transmission output signal leaving port 30 of the routing device 34. For this analysis, the reflected signal S30 entering port 30 of the first routing device 34 is assumed to have an amplitude $X/\sqrt{2}$ and relative phase $(-\phi X - 90 - 2(\phi 6) - \phi 10)$ degrees, as shown in TABLE VII. The amplitude of the reflection from reflector device 170 is X and the relative phase of the reflection from reflector device 170 is $-\phi X$. It is also assumed that signals entering port 30 of signal routing device 34 is routed to port 32 with no change in amplitude and phase shift equal to $-\phi 10$ degrees. The portion of connecting line 63 between reflector device 170 and port 30 of routing device 34 will introduce a relative phase shift of $-\phi 6$ degrees. The length of connecting line 43 will introduce an additional phase shift of $-\phi 5$ degrees. The signal S31 entering port 38 of output quadrature hybrid 50 will have an amplitude of $X/\sqrt{2}$ and relative phase of $(-\phi X - 90 - 2(\phi 6) - 2(\phi 10) - \phi 5)$ degrees. The output quadrature hybrid 50 divides the input power to any port in half or the voltage is scaled by a factor of $1/\sqrt{2}$. A relative phase shift of 0 degrees is introduced into the signal passing from the port 38 over to the port 41. A relative phase shift of $-90$ degrees is introduced into the signal passing from the port 38 over to the port 40. The resulting signal S33 leaving port 41 of output quadrature hybrid 50 will have an amplitude of X/2 and relative phase of $(-\phi X - 90 - 2(\phi 6) - 2(\phi 10) - \phi 5)$ degrees. The resulting signal S34 leaving port 40 of output quadrature hybrid 50 will have an amplitude of X/2 and relative phase of $(-\phi X - 180 - 2(\phi 6) - 2(\phi 10) - \phi 5)$ degrees. Reflected signal S34 was previously referred to as compensating signal, Cs.

$$Cs = |Cs| < \phi_{Cs} = (X/2) < (-\phi X - 180 - 2(\phi 10) - \phi 5)$$

The reflector device 170 and placement along connecting line 63 is set to provide a compensating signal, Cs, that is substantially equal in the amplitude to the antenna leakage signal, Ls, and relative phase of approximately 180-degrees out of phase with the antenna leakage signal, Ls. The vector addition of these signals will reduce or eliminate the antenna leakage signal, Ls, thus improving the transmitter to receiver channel isolation.

$|Cs| < \phi_{Cs} \approx |Ls| < (\phi_{Ls} - 180)$
for the amplitudes
$|Cs| \approx |Ls|$
$(X/2) \approx H$
then
$X \approx (2H)$
for the phase,
$<\phi_{Cs} \approx <(\phi_{Ls} - 180)$ $(-\phi X - 180 - 2(\phi 6) - 2(\phi 10) - \phi 5) \approx ((-90 - 2(\phi 10) - 2(\phi 4) - \phi 5 - \phi H) - 180)$
$(-\phi X - 2(\phi 6)) \approx (-90 - 2(\phi 4) - \phi H)$
then
$-\phi X \approx (-90 - 2(\phi 4) - \phi H + 2(\phi 6))$ As a result, the amplitude, X, of the reflected signal from reflector device 170 should be set to be substantially equal to twice the amplitude, H, of the leakage signal of antenna assembly 209. The relative phase, $-\phi X$, of the reflected signal from reflector device 170 should be set to be approximately equal to the $(-90 - 2(\phi 4) - \phi H + 2(\phi 6))$ degrees where $-\phi H$ is the phase shift of the leakage signal of antenna assembly 209.

TABLE VII

| Signal | Amplitude | Phase |
| --- | --- | --- |
| S30 | $X/\sqrt{2}$ | $-\phi X - 90 - 2(\phi 6) - \phi 10$ |
| S31 | $X/\sqrt{2}$ | $-\phi X - 90 - 2(\phi 6) - 2(\phi 10) - \phi 5$ |
| S33 | $X/2$ | $-\phi X - 90 - 2(\phi 6) - 2(\phi 10) - \phi 5$ |
| S33 | $X/2$ | $-\phi X - 180 - 2(\phi 6) - 2(\phi 10) - \phi 5$ |

Reflector device 170 should be set to effect cancellation of the antenna leakage signal, Ls, such that a transmit to receive isolation of at least 30 dB is achieved over a frequency range associated with the system use. More preferably, reflector device 170 should be set to effect leakage cancellation such that at least 35 dB isolation is achieved over the desired frequency range. Still more preferably, reflector device 170 should be set to effect leakage cancellation such that at least 40 dB isolation is achieved over the desired frequency range.

Figure 17C:
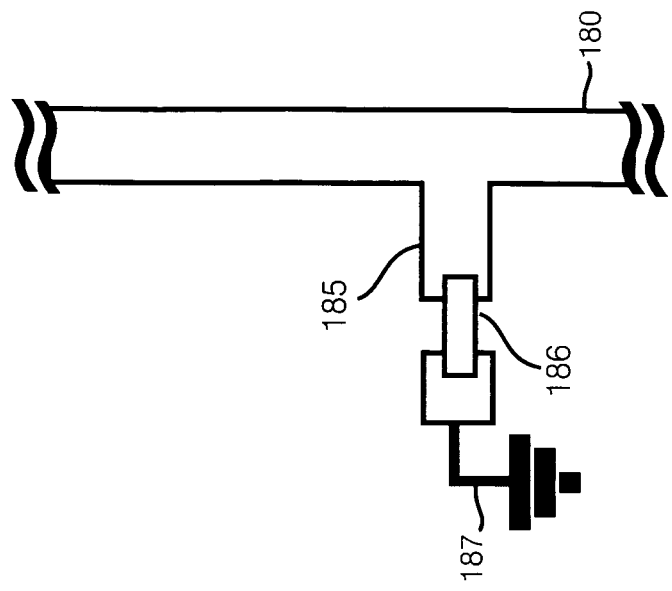
FIG. 17C is an embodiment showing the reflective device configured as a reactive lumped element.
Figure 17B:
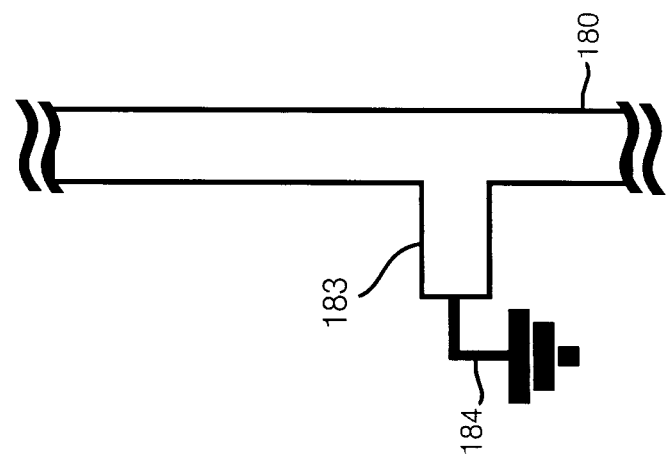
FIG. 17B is a diagram of an embodiment showing the reflective device configured as a shorted stub.
Figure 17A:
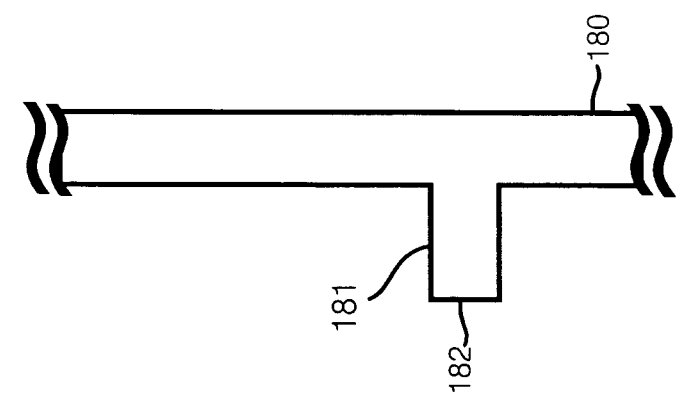
FIG. 17A is a diagram of an embodiment showing the reflective device configured as an open stub.

In the preferred embodiment of this invention, reflector device 170 and/or 170' is an open stub transmission line. FIG. 17A shows a top view of the preferred embodiment using transmission line 180 that is a portion of one of the connecting lines previously described. Open circuit 182 is at the end of transmission line stub 181. The length and width of transmission line stub 181 is set to effect cancellation of the antenna leakage signal, Ls. Alternatively, the reflector device 170 and/or 170' can be a shorted stub transmission line. FIG. 17B shows a top view of an embodiment using transmission line 180 with a short circuit 184 placed along transmission line stub 183. The length and width of transmission line stub 183 is set to effect cancellation of the antenna leakage signal, Ls. Alternatively, the reflector device 170 and/or 170' can a lumped element type reactive component such as a capacitor or inductor. FIG. 17C shows a top view of an embodiment using transmission line 180 with a short circuit 187 placed at the end of reactive component 186. It will be understood that FIGS. 17A-17C are not to scale and that they are schematic in nature and that actual implementation is dependent upon the materials and frequencies involved. Reactive component 186 is connected to transmission line stub 185. The capacitance or inductance value of reactive component 186 and the length and width of transmission line stub 185 are set to effect cancellation of the antenna leakage signal, Ls.

A similar mathematical derivation to that described above can show that a compensating signal reflected from a reflector device 170' place along connecting line 64 will effect cancellation of the antenna leakage signal, Ls. For this analysis, the reflected signal entering port 31 of the second routing device 35 is assumed to have an amplitude $Y/\sqrt{2}$ and relative phase $(-\phi Y - 2(\phi 7) - \phi 10)$ degrees where the amplitude of the reflection from reflector device 170' is Y and the relative phase of the reflection from reflector device 170 is $-\phi Y$. It is also assumed that signals entering port 31 of signal routing device 35 is routed to port 33 with no change in amplitude and phase shift equal to $-\phi 10$ degrees. The portion of connecting line 64 between reflector device 170' and port 31 of routing device 35 will introduce a relative phase shift of $-\phi 7$ degrees. The length of connecting line 44 will introduce an additional phase shift of $-\phi 5$ degrees. The signal S32 entering port 39 of output quadrature hybrid 50 will have an amplitude of Y/sqrt(2) and relative phase of $(-\phi Y-2(\phi 7)-2(\phi 10)-\phi 5)$ degrees. The output quadrature hybrid 50 divides the input power to any port in half or the voltage is scaled by a factor of 1/sqrt(2). A relative phase shift of 0 degrees is introduced into the signal passing from the port 39 over to the port 40. A relative phase shift of $-90$ degrees is introduced into the signal passing from the port 39 over to the port 41. The resulting signal leaving port 41 of output quadrature hybrid 50 will have an amplitude of Y/2 and relative phase of $(-\phi Y-2(\phi 7)-2(\phi 10)-\phi 5-90)$ degrees. The resulting signal leaving port 40 of output quadrature hybrid 50 will have an amplitude of Y/2 and relative phase of $(-\phi Y-2(\phi 7)-2(\phi 10)-\phi 5)$ degrees. This reflected signal was previously referred to as compensating signal, Cs.

As a result, the amplitude, Y, of the reflected signal from reflector device 170' should be set to be substantially equal to twice the amplitude, H, of the leakage signal of antenna assembly 209. The relative phase, $-\phi Y$, of the reflected signal from reflector device 170' should be set to be approximately equal to the $(-270-\phi H-2(\phi 4)+2(\phi 7))$ degrees where $-\phi H$ is the phase shift of the leakage signal of antenna assembly 209.

It is important to note that it may be possible to effect cancellation of the antenna leakage signal, Ls, with the introduction of two or more reflector devices placed along connecting line 63 and/or connecting line 64 and therefore effecting an imbalance in the antenna feed network 20 for effecting cancellation of the antenna leakage signal, Ls.

It will be appreciated that a reflector device introduced to create a compensating signal, Cs, to effect cancellation of the amplitude of the antenna leakage signal, Ls, can also be implemented in antenna feed network 20 when directional couplers 75 and 76 are used in place of circulators 34 and 35. As shown in FIG. 10, the antenna leakage signal, Ls, is still present in this configuration and any antenna leakage signal found on connecting line 69 can be cancelled through the use of a reflector device placed on connecting line 63 and/or connecting line 64.

Figure 18:
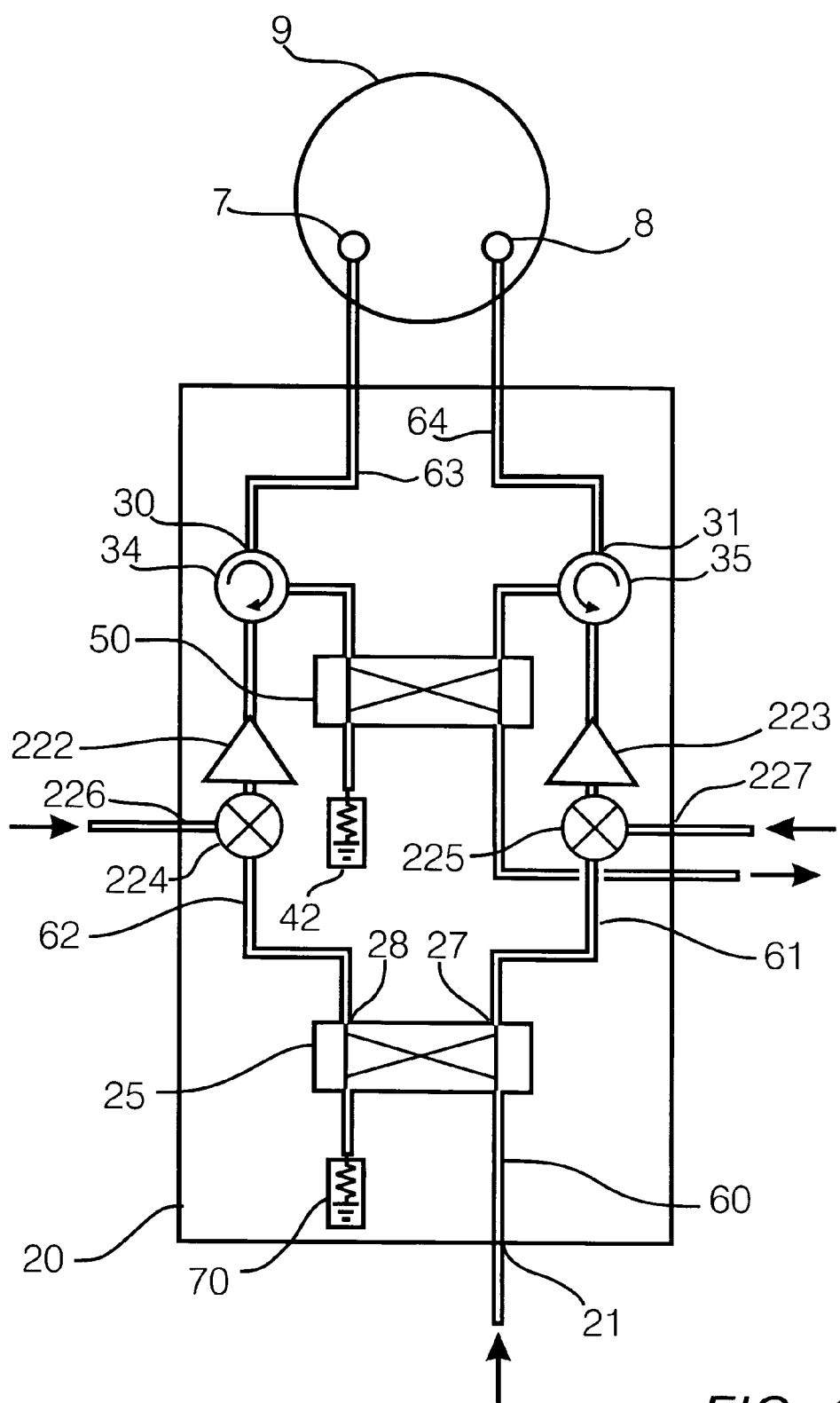
FIG. 18 is a diagram of an embodiment of the antenna feed network including modulators and amplifiers to modulate and amplify the input transmission signal.

The antenna feed network 20 of the present invention may also include modulators in the connecting lines to allow the antenna feed network 20 to operate as a transmit modulator as shown in FIG. 18. For example, modulators 224 and 225 are placed along connecting lines 62 and 61 respectively. Data signals are applied to the data input ports 226 and 227 and the transmission signals flowing on connecting lines 62 and 61 are modified by the modulators 224 and 225. The modulators 224 and 225 can be mixers, switches, variable attenuators, variable amplifiers or any device that can modify the amplitude and/or phase of the transmission signal. In the typical operation of an RFID system using backscatter communication, the reader modulation is applied during forward-link transmission from the RFID reader to the RFID tag. During reverse-link communication, the RFID reader transmitter is active but typically not modulated with data during signal reception from the tag to the reader. In this case, the antenna feed network 20 provides isolation between the active transmitter carrier signal and receiver input. The antenna feed network 20 may also include amplifiers in the connecting lines to increase the amplitude level of the transmitted signal to operative levels as shown in FIG. 18. For example, amplifiers 222 and 223 are placed along connecting lines 62 and 61 respectively.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. Such modifications include substitution of components for components specifically identified herein, wherein the substitute component provide functional results which permit the overall functional operation of the present invention to be maintained. Such substitutions are intended to encompass presently known components and components yet to be developed which are accepted as replacements for components identified herein and which produce result compatible with operation of the present invention. Furthermore, while examples have been provided illustrating operation at certain power levels and frequencies, the present invention as defined in this disclosure and claims appended hereto is not considered limited to frequencies and power levels recited herein. It is furthermore to be understood that the receiver and transmitter referenced herein is not considered limited to any particular types of receivers or transmitters nor any particular form of signals in that the signals may carry analog or digital information, in any modulation scheme, or the signals need not carry information. Furthermore, the signals used in this invention are considered to encompass any electromagnetic wave transmission.

What is claimed is:

1. A wireless communication device for effecting two way wireless communication, comprising:
   an antenna assembly having:
      a single radiating structure with first and second antenna feed inputs feeding the single radiating structure;
      a configuration accepting first and second antenna feed signals respectively at said first and second antenna feed inputs with said first antenna feed signal shifted a feed signal phase difference relative to said second antenna feed signal and radiating said first and second antenna feed signals in a common radiated wave, said configuration being excitable by a received radiation wave to produce at least one of two possible signals, said two possible signals being a first received signal and second received signal which when received are respectively produced at said first and second antenna feed inputs with said first received signal shifted a received signal phase difference from said second received signal; and
      input characteristics at said first and second antenna feed inputs reflecting portions of said first and second antenna feed signals thereby producing first and second reflected feed signals respectively at said first and second antenna feed inputs;
   a transmitter producing a transmission signal transmitted by said antenna assembly;
   a receiver receiving a received signal composed of at least a portion of said at least one of said first and second received signals from said antenna assembly while said transmission signal is being transmitted by said antenna assembly;
   an antenna feed network interconnecting said transmitter, said receiver, and said antenna assembly to apply said transmission signal to said first and second antenna feed inputs and to simultaneously receive at least one of said first and second received signals from said first and second antenna feed inputs and produce said received signal therefrom while effecting cancellation of said first and second reflected feed signals;

said antenna feed network including:
- a signal dividing assembly receiving said transmission signal from said transmitter and dividing said transmission signal into first and second divided transmission signals having substantially equal amplitudes and a first relative phase shift therebetween;
- first and second routing devices each having at least first, second and third ports, said first and second routing device being configured to simultaneously deliver a signal at said first port to said second port and another signal at said second port to said third port each at functionally operative levels, wherein:
  - s21 is a transmission coefficient from said first port to said second port;
  - s32 is a transmission coefficient from said second port to said third;
  - s31 is a transmission coefficient from said first port to said third port;
  - said s21 is greater than said s31; and
  - said s32 is greater than said s31;
- said first routing device having:
  - said first divided transmission signal applied to said first port of said first routing device and simultaneously producing:
    - said first antenna feed signal at said second port of said first routing device which is applied to said first antenna feed input; and
    - a first transmission leakage signal at said third port of said first routing device; and
  - said first received signal, when present, and said first reflected feed signal simultaneously provided by said first antenna feed input to said second port of said first routing device and emitted from said third port of said first routing device simultaneous with said first transmission leakage signal being emitted from said third port, and simultaneous with said first antenna feed signal being applied to said first antenna feed input to operatively drive said antenna assembly;
- said second routing device having:
  - said second divided transmission signal applied to said first port of said second routing device and simultaneously producing:
    - said second antenna feed signal at said second port of said second routing device which is applied to said second antenna feed input; and
    - a second transmission leakage signal at said third port of said second routing device; and
  - said second received signal, when present, and said second reflected feed signal simultaneously provided by said second antenna feed input to said second port of said second routing device and emitted from said third port of said second routing device simultaneous with said second transmission leakage signal being emitted from said third port, and simultaneous with said second antenna feed signal being applied to said second antenna feed input to operatively drive said antenna assembly; and
- a signal combiner assembly having first and second combiner inputs and a received signal output connected to said receiver to deliver said received signal thereto, said first and second combiner inputs being respectively connected to said third ports of said first and second routing devices, said signal combining assembly being configured to introduce a phase shift into signals applied to at least one of said first and second combiner inputs such that:
  - said at least a portion of said at least one of said first and second received signals is directed to said received signal output to provide said received signal; and
  - said first and second reflected feed signals are phase shifted relative to one another to within a range of 180 degrees and are at amplitude levels within a range of each other at said received signal output to effect substantial cancellation of each other.

2. The wireless communication device of claim 1 wherein said signal combiner assembly introduces said phase shift into signals applied to at least one of said first and second combiner inputs such that said first and second transmission leakage signals are phase shifted relative to one another to within a range situated about 180 degrees and are at amplitude levels within a range of each other at said received signal output to effect substantial cancellation of each other.

3. The wireless communication device of claim 2 wherein said signal combiner assembly is a quadrature hybrid having an isolated port with a termination applied thereto, said phase shift introduced is approximately 90 degrees, said first and second reflected feed signals are combined substantially in phase at said isolated port and dissipated in said termination after said phase shift is introduced into one of said first and second reflected feed signals.

4. The wireless communication device of claim 3 wherein said signal dividing assembly is a quadrature hybrid having an input port receiving said transmission signal, an isolated port with a termination applied thereto, said first and second divided transmission signals are output at first and second divider outputs of said quadrature hybrid, said first relative phase shift is approximately 90 degrees, and said first divided transmission signal lags said second divided transmission signal by said first relative phase shift.

5. The wireless communication device of claim 4 wherein said first and second routing devices are circulators.

6. The wireless communication device of claim 5 wherein said antenna assembly is a circularly polarized antenna structure and said antenna feed signals relative phase difference is approximately 90 degrees.

7. The wireless communication device of claim 6 wherein said circularly polarized antenna structure is a microstrip patch.

8. The wireless communication device of claim 1 wherein said signal combiner assembly is a quadrature hybrid having an isolated port with a termination applied thereto, said phase shift introduced is approximately 90 degrees, said first and second reflected feed signals are combined substantially in phase at said isolated port and dissipated in said termination after said phase shift is introduced into one of said first and second reflected feed signals.

9. The wireless communication device of claim 8 wherein said signal dividing assembly is a quadrature hybrid having an input port receiving said transmission signal, an isolated port with a termination applied thereto, said first and second divided transmission signals are output at first and second divider outputs of said quadrature hybrid, said first relative phase shift is approximately 90 degrees, and said first divided transmission signal lags said second divided transmission signal by said first relative phase shift.

10. The wireless communication device of claim 8 wherein said signal dividing assembly is a power splitter device having an input port receiving said transmission signal, and two output branches delivering said first and second divided transmission signals, and one of said two output branches includes a phase shifting element introducing said first relative phase shift, said first relative phase shift is approximately 90 degrees, and said first divided transmission signal lags said second divided transmission signal by said first relative phase shift.

11. The wireless communication device of claim 1 wherein said signal combiner assembly is power splitter/combiner device with two input branches, one of said two input branches includes a phase shifting element introducing said phase shift, said phase shift being approximately 90 degrees.

12. The wireless communication device of claim 11 wherein said signal dividing assembly is a quadrature hybrid having an input port receiving said transmission signal, an isolated port with a termination applied thereto, said first and second divided transmission signals are output at first and second divider outputs of said quadrature hybrid, said first relative phase shift is approximately 90 degrees, and said first divided transmission signal lags said second divided transmission signal by said first relative phase shift.

13. The wireless communication device of claim 11 wherein said signal dividing assembly is a power splitter device having an input port receiving said transmission signal, and two output branches delivering said first and second divided transmission signals, and one of said two output branches includes a phase shifting element introducing said first relative phase shift, said first relative phase shift is approximately 90 degrees, and said first divided transmission signal lags said second divided transmission signal by said first relative phase shift.

14. The wireless communication device of claim 1 further comprising:
a first modulator disposed to receive said first divided transmission signal, modulate said first divided transmission signal, and apply said first divided transmission signal, after modulation thereof, to said first port of said first routing device; and
a second modulator disposed to receive said second divided transmission signal, modulate said second divided transmission signal, and apply said second divided transmission signal, after modulation thereof, to said first port of said second routing device.

15. A wireless communication device for effecting two way wireless communication, comprising:
an antenna assembly having:
a single radiating structure with first and second antenna feed inputs feeding the single radiating structure;
a configuration accepting first and second antenna feed signals respectively at said first and second antenna feed inputs with said first antenna feed signal shifted a feed signal phase difference relative to said second antenna feed signal and radiating said first and second antenna feed signals in a common radiated wave, said configuration being excitable by a received radiation wave to produce at least one of two possible signals, said two possible signals being a first received signal and second received signal which when received are respectively produced at said first and second antenna feed inputs with said first received signal shifted a received signal phase difference from said second received signal; and
input characteristics at said first and second antenna feed inputs reflecting portions of said first and second antenna feed signals thereby producing first and second reflected feed signals respectively at said first and second antenna feed inputs;
a transmitter producing a transmission signal transmitted by said antenna assembly;
a receiver receiving a received signal composed of at least a portion of said at least one of said first and second received signals from said antenna assembly while said transmission signal is being transmitted by said antenna assembly;
an antenna feed network interconnecting said transmitter, said receiver, and said antenna assembly to apply said transmission signal to said first and second antenna feed inputs and to simultaneously receive at least one of said first and second received signals from said first and second antenna feed inputs and produce said received signal therefrom while effecting cancellation of first and second transmission leakage signals;
said antenna feed network including:
a signal dividing assembly receiving said transmission signal from said transmitter and dividing said transmission signal into first and second divided transmission signals having substantially equal amplitudes and a first relative phase shift therebetween;
first and second routing devices each having at least first, second and third ports, said first and second routing device being configured to simultaneously deliver a signal at said first port to said second port and another signal at said second port to said third port each at functionally operative levels, wherein:
s21 is a transmission coefficient from said first port to said second port;
s32 is a transmission coefficient from said second port to said third;
s31 is a transmission coefficient from said first port to said third port;
said s21 is greater than said s31; and
said s32 is greater than said s31;
said first routing device having:
said first divided transmission signal applied to said first port of said first routing device and simultaneously producing:
said first antenna feed signal at said second port of said first routing device which is applied to said first antenna feed input; and
said first transmission leakage signal at said third port of said first routing device; and
said first received signal, when present, and said first reflected feed signal simultaneously provided by said first antenna feed input to said second port of said first routing device and emitted from said third port of said first routing device simultaneous with said first transmission leakage signal being emitted from said third port, and simultaneous with said first antenna feed signal being applied to said first antenna feed input to operatively drive said antenna assembly;
said second routing device having:
said second divided transmission signal applied to said first port of said second routing device and simultaneously producing:
said second antenna feed signal at said second port of said second routing device which is applied to said second antenna feed input; and
said second transmission leakage signal at said third port of said second routing device; and
said second received signal, when present, and said second reflected feed signal simultaneously provided by said second antenna feed input to said second port of said second routing device and emitted from said third port of said second routing device simultaneous with said second transmission leakage signal being emitted from said third port, and simultaneous with said second antenna feed signal being applied to said second antenna feed input to operatively drive said antenna assembly;

a signal combiner assembly having first and second combiner inputs and a received signal output connected to said receiver to deliver said received signal thereto, said first and second combiner inputs being respectively connected to said third ports of said first and second routing devices, said signal combining assembly being configured to introduce a phase shift into signals applied to at least one of said first and second combiner inputs such that:

said at least a portion of said at least one of said first and second received signals is directed to said received signal output to provide said received signal; and said first and second transmission leakage signals are phase shifted relative to one another to within a range of 180 degrees and are at amplitude levels within a range of each other at said received signal output to effect substantial cancellation of each other.

16. The wireless communication device of claim 15 wherein said first and second routing devices are circulators 17. The wireless communication device of claim 15 wherein said first and second routing devices are directional couplers.

18. The wireless communication device of claim 15 wherein said signal combiner assembly introduces said phase shift into signals applied to at least one of said first and second combiner inputs such that said first and second reflected feed signals are phase shifted relative to one another to within a range situated about 180 degrees and are at amplitude levels within a range of each other at said received signal output to efFect substantial cancellation or each other.

19. The wireless communication device of claim 15 wherein said first and second routing devices are duplexing filters.

20. The wireless communication device of claim 15 wherein said transmission signal and said received signal operat at a same carrier frequency.

21. The wireless communication device of claim 15 wherein an absolute value of said feed signal phase difference is in a Tange situated about 90 degrees.

22. The wireless communication device of claim 15 wherein an absolute value of said feed signal phase difference is in a range situated about 180 degrees.

23. A wireless communication device for effecting two way wireless communication including interconnecting a transmitter, and a receiver, said wireless communication device comprising:

an antenna assembly having:

first and second antennal feed inputs; and a configuration accepting first and second antenna feed signals respectively at said first and second antenna feed inputs with said first antenna feed signal shifted a feed signal phase difference relative to said second antenna feed signal and said configuration being excitable by a received radiation wave, when present, of a received signal to produce at least one of two possible signals, said two possible signals being a first received signal and a second received signal with when received are respectively produced at said first and second antenna feed inputs;

a transmission signal input for receiving a transmission signal from said transmitter;

first and second antenna ports for outputting first and second antenna feed signals to said first and second antenna feed inputs of said antenna assembly;

a receiver output for outputting a portion of said received signal to said receiver;

a signal dividing assembly receiving said transmission signal from said transmitter and dividing said transmission signal into first and second divided transmission signals having substantially equal amplitudes and a first relative phase shift therebetween;

a fist routing device having a first port, a second port and a third port, said first routing device routing said first divided transmission signal applied to said first port, to said second port which is connedted to said first antenna port and outputting said first divided transmission signal as said first antenna feed singal while passing a portion of said first divided transmission signal to said third port as a first transmission leakage signal;

said first routing device having said second part connected to said first antenna port to accept said first received signal, when presnet, and route said first received signal to said thrid port simultaneous with said first antenna feed signal being applied to said first antenna port;

a second routing device having a first port, a second port and a third port, said second routing device routing said second divided transmission signal applied to said first port, to said second port which is connected to said second antennal port and outputting said second divided transmission signal as said second antenna feed signal while passing a portion of said second divided transmission signal to said third port as a second transmission leakage signal;

said second routing device having said second port connected to said second antenna port to accept said second received signal, when present, and route said second received signal to said third port simultaneous with said second antenna feed signal being applied to said second antenna port;

a signal combiner assembly having first and second combiner inputs and a received signal output connected to said receiver output to deliver said portion of said received signal thereto, said first and second combiner inputs being respectively connected to said third ports of said first and second routing devices, said signal combining assembly being configured to introduce a phase shift into signals applied to at least one of said first and second combiner inputs such that:

at least a portion of any of said first and second received signals when present, respectively at said first and second combiner inputs is directed to said received a signal output to provide said portion of said received signal; and said first and second transmission leakage signals are phase shifted relative to one another to within a range situated about 180 degrees and are at amplitude levels within such a range of one another as to efect substantial cancellation of eah other at said received signal output:

said antenna assembly producing:

a third transmission leakage signal, at said first antenna feed input, which is a portion of said second antenna feed signal; and a fourth transmission leakage signal, at said second antenna feed input, which is a portion of said second antenna feed signal; and a fourth transmission leakage signal, at said second antenna feed input, which is a portion of said first antenna feed signal;

a reflector device applied between said second port of said first routing device and said first antenna port of said antenna assembly and configured to have a reflection coefficient to reflect into said second port of said first routing devide a portion of said first antenna feed signal as a reflected signal such that an imbalance in levels of said first antenna feed signal and said second antenna feed signal arriving at said first and second antenna ports results;

said first routing device receiving said reflected signal and said third transmission leakage signal at said second port and producing, simultaneously at said third port, a reflected output signal and a third transmission leakage output signal;

said second routing device receiving said fourth transmission leakage signal at said second port and producing, simultaneously at said third port, a fourth transmission leakage output signal; and said signal combiner having said first and second combiner inputs respectively receiving said third and forth transmission leakage output signals, and said first combiner input receiving said reflected output signal, said signal combiner being so configured as to combine a portion of said reflected output signal as said received signal output with said third and fourth transmission leakage output signals to effect substantial cancellation of said third and fourth transmission leakage output signals at said received signal output.

24. A wireless communication device for effecting two way wireless communication of claim 23 wherein:

said third transmission leakage signal has an amplitude equal to an amplitude of said second divided transmission output signal multiplied by H and a phase shift -φH relative to said second divided transmission output signal:

said fourth transmission leakage signal has an amplitude equal to an amplitude of said first divided transmission output signal multipled by H and a phase shift - φH relative to said first divided transmission output signal; and said reflector device si configured to have said reflection coefficient equal to X and a relative phase shift -φX so as to effect said substantial cancellation of said third and fourth transmission leakage output signal at said received signal output, wherein:

X is set substantially equal to 2H and -φX is set substantially equal to (-90 -2(φ4)(-pH+2(φ6)) wherein:

φ4 is a net electrical length of a first connecting line connecting said second port of said first routing device to said first antenna port:

φ4 is a net electrical length of a second connecting line connecting said second port of said second routing device to said second antenna port; and φ6 is a net electrical length of a portion of said first connecting line between said reflecting device and said second port of said first routing device.

25. A wireless communication device for effecting two way wireless communication of claim 21 wherein said reflector device is an open stub.

26. A wireless communication device for effecting two way wireless communication according to claim 21 wherein said reflector device is a shorted stub.

27. A wireless communication device for effecting two way wireless communication according to claim 21 wherein said reflector device includes a reactive component selected from the group consisting of a capacitor and an inductor.

28. The wireless communication device of claim 23 wherein:

said signal combiner assembly is a quadrature hybrid having an isolated port with a termination applied thereto, said phase shift of said signal combiner introduces is a phase shift of approximately 90 degrees into one of:
a combination of said third transmission leakage output signal and said reflected output signal: or
said fourth transmission leakage output signal.

29. The wireless conirnunication dcvicc of claim 28 wherein said signal dividing assembly is a quadrature hybrid having an input port receiving said transmission signal, an isolated port with a termination applied thereto, said first and second divided transmission signals are output at first and second divider outputs of said quadrature hybrid of said signal dividing assembly, said first relative phase shift is approximately 90 degrees and said first divided transmission signal lags said second divided transmission signal by said first relative phase shift.

30. The wireless communication device of claim 28 wherein said signal dividing assembly is a power splitter device having an input port receiving said transmission signal, and two output branches delivering said first and second divided transmission signals, and one of said two ouLput branches includes a phase shifting element introducing said first relative phase shift, said first relative phase shift is approximately 90 degrees, and said first divided transmission signal lags said second transmission signal by said first relative phase shift.

31. The wireless communication device of claim 23 wherein said signal combiner assembly is power splitter/combiner device with two input branches, one of said two input branches includes a phase shifting element introducing said phase shift of said signal combiner assembly, and said phase shift of said signal combiner assembly is approximately 90 degrees snd introduced into one of:
a combination of said third leakage transmission output signal and said reflect out signal; or
said fourth transmission output signal.

32. The wireless communication device of claim 31 wherein said signal dividing nsscnihly is a quadrature hybrid having an input port receiving said transmission signal, an isolated port with a termination applied thereto, said first and second divided transmission signals are output at first and second divider outputs of said quadrature hybrid of said signal dividing assembly, said first relative phase shift is approximately 90 degrees, and said first divided transmission signal lags said second divided transmission signal by said first relative phase shift.

33. The wireless communication device of claim 31 wherein said signal dividing assembly is a power splitter deivce having an input port receiving said transmission signal, and two output branches delivering said first and second divided transmission signals, and one of said two output branches includes a phase shifting element introducing said first relative phase shift, said first relative phase shift is approximately 90 degrees, and said first divided transmission signal lags said second divided transmission signal by sid first relative phase shift.

34. The wireLess communication device of claim 23 wherein said first and second routing devices arc circulators.

35. The wireless communication device of claim 23 wherein said fist and second routing devices are directional couplers.

36. The wireless communication dcyiee of claim 23 wherein said first and second routing devices are duplexing filters.

37. The wireless communication device of claim 23 wherein said substantial cancellation of said first and second transmission leakage signals and said third and fourth transmission leakage output signals results in a combined signal at said received signal output that is at least 25 dB attenuated relative to said transmission sigital.

38. The wireless communication device of claim 23 wherein said substantial cancellation of said first and second transmission leakage signals and said third and fourth transmission leakage output signals results in a combined signal at said received signal output that is at least 30dB attenuated relative W said transmission signal.

39. The wireless communiention device of claim 23 wherein said substantial cancellation of said first and second tansmission leakage signals and said third and fourth transmission leakage output signals results in a combined signal at said received signal output that is at least 35 dB attenuated relative io said transmission signal.

40. An antenna feed network of claim 23, wherein said an antenna assembly has a single radiating structure fed by both said first and second antenna feed inputs.

41. An antenna feed network of claim 23, wherein:
said antenna assembly having input characteristics at said first and second antenna feed inputs reflecting portions of said first and second antenna feed signals thereby respectively producing a first reflected feed signal and a second reflected feed signal respectively at said first and second antenna feed inputs;
said first routing device receiving at said second port thereof said first reflected feed signal simultaneously with said first received signal, when present, and routing said first reflected feed signal to said third port of said first signal routing assembly; and
said second routing device receiving at said second port thereof said second relfected feed signal simultaneously with said second received signal, when present, and routing said second reflected feed signal to said third port of said second signal routing assembly; and
said signal combiner assembly is configured to complete electrical lengths from said first and second antenna feed inputs to said received signal output that are phase shifted relative to one another within a range situated about 180 degrees to effect substantial cancellation of said first and second reflected fccd signals at said received signal output.

42. A wireless communication device for effecting two way wireless communication including interconnecting a transmitter, and a receiver, said wireless communication device comprising:
an antenna assembly having:
first and second antenna feed inputs: and
a configuration accepting first and second antenna feed signals respectively at said first and second antenna feed inputs with said first antenna feed signal shifted a feed signal phase differcne relative to said second antenna feed signal and said configuration being excitable by a received radiation wave, when present, of a received signal to produce at least one of two possible signals, said two possible signals being a first received signal and a second received signal which when received are respectively produced at said first and second antenna fieed inputs:
a transmission signal input for receiving a transmission signal from said transmitter;
first and second antenna ports for outputting said first and second antenna feed signals to said first and second antenna feed inputs of said antenna assembly;
a receiver output for outputting a portion of said received signal to said receiver;
a signal dividing assembly receiving said transmission signal from said transmitter and dividing said transmission signal into first and second divided transmission signals having substantially equal amplitudes and a first relative phase shift therebetween;
a first routing device having a first port, a second port and a third port, said first routing device routing said first divided transmission signal applied to said first port, to said second prot which is connected to said first antenna port and outputting said first divided transmission signal as said first antenna feed signal while passing a portion of said first divided transmission signal to said third port as a first transmission leakage signal;
said first routing device having said second prot connected to said first antenna port to accept said first received signal, when present, and route said first received signal to said third port simultaneous with said first antenna feed signal being applied to said first antenna port:
a second routing device having a first port, a second port and a third port, said second routing device routing said second divided transmission signal applied to said first port, to said second prot which is connected to said second antenna port and outputting said second divided transmission signal as said second antenna feed signal while passing a portion of said second divided transmission signal to said third port as a second transmission leakage signal;
said second routing device having said second port connected to said second antenna port to accept said second received signal, when present, and route said second received signal to said third port simultaneous with said second antenna feed signal being applied to said second antenna port;
a signal combiner assembly having first and second combiner inputs and a received signal output connected to said reciver output to deliver said portion of said received signal thereto, said first and second combiner inputs being respectively connected to said third ports of said first and second routing devices, said signal combining assembly being configured to introduce a phase shift into signals applied to at least one of said first and second combiner inputs such that:
at least a portion of any of said first and second received signals, when present, respectively at said first and second combiner inputs is directed to said received signal output to provide said portion of said received signal; and
said first and second transmission leakage signals are phase shifted relative to one another to within a range situated about 180 degrees and are at amplitude levels within such a range of one another as to effect substantial cancellation of each other at said received signal output;
a third transmission leakage signal, at said first antennal feed input, which is a portion of said second antenna feed signal; and
a fourth transmission leakage signal, at said second antenna feed input, which is a portion of said first antenna feed signal:
a reflector device applied bciwccn said second port of said second ruuting device and said second antenna port of antenna assembly and configurcd to have a reflection coefficient to reflect into said second port of said second routing device a portion of said second antenna feed signal as a reflected signal such that an imbalance in levels of said first antenna feed signal and said second antenna feed signal arriving at said first and second antenna ports results;

said first routing device receiving said third transmission leakage signal at said second port and producing, simultaneously at said third port, a third transmission leakage output signal:

said second routing device receiving said reflected signal and said fourth transmission leakage signal at said second port and producing, simultaneously at said third port, a reflected output signal and a fourth transmission leakage output signal; and said signal combiner having said first and second combiner inputs respectively receiving said third and forth transmission lealcage output signals, and said second combiner input receiving saidreflcctcd output signal, said signal combiner being so configured as to combine a portion of said reflected ouiput signal at said received signaL output with said third and fourth transmission leakage output signals to effect substantial cancellation of said third and fourth transmission leakage output signals at said received signal output.

43. The wireless communication device of claim 42 wherein:

said third transmission leakage signal has an amplitude equal to an amplitude of said second divided transmission output signal multiplied by II and a phase shift $-\phi H$ relative to said second diviced transmission output signal;

said fourth transmission leakage signal has an amplitude equal to an amplitude of said first divided transmission output signal multiplied by II and a phase shift $-\phi H$ relative to said first divided transmission output signal; and said reflector device si configured to have said reflection coefficient equal to Y and a relative phase shift $-\phi Y$ so as to effect said substantial cancellation of said third and fourth transmission leakage output signal at said received signal output, wherein:

Y is set substantially equal to 2H and $-\phi Y$ is set substantially equal to $(-270-\phi H-2(\phi 4)+2(\phi 7))$ wherein:

$\phi 4$ is a net electrical length of a first connecting line connecting said second port of said first routing device to the first antenna port;

$\phi 4$ is a net electrical length of a second connecting line connecting said second port of said second routing device to said second antenna port; and $\phi 7$ is a net electrical length of a portion of said second connecting line between said reflecting device and said second port of said second routing device.

44. A wireless communication device for effecting two way wireless communication according to claim 26 wherein said reflector device is an open stub.

45. A wireless communication device for effecting two way wireless communication according to claim 26 wherein said reflector device is a shorted stub.

46. A wireless communication device for effecting two way wireless communication according to claim 26 wherein said reflector device includes a reactive component selected from the group consisting of a capacitor and an inductor.

47. The wireless conirnunicatiun device of claim 42 wherein:

said signal combiner assembly is a quadrature hybrid having an isolated port with a termination applied thereto, said phase shift of said signal combiner introduces a phase shift of approximately 90 degrees into one of:
a combination of said fourth transmission leakage output signal and said reflected output signal; or
said third transmission leakage output signal.

48. The wireless communication device of claim 42 wherein said signal dividing assembly is a quadrature hybrid having an input port receiving said transmission signal, an isolated port with a termination applied thereto, said first and second divided transmission signals are output at first and second divider outputs of said quadrature hybrid of said signal dividing assembly, said first relative phase shift is approximately 90 degrees, and said first divided transmission signal lags said second divided transmission signal by said first relative phase shift.

49. The wireless communication device of claim 42 wherein said first and second routing devices are circulators.

50. A wireless communication device for effecting two way wireless communication including interconnecting a transmitter, and a receiver, said wireless communication device comprising:

an antenna assembly having:
first and second antenna feed inputs; and
a configuration accepting first and second antenna feed signals respectively at said first and secon antenna feed inputs with said first antenna feed signal shifted a feed signal phase difference relative to said second antenna feed singal and, said configuraiton being excitably by a received radiation wave, when present, of a received signal to prduce at least one of two possible signals, said two possible signals being a first received signal and a second received signal which when received are respectively produced at first and second antenna feed inputs:

a transmission signal input for receiving a transmission signal from said transmitter;

first and second antenna ports for outputting said first and second antenna feed signals to said first and second antenna feed inputs of said antenna assembly;

a receiver output for outputting a portion of said received signal to said reveiver;

a signal dividing assembly receiving said transmission singal from said trnasmitter and dividing said transmission signal into first and second divided transmission signals having substantially equal amplitudes and a firt relative phase shift therebetween:

a first routing device having a first port, a second port and a third port, said first routing device routing said first divided transmission signal applied ot said first port, to said second port whichis connected to said first antenna port and outputting siad first divided transmission signal as said first antenna feed signal while passing a portion of said first divided transmision signal to said third port as a first transmission leakage signal;

said first routing device having said second port connected to said first antenna port to accept said first received signal, when present, and route said first received signal to said third port simultaneous with said first antenna feed signal being applied to said first antenna port;

a second routing device having a first port, a second port and a third port, said second routing device routing said second divided transmission signal applied to said first port, to said second port which is connected to said second antenna port and outputting said second divided transmission signal as said second antenna feed signal while passing a portion of said second divided transmission signal to said third port as a second transmission leakage signal;

said second routing device having said second port connected to said second antenna port ot accept said seocnd received signal, when present, and route said second received signal to said third port, simultaneous wiht said second antenna feed singal being applied to said second antenna port;

a signal combiner assembly having first and secon combiner inputs and a recived signal output connected to said receiver output to deliver said portion of said received signal thereto, said first and second combiner inputs being respectively connected to said third ports of said first and second routing devices, said signal combininb assembly being configured to introduce a phase shift into signals applied to at least one of said first and second combiner inputs such that:

at least a portion of any of said first and second received signals, when present, respectively at said first and second combiner inputs is directed to said received signal output ot provide said portion of said received signal; and said first and second transmission leakage signals are phase shifted relative to one another to within a range situated about 180 degrees and are at amplitude levels withinsuch a range of one another as to effect substantial cancellationof each other at said received signal output:

said antenna assembly producing:

a third transmission leakage signal, at said first antenna feed input, which is a portion of said second antenna feed signal; and a fourth transmission leakage signal, at said second antenna feed input, which is a portion of said first antenna feed signal;

a first reflector device applied between said second port of said first routing device and said first antenna port of said antenna assembly and configured to have a first reflection coefficient to reflect into said second port of said first routing device a portion of said first antenna feed signal as a first reflected signal;

a second reflector device applied between said second port of said second routing device and said second antenna port of said antenna assembly and configured to have a second reflection coefficient to reflect into said second port of said second routing device a portion of said second antenna feed signal as a second reflected signal; said first and second reflector devices respectively with said first and second reflectioncoefficients be so configured such that a phase imbalance is generated between said first reflected signal and said second reflected signal;

said first routing device receiving said first reflected signal and said third transmission leakage signal at said second port and producing, simultaneously at said third port, a first reflected output signal and a third transmission leakage output signal;

said second routing device receiving said second reflected signal and said fourth transmission leakage signal at said second port and producing, simultaneously at said third port, a second reflected output signal and a fourth transmission leakage output signal; and said signal combiner having said first and second combiner inputs respectively receiving said third and forth transmission leakage output signals, and said first and second combiner inputs respectively receiving said first and second reflected output signals, said signal combiner being so configured as to combine a portion of said first and second reflected output signals at said received signal output with said third and fourth transmission leakage output signals to effect substantial cancellation of said third and fourth transmission leakage output signals at said received signal output.

51. A wireless communication device for effecting two way wireless communication according to claim 50 wherein at least one of said first and second reflector devices is an open stub.

52. A wireless communication device for effecting two way wireless communication according to claim 50 wherein at least one of said first and second reflector devices is a shorted stub.

53. A wireless communication device for effecting two way wireless communication according to claim 31 wherein at least one of said first and second reflector devices includes a reactive component selected from the group consisting of a capacitor and an inductor.

54. A wireless communication device for effecting two way wireless communication according to claim 1 wherein said first and second divided transmission signals are amplified having substantially equal gain and having substantially equal phase shifts introduced.

55. The wireless communication device of claim 50 wherein:

said signal combiner assembly is a quadrature hybrid having an isolated part with a termination applied thereto, said phase shift introduced is approximately 90 degrees into one of:

a combination of said third transmission leakage output signal and said first reflected output signal; or said Fourth transmission leakage output signal and said second reflected output signal.

56. The wireless Communication device of claim 50 wherein said signal dividing assembly is a quadrature hybrid having an input port receiving said transmission signal, an isolated port with a termination applied thereto, said first and second divided transmission signals are output at first and second divider outputs of said quadrature hybrid, said first relative phase shift is approximately 90 degrees, and said first divided transmission signal lags said second divided transmission signal by said first relative phase shift.

57. The wireless communication device of claim 50 wherein said first and second routing devices are circulator.

* * * * *